(12) United States Patent
Hayashi et al.

(10) Patent No.: US 12,140,678 B2
(45) Date of Patent: Nov. 12, 2024

(54) PROCESSING APPARATUS, ELECTRONIC APPARATUS, PROCESSING METHOD, AND PROGRAM

(71) Applicant: FUJIFILM Corporation, Tokyo (JP)

(72) Inventors: Kenkichi Hayashi, Saitama (JP); Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 164 days.

(21) Appl. No.: 17/697,776

(22) Filed: Mar. 17, 2022

(65) Prior Publication Data

US 2022/0206159 A1 Jun. 30, 2022

Related U.S. Application Data

(63) Continuation of application No. PCT/JP2020/028909, filed on Jul. 28, 2020.

(30) Foreign Application Priority Data

Sep. 30, 2019 (JP) .................................. 2019-180563

(51) Int. Cl.
G01S 17/894 (2020.01)
G01B 11/14 (2006.01)
G01S 17/42 (2006.01)

(52) U.S. Cl.
CPC ............ G01S 17/894 (2020.01); G01B 11/14 (2013.01); G01S 17/42 (2013.01)

(58) Field of Classification Search
CPC ......... G01B 11/14; G01S 17/42; G01S 17/86; G01S 17/89; G01S 17/894; G01S 7/4868;

(Continued)

(56) References Cited

U.S. PATENT DOCUMENTS

2002/0036765 A1 3/2002 McCaffrey et al.
2002/0052711 A1\* 5/2002 Aoyama ................. G01S 17/89
702/158

(Continued)

FOREIGN PATENT DOCUMENTS

CN 108474849 A 8/2018
CN 108603744 A 9/2018

(Continued)

OTHER PUBLICATIONS

An Office Action; "Notice of Reasons for Refusal," mailed by the Japanese Patent Office on May 16, 2023, which corresponds to Japanese Patent Application No. 2021-550378 and is related to U.S. Appl. No. 17/697,776; with English language translation.

(Continued)

*Primary Examiner* — Tri T Ton
(74) *Attorney, Agent, or Firm* — Studebaker & Brackett PC

(57) ABSTRACT

A processing apparatus includes a control unit that performs a control of performing an imaging operation by an imaging unit that images an imaging region, and a distance measurement operation in which a distance measurement unit performs distance measurement by emitting light to the imaging region and receiving reflected light of the light from the imaging region, an acquisition unit that acquires reflectivity information for specifying a reflectivity in the imaging region, and a change unit that changes irradiation energy of the light according to the reflectivity information acquired by the acquisition unit in a state in which the imaging operation and the distance measurement operation are performed.

25 Claims, 37 Drawing Sheets

(58) Field of Classification Search
CPC ........ H04N 23/56; H04N 23/61; H04N 23/63; H04N 23/667; H04N 23/671; H04N 23/74; G03B 13/36
See application file for complete search history.

(56) References Cited

U.S. PATENT DOCUMENTS

| | | | |
|---|---|---|---|
| 2008/0237445 A1 | 10/2008 | Ikeno et al. | |
| 2017/0045616 A1* | 2/2017 | Masuda | ................. H04N 23/71 |
| 2017/0061632 A1 | 3/2017 | Lindner et al. | |
| 2018/0270444 A1 | 9/2018 | Nakada | |
| 2018/0328719 A1 | 11/2018 | Masuda | |
| 2018/0329063 A1 | 11/2018 | Takemoto et al. | |
| 2019/0007592 A1 | 1/2019 | Otani et al. | |
| 2019/0220650 A1 | 7/2019 | Lindner et al. | |
| 2019/0346743 A1 | 11/2019 | Torobu | |
| 2020/0025932 A1* | 1/2020 | Saitou | ................... G01S 7/4868 |

FOREIGN PATENT DOCUMENTS

| | | |
|---|---|---|
| CN | 108886593 A | 11/2018 |
| JP | 2006-171120 A | 6/2006 |
| JP | 2008-241435 A | 10/2008 |
| JP | 2009-175821 A | 8/2009 |
| JP | 2011-149856 A | 8/2011 |
| JP | 2011-179925 A | 9/2011 |
| JP | 2016-090268 A | 5/2016 |
| JP | 6321145 B2 | 5/2018 |
| JP | 2018-152786 A | 9/2018 |
| JP | 2018-526641 A | 9/2018 |
| WO | 2018/142993 A1 | 8/2018 |
| WO | WO-2018180391 A1 * | 10/2018 ............. G01S 17/86 |

OTHER PUBLICATIONS

International Search Report issued in PCT/JP2020/028909; mailed Oct. 6, 2020.
Written Opinion of the International Searching Authority issued in PCT/JP2020/028909; mailed Oct. 6, 2020.
An Office Action; "Notice of Reasons for Refusal," mailed by the Japanese Patent Office on Jan. 10, 2023, which corresponds to Japanese Patent Application No. 2021-550378 and is related to U.S. Appl. No. 17/697,776; with English language translation.
An Office Action mailed by China National Intellectual Property Administration on Jun. 26, 2024, which corresponds to Chinese Patent Application No. 202080065719.7 and is related to U.S. Appl. No. 17/697,776; with English language translation.
An Office Action, "Notice of Reasons for Refusal," mailed by the Japanese Patent Office on Sep. 3, 2024, which corresponds to Japanese Patent Application No. 2023-145483 and is related to U.S. Appl. No. 17/697,776; with English language translation.

* cited by examiner

PROCESSING APPARATUS, ELECTRONIC APPARATUS, PROCESSING METHOD, AND PROGRAM

CROSS-REFERENCE TO RELATED APPLICATIONS

This application is a continuation application of International Application No. PCT/JP2020/028909, filed Jul. 28, 2020, the disclosure of which is incorporated herein by reference in its entirety. Further, this application claims priority under 35 USC 119 from Japanese Patent Application No. 2019-180563 filed Sep. 30, 2019, the disclosure of which is incorporated by reference herein.

BACKGROUND

1. Technical Field

The technology of the present disclosure relates to a processing apparatus, an electronic apparatus, a processing method, and a program.

2. Related Art

JP6321145B discloses a distance measurement device. The distance measurement device disclosed in JP6321145B includes an imaging unit which captures a subject image formed by an imaging optical system forming the subject image showing a subject; an emission unit which emits a directional light beam as light having directivity along an optical axis direction of the imaging optical system, in which the emission unit is able to adjust the emission intensity of the directional light beam and adjusts an emission intensity based on at least one of focusing state specification information or either one of subject brightness or exposure state specification information to emit the directional light beam; a light receiving unit which receives reflected light of the directional light beam from the subject; a derivation unit which derives a distance to the subject based on a timing at which the directional light beam is emitted by the emission unit and a timing at which the reflected light is received by the light receiving unit; an execution unit which executes at least one of focus adjustment of the imaging optical system with respect to the subject or exposure adjustment prior to imaging by the imaging unit; a reception unit which receives a two-stage pressing operation including a first pressing operation that is an imaging preparation instruction to make the execution unit start the execution of the at least one of the focus adjustment or the exposure adjustment and a second pressing operation that is an imaging instruction to make the execution unit start main exposure by the imaging unit; and a control unit which performs control such that the at least one of the focus adjustment or the exposure adjustment is executed by the execution unit in a case in which the first pressing operation is received by the reception unit, performs control such that execution of a distance measurement by the emission unit, the light receiving unit, and the derivation unit is started in a case in which the at least one of the focus adjustment or the exposure adjustment is executed, performs control such that a presentation unit, which present information, presents information relating to a result of the distance measurement in a state in which the first pressing operation is maintained after the distance measurement is completed, and then performs control such that the main exposure is performed by the imaging unit in a case in which the second pressing operation is successively received by the reception unit after the first pressing operation without a pressing operation being released at the reception unit.

JP2006-171120A discloses an imaging apparatus. The imaging apparatus disclosed in JP2006-171120A is an imaging apparatus that detects subject contrast and adjusts focus prior to an imaging operation, and comprises a first auxiliary light emitter that emits a subject with light having a relatively wide wavelength range for subject contrast detection, a second auxiliary light emitter that emits light having a relatively narrow wavelength range to the subject for subject contrast detection, and a switching unit that switches between the first auxiliary light emitter and the second auxiliary light emitter.

WO2018/142993A discloses a light emission control device. The light emission control device disclosed in WO2018/142993A comprises a light amount setting unit that sets a light amount of auto focus (AF) auxiliary light, and a light emission control unit that controls the light emission of the AF auxiliary light according to the setting by the light amount setting unit.

SUMMARY

One embodiment according to the technology of the present disclosure provides a processing apparatus, an electronic apparatus, a processing method, and a program, which can reduce an influence of reflected light for distance measurement on an imaging region image as compared to a case in which irradiation energy of light emitted for distance measurement is determined independently of the reflectivity in an imaging region.

A first aspect according to the technology of the present disclosure relates to a processing apparatus comprising a control unit that performs a control of performing an imaging operation by an imaging unit that images an imaging region, and a distance measurement operation in which a distance measurement unit performs distance measurement by emitting light to the imaging region and receiving reflected light of the light from the imaging region, an acquisition unit that acquires reflectivity information for specifying a reflectivity in the imaging region, and a change unit that changes irradiation energy of the light according to the reflectivity information acquired by the acquisition unit in a state in which the imaging operation and the distance measurement operation are performed.

A second aspect according to the technology of the present disclosure relates to the processing apparatus according to the first aspect, in which the reflectivity information is information based on an imaging region image obtained by imaging the imaging region by the imaging unit.

A third aspect according to the technology of the present disclosure relates to the processing apparatus according to the second aspect, in which the information based on the imaging region image is an image recognition result obtained by performing image recognition on the imaging region image by a recognition unit.

A fourth aspect according to the technology of the present disclosure relates to the processing apparatus according to the third aspect, in which the acquisition unit acquires the image recognition result based on a learning result obtained by machine learning a correspondence relationship between an image and a subject recognition result.

A fifth aspect according to the technology of the present disclosure relates to the processing apparatus according to the third or fourth aspect, in which in a case in which the image recognition result acquired by the acquisition unit is an image recognition result indicating that an image showing an object having a reflectivity equal to or more than a reference reflectivity is included in the imaging region image, the change unit makes the irradiation energy weaker than first reference irradiation energy.

A sixth aspect according to the technology of the present disclosure relates to the processing apparatus according to the fifth aspect, in which the object is a predetermined object as a glossy object.

A seventh aspect according to the technology of the present disclosure relates to the processing apparatus according to the sixth aspect, in which the predetermined object is a mirror-like object.

An eighth aspect according to the technology of the present disclosure relates to the processing apparatus according to any one of the first to seventh aspects, in which the change unit changes the irradiation energy of the light according to imaging scene indication information for indicating an imaging scene received by a reception unit capable of receiving the imaging scene indication information, and the reflectivity information acquired by the acquisition unit.

A ninth aspect according to the technology of the present disclosure relates to the processing apparatus according to the eighth aspect, in which in a case in which the imaging scene indicated by the imaging scene indication information received by the reception unit is a specific imaging scene having an imaging scene reflectivity equal to or more than a reference reflectivity, the change unit makes the irradiation energy weaker than second reference irradiation energy.

A tenth aspect according to the technology of the present disclosure relates to the processing apparatus according to any one of the first to seventh aspects, in which the change unit changes the irradiation energy of the light according to an imaging scene specified by a specifying unit capable of specifying the imaging scene based on an imaging region image, and the reflectivity information acquired by the acquisition unit.

An eleventh aspect according to the technology of the present disclosure relates to the processing apparatus according to the tenth aspect, in which in a case in which the imaging scene specified by the specifying unit is a specific imaging scene having an imaging scene reflectivity equal to or more than a reference reflectivity, the change unit makes the irradiation energy weaker than third reference irradiation energy.

A twelfth aspect according to the technology of the present disclosure relates to the processing apparatus according to any one of the first to eleventh aspects, in which the control unit performs a control of generating auxiliary light as the light from a light source, and receiving auxiliary reflected light of the auxiliary light from the imaging region by a light-receiving element, and the reflectivity information is information based on a light reception result of the auxiliary reflected light received by the light-receiving element.

A thirteenth aspect according to the technology of the present disclosure relates to the processing apparatus according to the twelfth aspect, in which the information based on the light reception result is information based on a light reception amount per unit time of the auxiliary reflected light received by the light-receiving element.

A fourteenth aspect according to the technology of the present disclosure relates to the processing apparatus according to the twelfth or thirteenth aspect, in which in a case in which the reflectivity specified by the reflectivity information acquired by the acquisition unit is equal to or more than a threshold value, the change unit makes the irradiation energy weaker than fourth reference irradiation energy.

A fifteenth aspect according to the technology of the present disclosure relates to the processing apparatus according to any one of the first to fourteenth aspects, in which the distance measurement unit includes a TOF camera.

A sixteenth aspect according to the technology of the present disclosure relates to the processing apparatus according to the fifteenth aspect, in which the control unit displays a distance image generated by the TOF camera on a display unit.

A seventeenth aspect according to the technology of the present disclosure relates to the processing apparatus according to the fifteenth or sixteenth aspect, in which the TOF camera has a plurality of photoelectric conversion pixels, and the distance measurement is performed by using the reflected light received only by at least one photoelectric conversion pixel included in a designated region among the plurality of photoelectric conversion pixels.

An eighteenth aspect according to the technology of the present disclosure relates to the processing apparatus according to the seventeenth aspect, in which the at least one photoelectric conversion pixel is a photoelectric conversion pixel at a position corresponding to a position of an image region designated in a screen in a state in which an imaging region image is displayed.

A nineteenth aspect according to the technology of the present disclosure relates to the processing apparatus according to any one of the first to eighteenth aspects, in which the change unit changes the irradiation energy according to a timing of main exposure performed during the imaging operation.

A twentieth aspect according to the technology of the present disclosure relates to the processing apparatus according to any one of the first to nineteenth aspects, in which the imaging operation includes an imaging operation for a live view image in which the imaging unit images the imaging region for a live view image.

A twenty-first aspect according to the technology of the present disclosure relates to the processing apparatus according to any one of the first to twentieth aspects, in which the distance measurement operation is a distance measurement operation for focusing by the imaging unit.

A twenty-second aspect according to the technology of the present disclosure relates to the processing apparatus according to the twenty-first aspect, in which the imaging unit performs focusing on the imaging region based on a distance measurement result obtained by the distance measurement performed by the distance measurement operation for focusing.

A twenty-third aspect according to the technology of the present disclosure relates to the processing apparatus according to any one of the first to twenty-second aspects, in which the light is a directional light beam.

A twenty-fourth aspect according to the technology of the present disclosure relates to an electronic apparatus comprising the processing apparatus according to any one of the first to twenty-third aspects, the imaging unit, and the distance measurement unit.

A twenty-fifth aspect according to the technology of the present disclosure relates to a processing method comprising performing a control of performing an imaging operation by an imaging unit that images an imaging region, and a distance measurement operation in which a distance measurement unit performs distance measurement by emitting light to the imaging region and receiving reflected light of the light from the imaging region, acquiring reflectivity information for specifying a reflectivity in the imaging region, and changing irradiation energy of the light according to the acquired reflectivity information in a state in which the imaging operation and the distance measurement operation are performed.

A twenty-sixth aspect according to the technology of the present disclosure relates to a program causing a computer to execute a process comprising performing a control of performing an imaging operation by an imaging unit that images an imaging region, and a distance measurement operation in which a distance measurement unit performs distance measurement by emitting light to the imaging region and receiving reflected light of the light from the imaging region, acquiring reflectivity information for specifying a reflectivity in the imaging region, and changing irradiation energy of the light according to the acquired reflectivity information in a state in which the imaging operation and the distance measurement operation are performed.

BRIEF DESCRIPTION OF THE DRAWINGS

Exemplary embodiments of the technology of the disclosure will be described in detail based on the following figures, wherein.

DETAILED DESCRIPTION

Hereinafter, an example of an embodiment of an imaging apparatus according to the technology of the present disclosure will be described with reference to the accompanying drawings.

First, the terms used in the following description will be described.

CPU refers to an abbreviation of "central processing unit". RAM refers to an abbreviation of "random access memory". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". SSD refers to an abbreviation of "solid state drive". USB refers to an abbreviation of "universal serial bus". HDD refers to an abbreviation of "hard disk drive". EEPROM refers to an abbreviation of "electrically erasable and programmable read only memory". EL refers to an abbreviation of "electro-luminescence". A/D refers to an abbreviation of "analog/digital". I/F refers to an abbreviation of "interface". UI refers to an abbreviation of "user interface". LTE refers to an abbreviation of "long term evolution". 5G refers to an abbreviation of "5th generation". LD refers to an abbreviation of "laser diode". IR refers to an abbreviation of "infrared". APD refers to an abbreviation of "avalanche photodiode". TOF refers to an abbreviation of "time of flight". fps refers to an abbreviation of "frame per second". LED refers to an abbreviation of "light emitting diode". ROI refers to an abbreviation of "region of interest". LAN refers to an abbreviation of "local area network".

In the description of the present specification, "horizontal" means the horizontality in the sense of including an error generally allowed in the technical field to which the technology of the present disclosure belongs, in addition to the exact horizontality. In the description of the present specification, "parallel" means the parallelism in the sense of including an error generally allowed in the technical field to which the technology of the present disclosure belongs, in addition to the exact parallelism. In the description of the present specification, "vertical" means the verticality in the sense of including an error generally allowed in the technical field to which the technology of the present disclosure belongs, in addition to the exact verticality. In the description of the present specification, "same" means the same in the sense of including an error generally allowed in the technical field to which the technology of the present disclosure belongs, in addition to the exact same.

Figure 1:
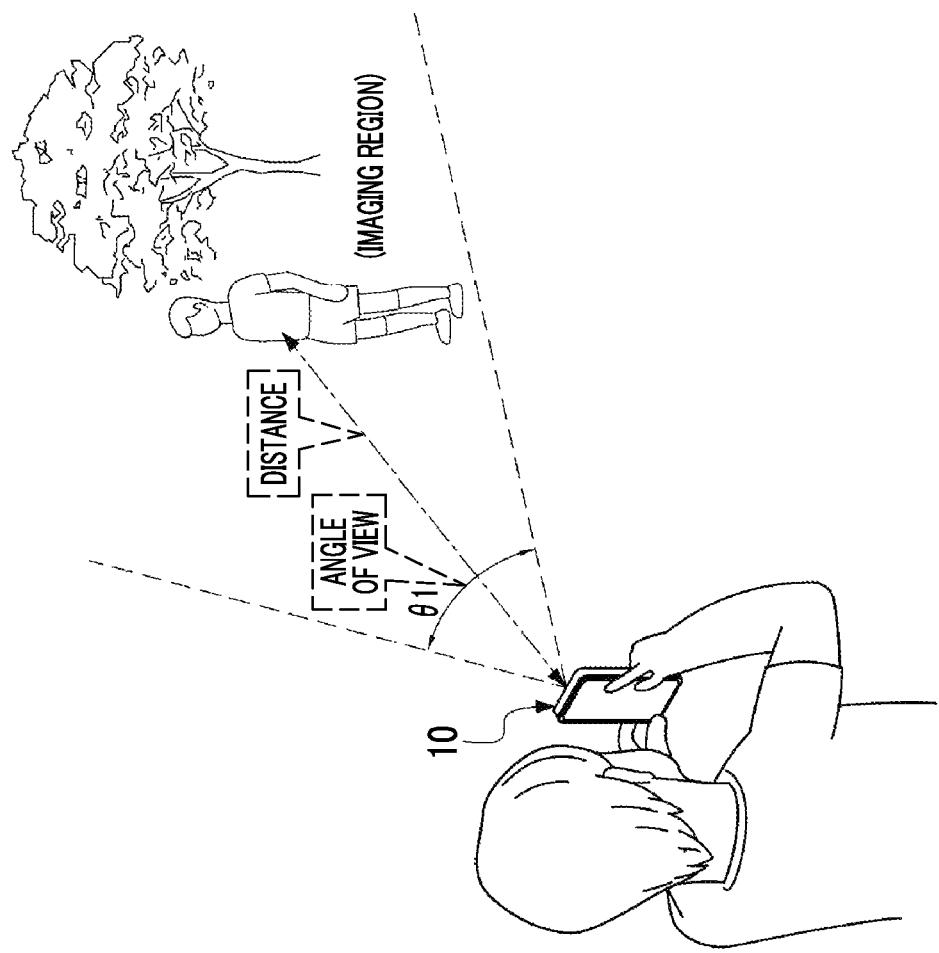
FIG. 1 is a schematic perspective view showing an example of a usage aspect of a smart device according to an embodiment.

As shown in FIG. 1 as an example, a smart device 10 performs an imaging operation of imaging an imaging region defined by an angle of view θ1 (hereinafter, also simply referred to as an "imaging operation"), and a distance measurement operation of performing distance measurement by emitting a laser beam to the imaging region and receiving reflected light of the laser beam from the imaging region (hereinafter, also simply referred to as a "distance measurement operation"). The laser beam is an example of a "directional light beam" according to the technology of the present disclosure.

In the present embodiment, the "distance measurement" refers to processing of measuring a distance from the smart device 10 to a distance measurement target in the imaging region. In addition, here, the "distance measurement target" refers to an object that reflects the laser beam, and in the example shown in FIG. 1, a person and a tree are shown as the distance measurement targets in the imaging region. Note that examples of the smart device 10 include a smartphone or a tablet terminal, which is an electronic apparatus having an imaging function.

Figure 2:
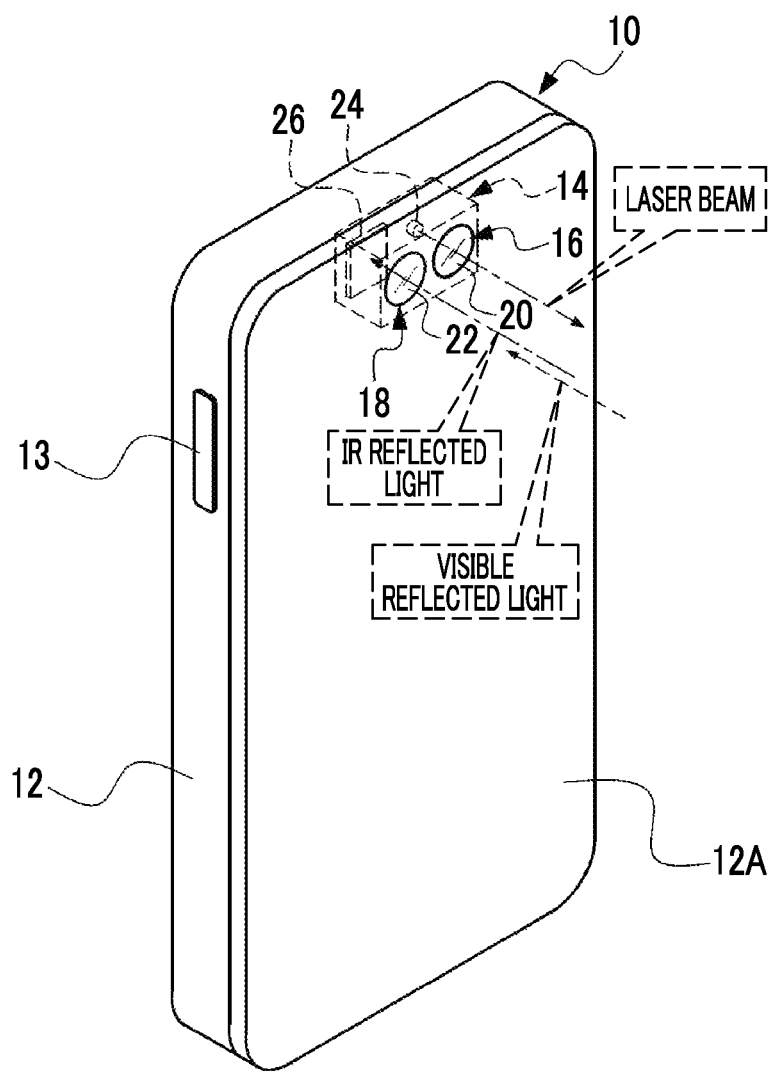
FIG. 2 is a rear perspective view showing an example of the appearance of a rear side of the smart device according to the embodiment.

As shown in FIG. 2 as an example, the smart device 10 comprises a housing 12. A distance measurement imaging apparatus 14 is housed in the housing 12. The distance measurement imaging apparatus 14 comprises a light irradiator 16 and a light receiver 18. The light irradiator 16 comprises an LD 24, and the light receiver 18 comprises a photoelectric conversion element 26. In the smart device 10, the imaging operation and the distance measurement operation are performed by the distance measurement imaging apparatus 14. Note that the distance measurement imaging apparatus 14 is an example of an "imaging unit (imaging apparatus)" and a "distance measurement unit (distance measurement device)" according to the technology of the present disclosure.

An instruction key 13 is disposed on a side surface of the smart device 10. The instruction key 13 receives various instructions. Here, the "various instructions" refers to, for example, an instruction for displaying a menu screen on which various menus can be selected, an instruction for selecting one or a plurality of menus, an instruction for confirming a selected content, and an instruction for deleting the selected content.

Light transmitting windows 20 and 22 are provided in an upper left portion of a rear surface 12A of the housing 12 in a case in which the smart device 10 is put into a vertically placed state (an upper left portion of the rear view of the smart device 10 in the vertically placed state). The light transmitting windows 20 and 22 are optical elements having transmittance (for example, a lens), are arranged at a predetermined interval (for example, an interval of several millimeters) along a horizontal direction, and are exposed from the rear surface 12A. The light irradiator 16 emits the laser beam emitted from the LD 24 to the distance measurement target through the light transmitting window 20. In the present embodiment, the laser beam having an infrared wavelength range is adopted. However, the wavelength range of the laser beam is not limited to this, and the laser beam having another wavelength range may be used.

The light receiver 18 takes in IR reflected light through the light transmitting window 22. The IR reflected light refers to the reflected light of the laser beam emitted to the distance measurement target by the light irradiator 16. In addition, the light receiver 18 takes in visible reflected light through the light transmitting window 22. The visible reflected light refers to the reflected light of the visible light (for example, the visible light included in sunlight) emitted to the imaging region. Note that, in the following, for convenience of description, in a case in which the distinction is not necessary, the IR reflected light and the visible reflected light are simply referred to as "reflected light".

The light receiver 18 comprises the photoelectric conversion element 26, and the photoelectric conversion element 26 receives the reflected light taken into the light receiver 18 through the light transmitting window 22, and outputs an electric signal according to a light amount of the received reflected light.

Figure 3:
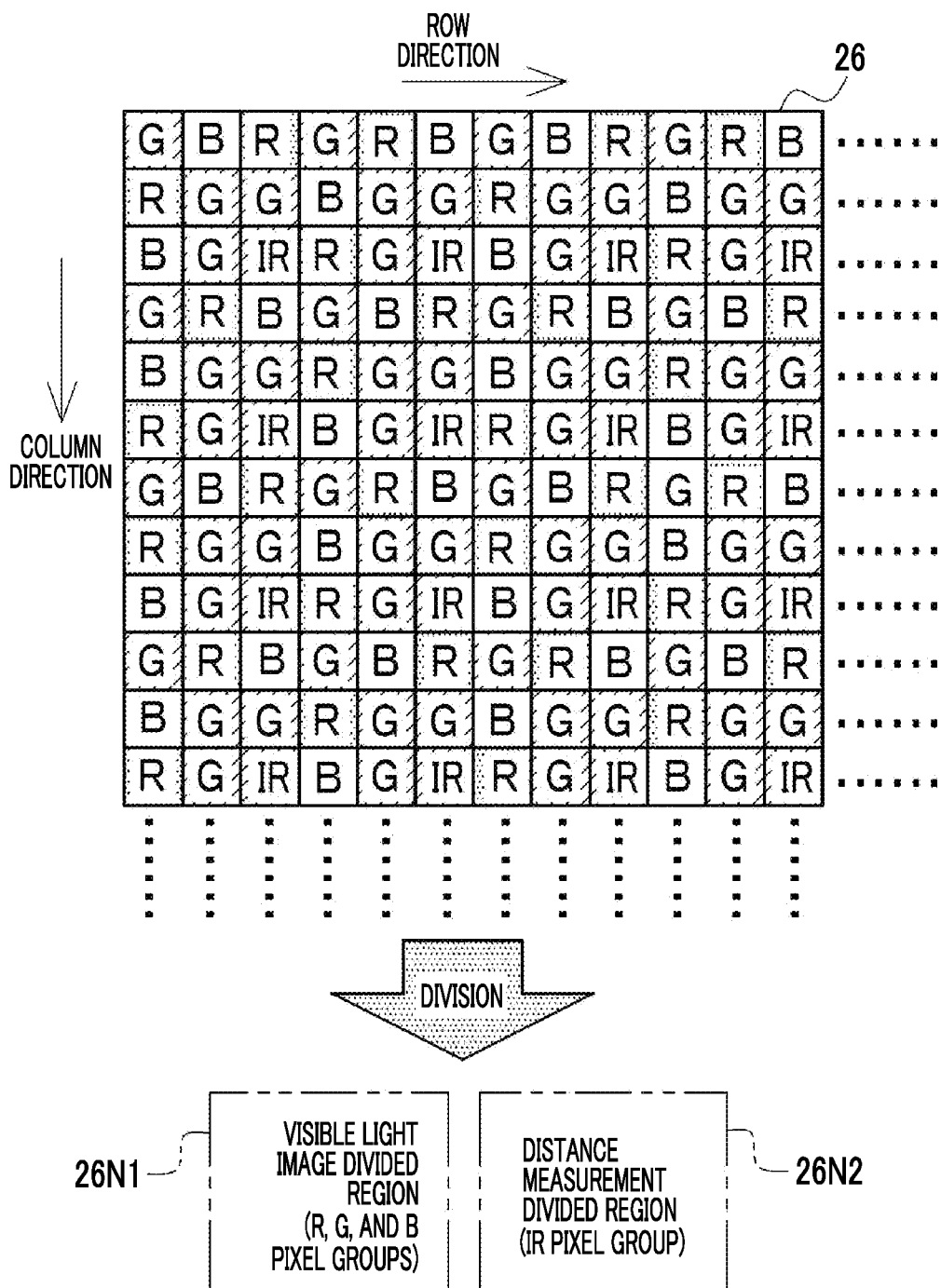
FIG. 3 is a schematic perspective view showing an example of a structure of a photoelectric conversion element provided in the smart device according to the embodiment.

As shown in FIG. 3 as an example, the photoelectric conversion element 26 has a plurality of photodiodes arranged in a matrix. Examples of the plurality of photodiodes include a photodiode for "4896×3265" pixels.

A color filter is disposed in each photodiode included in the photoelectric conversion element 26. The color filters include a green (G) filter corresponding to a G wavelength range, which contributes most to obtaining a brightness signal, a red (R) filter corresponding to an R wavelength range, a blue (B) filter corresponding to a B wavelength range, and an infrared (IR) filter corresponding to an IR wavelength range. Note that in the present embodiment, the G filter, the R filter, and the B filter also have a function as an infrared light cut filter that cuts infrared light. In addition, in the following, for convenience of description, in a case in which the distinction is not necessary, the G filter, the R filter, and the B filter are also referred to as a "visible light filter".

The photoelectric conversion element 26 has an R pixel, a G pixel, a B pixel, and an IR pixel. The R pixel is a pixel corresponding to the photodiode in which the R filter is disposed, the G pixel is a pixel corresponding to the photodiode in which the G filter is disposed, the B pixel is a pixel corresponding to the photodiode in which the B filter is disposed, and the IR pixel is a pixel corresponding to the photodiode in which the IR filter is disposed. The R pixels, the G pixels, the B pixels, and the IR pixels are arranged in each of a row direction (horizontal direction) and a column direction (vertical direction) with a predetermined periodicity. In the present embodiment, the array of the R pixels, the G pixels, the B pixels, and the IR pixels is an array obtained by replacing some G pixels with the IR pixels in the X-Trans (registered trademark) array. The IR pixels are arranged along the row direction and the column direction with a specific periodicity.

Note that, here, the array based on the X-trans array has been described as an example of the array of the R pixels, the G pixels, the B pixels, and the IR pixels, but the technology of the present disclosure is not limited to this, the array of the R pixels, the G pixels, the B pixels, and the IR pixels may be the array based on other arrays, such as Bayer array or honeycomb (registered trademark) array.

In addition, here, among the arrays generally known as the array of the R pixels, the G pixels, and the B pixels, an array obtained by replacing some G pixels with the IR pixels has been described as an example of the array of the R pixels, the G pixels, the B pixels, and the IR pixels, but the technology of the present disclosure is not limited to this. For example, each color filter corresponding to each of the R pixel, the G pixel, and the B pixel (hereinafter, these are also referred to as a "visible light pixel") is set as a color filter that also transmits the infrared light, and a pair of photodiodes of a photodiode for the visible light pixel and a photodiode for the IR pixel (for example, InGaAs APD) may be disposed for one color filter.

In the present embodiment, the photoelectric conversion element 26 is divided into two regions. That is, the photoelectric conversion element 26 has a visible light image divided region 26N1 and a distance measurement divided region 26N2. The visible light image divided region 26N1 is a visible light pixel group including a plurality of visible light pixels, and is used for generating the visible light image. The distance measurement divided region 26N2 is an IR pixel group including a plurality of IR pixels and is used for the distance measurement. The visible light image divided region 26N1 receives the visible reflected light and outputs the electric signal according to the light reception amount. The distance measurement divided region 26N2 receives the IR reflected light and outputs the electric signal according to the light reception amount.

Figure 4:
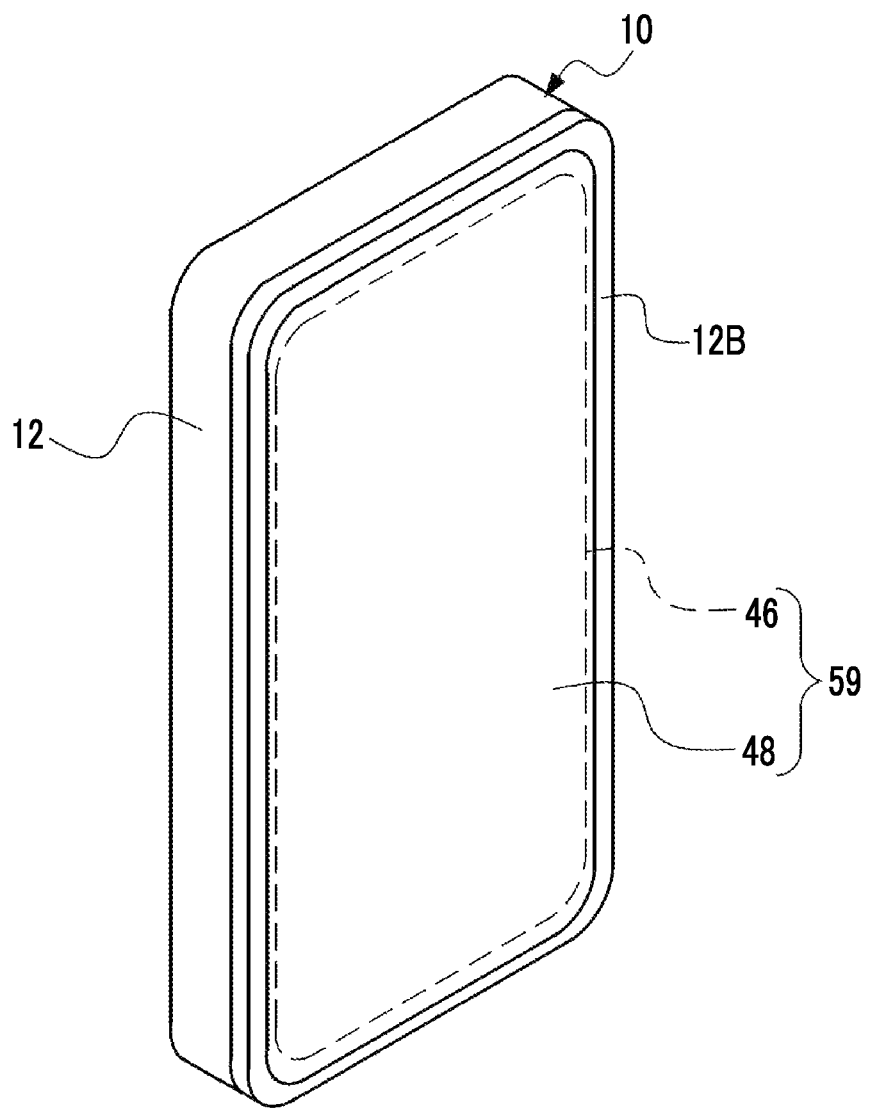
FIG. 4 is a front perspective view showing an example of the appearance of a front side of the smart device shown in FIG. 2.

As shown in FIG. 4 as an example, a touch panel display 59 is provided on a front surface 12B of the housing 12. The touch panel display 59 comprises a display 46 and a touch panel 48. Examples of the display 46 include an organic EL display. The display 46 may not be the organic EL display, but may be another type of display, such as a liquid crystal display or an inorganic EL display. Note that the display 46 is an example of a "display unit (display)" according to the technology of the present disclosure. In addition, the touch panel 48 is an example of a "reception unit (reception device (acceptor))" according to the technology of the present disclosure.

The display 46 displays an image (for example, a live view image and a reproduced image), text information, and the like. The touch panel 48 is a transmissive touch panel and is superimposed on a surface of a display region of the display 46. The touch panel 48 receives an instruction from a user by detecting contact with an indicator, such as a finger or a stylus pen. Note that, here, examples of the touch panel display 59 include an out-cell type touch panel display in which the touch panel 48 is superimposed on the surface of the display region of the display 46, but this is merely an example. For example, an on-cell type or in-cell type touch panel display can be applied as the touch panel display 59.

Figure 5:
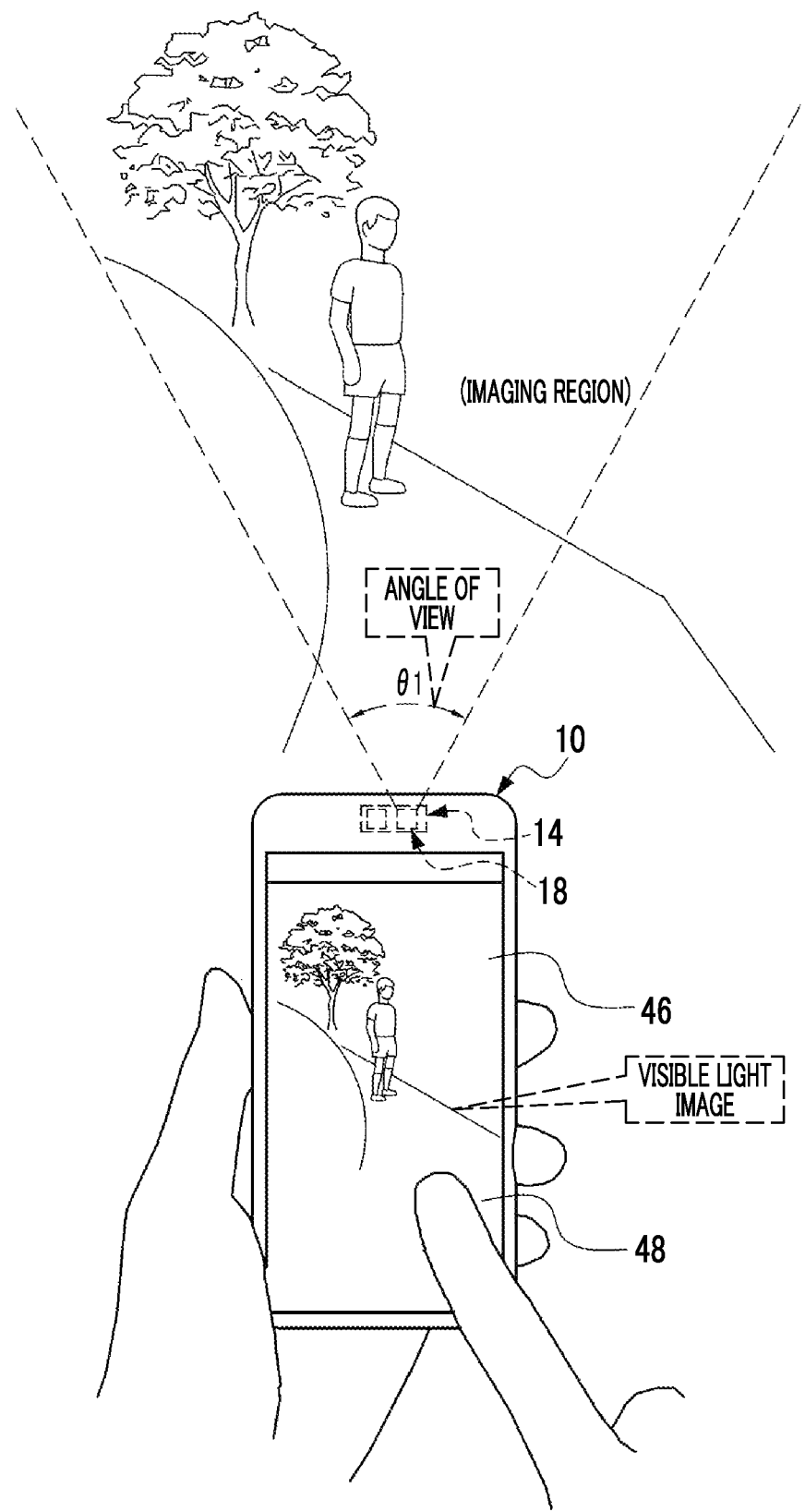
FIG. 5 is a conceptual diagram showing an example of an aspect in which an imaging region is imaged by a distance measurement imaging apparatus provided in the smart device according to the embodiment and a visible light image is displayed on a display.

As shown in FIG. 5 as an example, in the smart device 10, in a case in which an instruction for starting imaging is received by the touch panel 48, the imaging region is imaged by the light receiver 18. That is, the light receiver 18 receives the visible reflected light and generates the visible light image showing the imaging region as an image according to the received visible reflected light. The visible light image is an example of an "imaging region image" according to the technology of the present disclosure.

The visible light image is displayed on the display 46 as the live view image or a still image in response to the instruction received by the touch panel 48. In the example shown in FIG. 5, the imaging region is defined by the angle of view θ1. The angle of view θ1 is changed in response to the instruction received by the touch panel 48.

Figure 6:
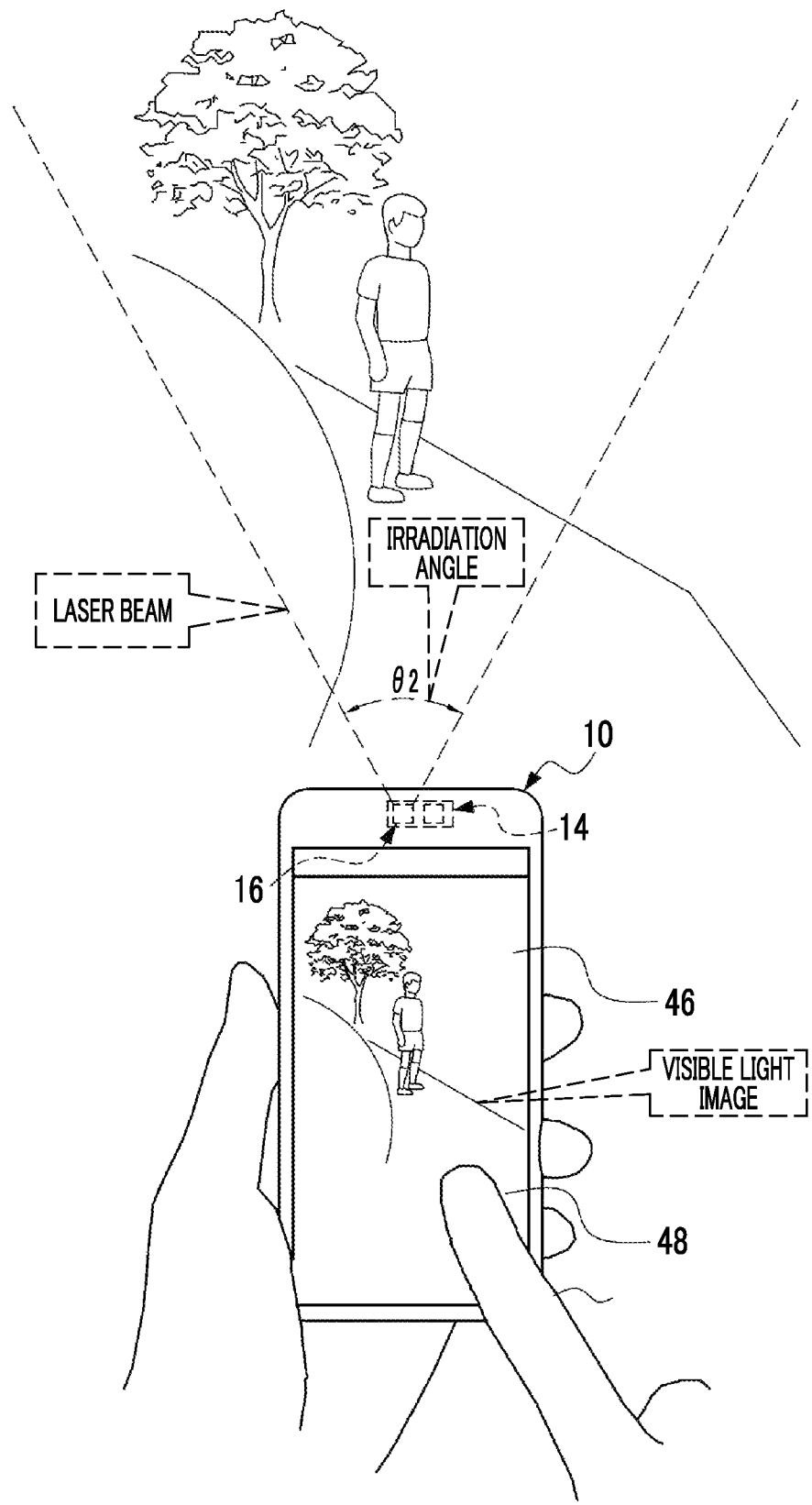
FIG. 6 is a conceptual diagram showing an example of an aspect in which a laser beam is emitted to the imaging region by the distance measurement imaging apparatus provided in the smart device according to the embodiment.

As shown in FIG. 6 as an example, in the smart device 10, in a case in which an instruction for starting the distance measurement (hereinafter, also referred to as "distance measurement start instruction") is received by the touch panel 48, the laser beam is emitted by the light irradiator 16. An angle at which the laser beam is emitted (hereinafter, also referred to as an "irradiation angle") is θ2, and the irradiation angle θ2 is changed in response to the instruction received by the touch panel 48. Note that in the example shown in FIG. 6, the aspect example has been described in which the distance measurement is started in response to the distance measurement start instruction received by the touch panel 48 in a state in which the visible light image is displayed as the live view image on the display 46, but the technology of the present disclosure is not limited to this. For example, the distance measurement may be started in a case in which the touch panel 48 receives the distance measurement start instruction in a state in which the visible light image is not displayed on the display 46.

In the smart device 10, the distance from the smart device 10 to the distance measurement target is measured based on the time required from the emission of the laser beam by the light irradiator 16 to the reception of the IR reflected light by the distance measurement divided region 26N2 (see FIG. 3) of the light receiver 18, and a light speed. For example, in a case in which the distance to the distance measurement target is defined as "L", the light speed is defined as "c", and the time required from the emission of the laser beam by the light irradiator 16 to the reception of the IR reflected light by the distance measurement divided region 26N2 is defined as "t", the distance L is calculated according to the expression "$L = c \times t \times 0.5$".

Figure 7:
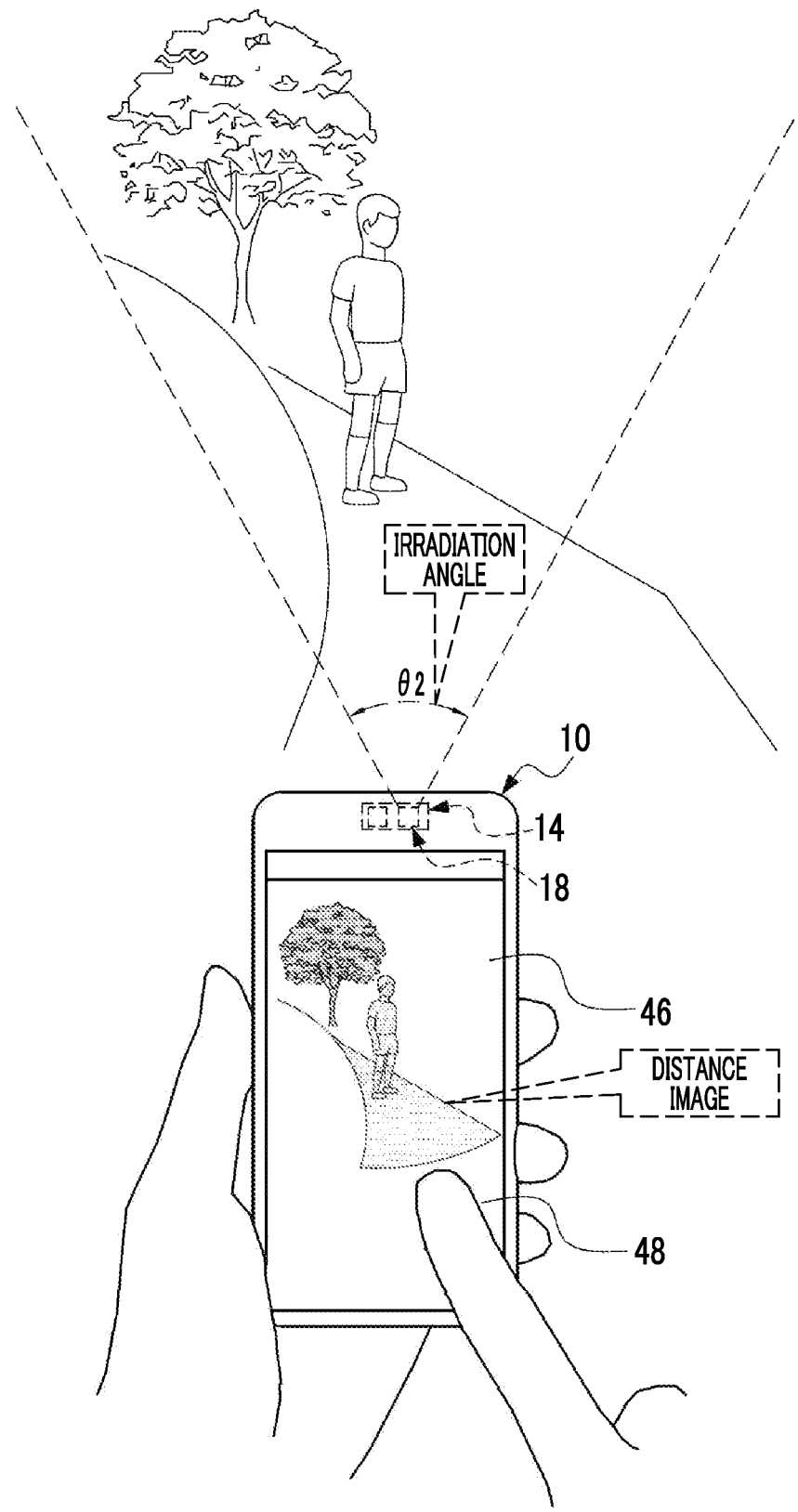
FIG. 7 is a conceptual diagram showing an example of an aspect in which the distance measurement imaging apparatus provided in the smart device according to the embodiment performs distance measurement with the imaging region as a distance measurement target, and a distance measurement result is displayed as a distance image on the display.

As shown in FIG. 7 as an example, in the smart device 10, the IR reflected light is received by each of the plurality of IR pixels included in the distance measurement divided region 26N2, and thus distance measurement is performed for each IR pixel. Moreover, a distance measurement result for each IR pixel is displayed on the display 46 as the distance image. Here, the distance image refers to an image in which the distance to the distance measurement target measured for each IR pixel is represented by color and/or shading.

Figure 8:
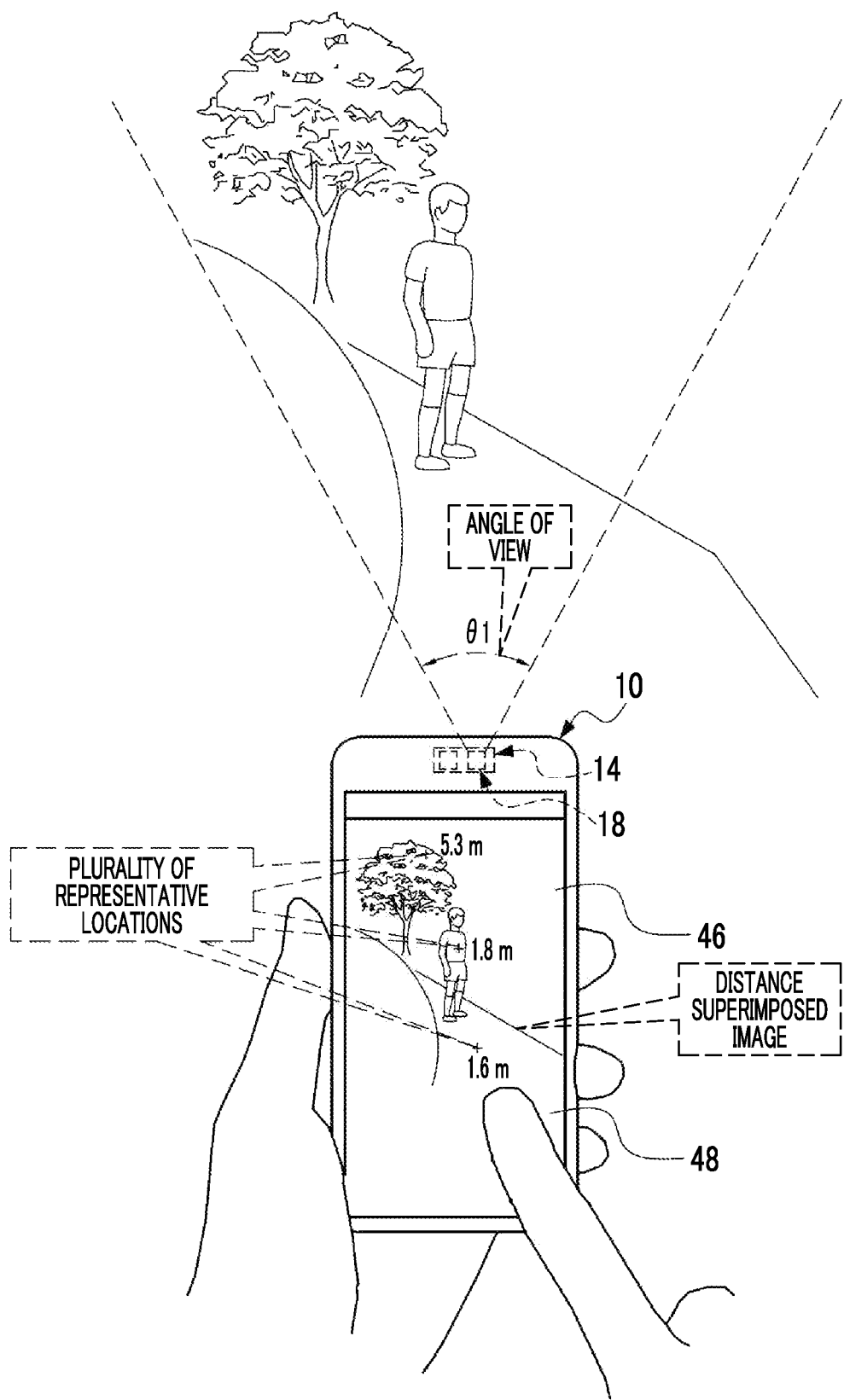
FIG. 8 is a conceptual diagram showing an example of an aspect in which the distance measurement imaging apparatus provided in the smart device according to the embodiment performs distance measurement with the imaging region as a distance measurement target, and a distance superimposed image reflecting the distance measurement result is displayed as the distance image on the display.

In the smart device 10, the distance measurement result is displayed on the display 46 as the distance image or the distance superimposed image in response to the instruction received by the touch panel 48. In the example shown in FIG. 8, the distance superimposed image in which the distance superimposed image is displayed on the display 46 is an image obtained by superimposing numerical values (in the example shown in FIG. 8, 1.6 m, 1.8 m, and 5.3 m) indicating the distance measurement result on the visible light image (for example, the live view image). For example, the distance from the smart device 10 to each of a plurality of representative locations (three locations in the example shown in FIG. 8) in the imaging region is displayed on the display 46 in a state of being displayed in the visible light image. Examples of the plurality of representative locations include a plurality of locations in which a difference between the contrasts is equal to or more than a predetermined value among specific subjects in the imaging region (for example, a subject included in a center region of the screen and/or a human being).

Figure 9:
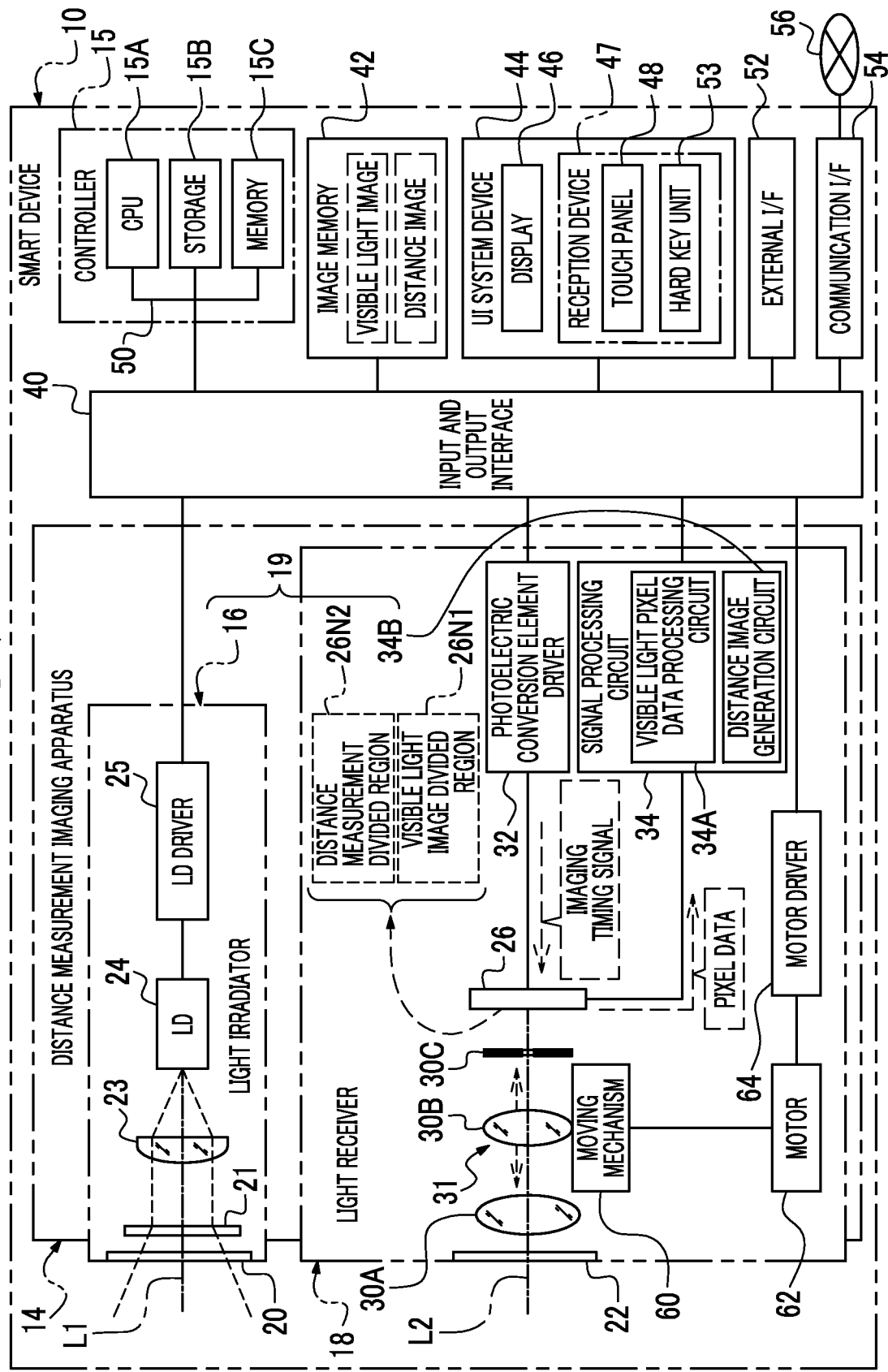
FIG. 9 is a block diagram showing an example of a hardware configuration of an electric system of the smart device according to the embodiment.

As shown in FIG. 9 as an example, in addition to the light irradiator 16 and the light receiver 18, the smart device 10 comprises a controller 15, an input and output interface 40, an image memory 42, a UI system device 44, an external I/F 52, and a communication I/F 54. Note that the controller 15 is an example of a "processing apparatus" and a "computer" according to the technology of the present disclosure.

The controller 15 comprises a CPU 15A, a storage 15B, and a memory 15C. The CPU 15A is an example of a "processor", a "recognition processor", and a "specific processor" according to the technology of the present disclosure, and the memory 15C is an example of a "memory" according to the technology of the present disclosure. The CPU 15A, the storage 15B, and the memory 15C are connected via a bus 50, and the bus 50 is connected to the input and output interface 40. Note that, in the example shown in FIG. 9, one bus is shown as the bus 50 for convenience of illustration, but a plurality of buses may be used. The bus 50 may be a serial bus, or may be a parallel bus, which includes a data bus, an address bus, a control bus, and the like.

Various parameters and various programs are stored in the storage 15B. The storage 15B is a non-volatile storage device. Here, examples of the storage 15B include a flash memory. The flash memory is merely an example, and examples of the storage 15B include various non-volatile memories, such as a magnetoresistive memory and/or a ferroelectric memory in place of the flash memory or in combination with the flash memory. In addition, the non-volatile storage device may be EEPROM, HDD, and/or SSD. In addition, the memory 15C temporarily stores various pieces of information and is used as a work memory. Examples of the memory 15C include the RAM, but the technology of the present disclosure is not limited to this, and other types of storage devices may be used.

Various programs are stored in the storage 15B. The CPU 15A reads out a necessary program from the storage 15B, and executes the read out program on the memory 15C. The CPU 15A controls the entire smart device 10 according to the program executed on the memory 15C.

A plurality of devices are connected to the input and output interface 40, and the input and output interface 40 controls the exchange of various pieces of information between the plurality of devices. In the example shown in FIG. 9, as the plurality of devices connected to the input and output interface 40, the controller 15, the light irradiator 16, the light receiver 18, the image memory 42, the UI system device 44, the external I/F 52, and the communication I/F 54 are shown.

The external I/F 52 controls the exchange of various pieces of information with and from a device present outside the smart device 10 (hereinafter, also referred to as an "external device"). Examples of the external I/F 52 include a USB interface. The external device (not shown), such as the smart device, a personal computer, a server, a USB memory, a memory card, and/or a printer, can be directly or indirectly connected to the USB interface.

The communication I/F 54 has a communication function, such as LTE, 5G, wireless LAN, and/or Bluetooth (registered trademark), and controls the exchange of various pieces of information between the external device and the CPU 15A. For example, the communication I/F 54 is communicably connected to a network 56 (for example, the Internet) via a base station (not shown), and controls the exchange of various pieces of information between the external device and the CPU 15A on the network 56.

The UI system device 44 comprises the display 46, and the CPU 15A displays various pieces of information on the display 46. In addition, the UI system device 44 comprises a reception device 47. The reception device 47 comprises the touch panel 48 and a hard key unit 53. The hard key unit 53 is at least one hard key including the instruction key 13 (see FIG. 2). The CPU 15A is operated in response to various instructions received by the touch panel 48. Note that although the hard key unit 53 is provided in the UI system device 44 here, the technology of the present disclosure is not limited to this, and for example, the hard key unit 53 may be connected to the external I/F 52.

The light irradiator 16 comprises the light transmitting window 20, a beam expander 21, a collimating lens 23, the LD 24, and an LD driver 25, and the light transmitting window 20, the beam expander 21, the collimating lens 23 are disposed in this order from an imaging region side (object side) to the LD 24 along an optical axis L1. The LD driver 25 is connected to the LD 24 and the input and output interface 40, and drives the LD 24 in response to the instruction of the CPU 15A to emit the laser beam from the LD 24.

The laser beam emitted from the LD 24 is converted into parallel light by the collimating lens 23, then a light diameter thereof is expanded by the beam expander 21, and the laser beam is emitted from the light transmitting window 20 to the distance measurement target.

The light receiver 18 comprises the light transmitting window 22, an objective lens 30A, a focus lens 30B, a stop 30C, the photoelectric conversion element 26, a photoelectric conversion element driver 32, and a signal processing circuit 34. In the light receiver 18, the light transmitting window 22, the objective lens 30A, the focus lens 30B, and the stop 30C are disposed in this order from the imaging region side (object side) to the photoelectric conversion element 26 along an optical axis L2. The photoelectric conversion element driver 32 is connected to the photoelectric conversion element 26 and the input and output interface 40, and drives the photoelectric conversion element 26 in response to the instruction of the CPU 15A. For example, under the control of the CPU 15A, the photoelectric conversion element driver 32 supplies an imaging timing signal defining the timing of imaging performed by the photoelectric conversion element 26 to the photoelectric conversion element 26. The photoelectric conversion element 26 performs resetting, exposure, and output of the electric signal according to the imaging timing signal supplied from the photoelectric conversion element driver 32. Examples of the imaging timing signal include a vertical synchronizing signal and a horizontal synchronizing signal.

The light receiver 18 comprises a focus control mechanism 31. The focus control mechanism 31 comprises a focus lens 30B, a moving mechanism 60, a motor 62, and a motor driver 64. The focus lens 30B is slidably supported along the optical axis L2 by the moving mechanism 60. The motor 62 is connected to the moving mechanism 60 and the motor driver 64. The motor driver 64 is connected to the input and output interface 40, and drives the motor 62 in response to the instruction from the CPU 15A. The moving mechanism 60 is connected to a drive shaft (not shown) of the motor 62, and receives power from the motor 62 to selectively move the focus lens 30B between the object side and an image side along the optical axis L2. That is, the CPU 15A adjusts a focus position by controlling the drive of the motor 62 via the motor driver 64. Here, the "focus position" refers to a position of the focus lens 30B on the optical axis L2 in a state of being focused (for example, a state in which the contrast of the visible light image is maximized or a state in which a predetermined subject depth of field is realized). Hereinafter, for convenience of description, the control of aligning the focus lens 30B with the focus position is also referred to as a "focus control".

The stop 30C is a fixed stop of which an opening is not changed. In a case of a fixed stop, the exposure adjustment is performed by an electronic shutter of the photoelectric conversion element 26. The stop 30C may be a variable stop instead of a fixed stop. Note that the objective lens 30A, the focus lens 30B, and the stop 30C provided in the light receiver 18 are merely examples, and the technology of the present disclosure is established even in a case in which the configuration of the lens and/or the position of the stop 30C are changed.

The reflected light is incident on the light receiver 18 from the light transmitting window 22. The reflected light incident on the light transmitting window 22 is imaged on the photoelectric conversion element 26 via the objective lens 30A, the focus lens 30B, and the stop 30C.

The photoelectric conversion element 26 is connected to the signal processing circuit 34, and outputs, to the signal processing circuit 34, pixel data indicating a pixel value for each pixel of the visible light pixel and the IR pixel. The signal processing circuit 34 digitizes the pixel data by performing A/D conversion on the pixel data input from the photoelectric conversion element 26, and performs various pieces of signal processing on the digitized pixel data.

The signal processing circuit 34 comprises a visible light pixel data processing circuit 34A and a distance image generation circuit 34B. The visible light pixel data processing circuit 34A generates the visible light image by performing known signal processing, such as white balance adjustment, sharpness adjustment, gamma correction, color space conversion processing, and color difference correction on the pixel data of the visible light pixel. Moreover, the visible light pixel data processing circuit 34A stores the visible light image in the image memory 42. Note that the visible light image in the image memory 42 is updated by overwriting and storing one frame of the visible light image in the image memory 42.

The distance measurement imaging apparatus 14 comprises a TOF camera 19. The TOF camera 19 comprises the light irradiator 16, the distance measurement divided region 26N2, and the distance image generation circuit 34B. The distance image generation circuit 34B acquires, from the CPU 15A, an emission timing signal indicating the timing at which the laser beam is emitted from the LD 24 (hereinafter, also referred to as "emission timing"). The distance image generation circuit 34B measures the distance from the smart device 10 to the distance measurement target for each IR pixel based on the emission timing indicated by the emission timing signal, and timing at which the IR reflected light is received by each IR pixel (hereinafter, also referred to as "light reception timing"). Moreover, the distance image generation circuit 34B generates the distance image based on the measurement result for each IR pixel, and stores the generated distance image in the image memory 42. Note that the distance image in the image memory 42 is updated by overwriting and storing the distance image for one frame in the image memory 42.

Figure 10:
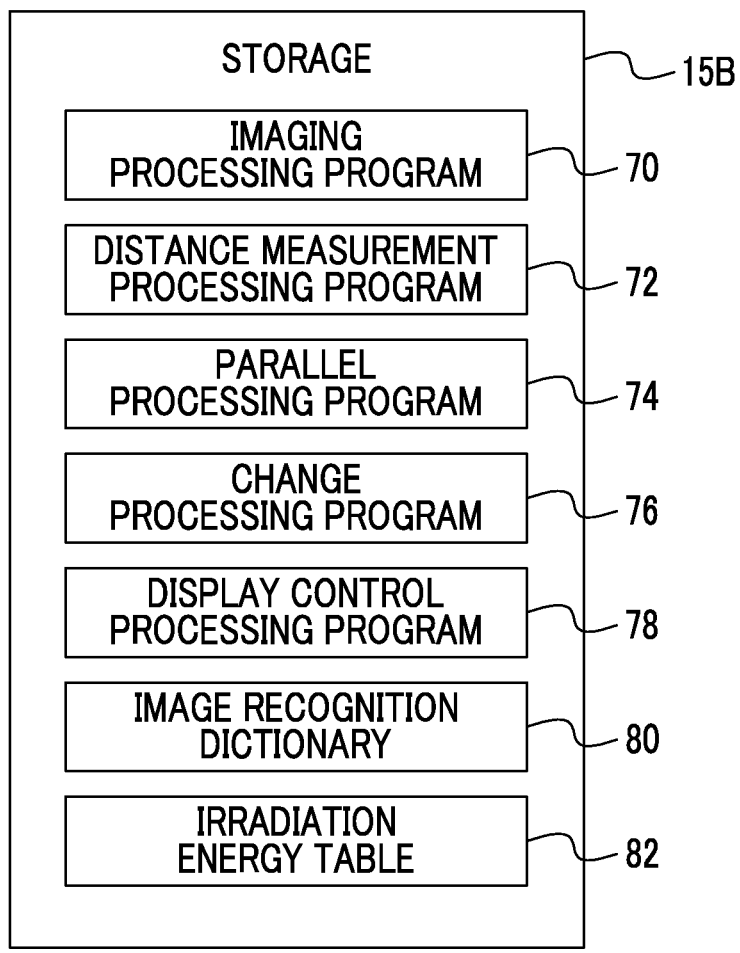
FIG. 10 is a conceptual diagram showing an example of a storage content of a storage provided in the smart device according to the embodiment.

As shown in FIG. 10 as an example, the storage 15B stores an imaging processing program 70, a distance measurement processing program 72, a parallel processing program 74, a change processing program 76, a display control processing program 78, an image recognition dictionary 80, and an irradiation energy table 82. Note that, in the following, for convenience of description, in a case in which the distinction is not necessary, the imaging processing program 70, the distance measurement processing program 72, the parallel processing program 74, the change processing program 76, and the display control processing program 78 are referred to as a "distance measurement imaging processing program".

By the way, according to the related art, the IR reflected light is received by the IR pixel, and the distance from the smart device 10 to the distance measurement target is measured based on the emission timing and the light reception timing. Ideally, the IR reflected light is completely cut by the visible light filter. However, it is difficult to completely cut the IR reflected light by the visible light filter depending on the intensity of the IR reflected light. In this case, due to the IR reflected light reaching the visible light pixel, there is a risk that the IR reflected light appears as noise in the visible light image, and has an influence on an image quality of the visible light image.

As a method of preventing the IR reflected light from appearing as noise in the visible light image, there is a method of stopping the distance measurement operation in a period during which the imaging operation is performed (for example, a period during which the exposure is performed by the photoelectric conversion element 26) in a case in which the distance to the subject is equal to or less than a predetermined distance (for example, 0.5 m).

However, in a case in which the distance measurement result is used for the focus control, in a case in which the distance measurement operation is always stopped in the period during which the imaging operation is performed, the distance measurement result cannot be reflected in the focus control while the distance measurement operation is stopped. Therefore, there is a concern that the accuracy of the focus control is reduced as compared to a case in which the distance measurement operation is always performed. In particular, in a case in which the subject that continues to move is the distance measurement target, there is a risk that focus control is performed according to the distance measurement result that does not match the current situation. In addition, depending on the imaging scene, even in a case in which the distance to the subject is the predetermined distance, the IR reflected light may not appear as noise in the visible light image depending on the reflectivity of the subject, but even in such a case, the distance measurement operation is stopped in a case in which the distance to the subject is equal to or less than the predetermined distance.

Figure 11:
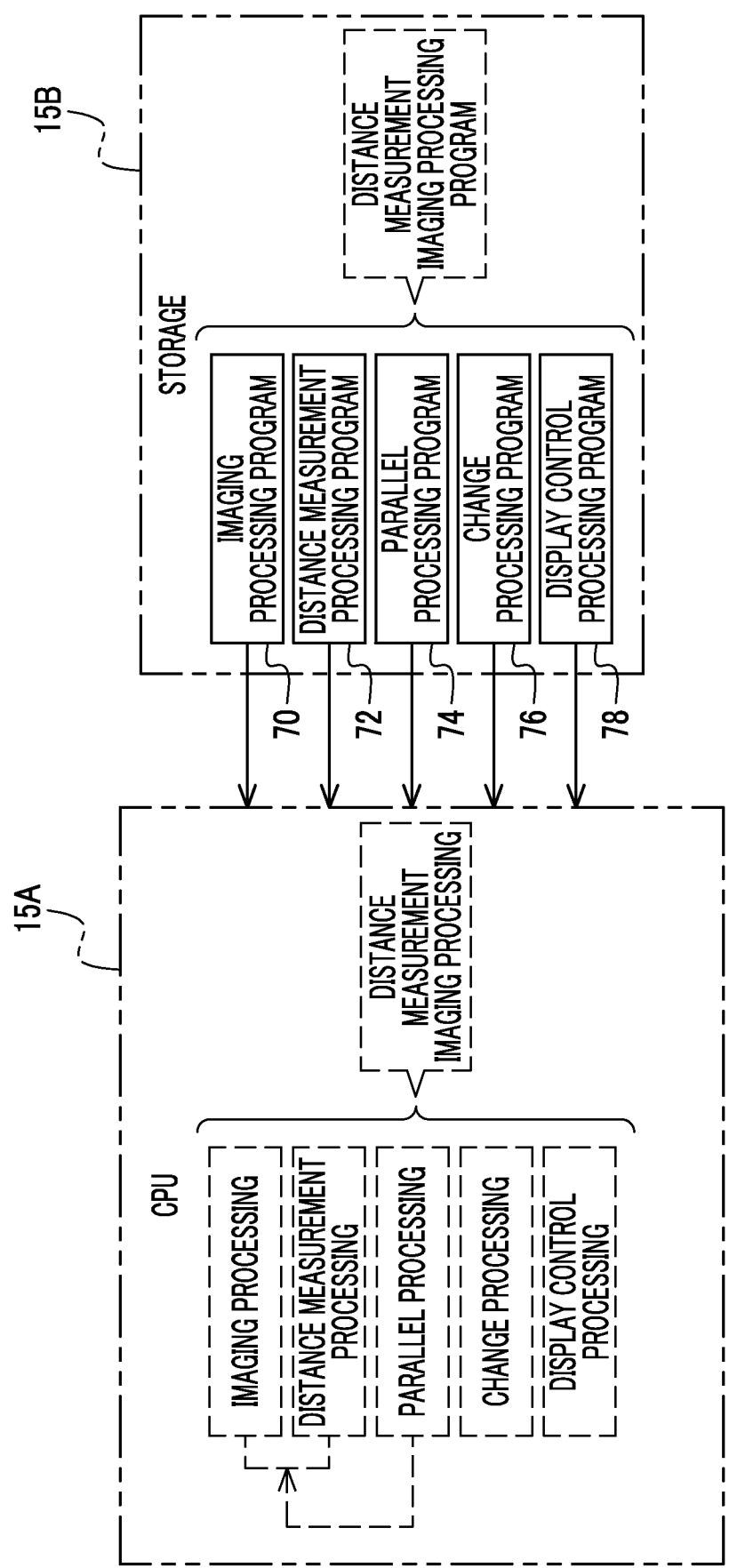
FIG. 11 is a conceptual diagram showing an example of details of distance measurement imaging processing executed by a CPU provided in the smart device according to the embodiment.

Therefore, in the smart device 10, as shown in FIG. 11 as an example, the CPU 15A reads out the distance measurement imaging processing program from the storage 15B, and executes the distance measurement imaging processing according to the read out distance measurement imaging processing program. The distance measurement imaging processing is processing including imaging processing described below (see FIG. 18), distance measurement processing described below (see FIG. 19), parallel processing described below (see FIG. 17), change processing described below (see FIG. 20), and display control processing described below (see FIGS. 21A and 21B).

The CPU 15A reads out the imaging processing program 70 from the storage 15B, and executes the imaging processing (see FIG. 18) according to the read out imaging processing program 70. In addition, the CPU 15A reads out the distance measurement processing program 72 from the storage 15B, and executes the distance measurement processing (see FIG. 19) according to the read out distance measurement processing program 72. In addition, the CPU 15A reads out the parallel processing program 74 from the storage 15B, and executes the parallel processing (see FIG. 17) according to the read out parallel processing program 74. In addition, the CPU 15A reads out the change processing program 76 from the storage 15B, and executes the change processing (see FIG. 20) according to the read out change processing program 76. Further, the CPU 15A reads out the display control processing program 78 from the storage 15B, and executes the display control processing (see FIGS. 21A and 21B) according to the read out display control processing program 78.

Figure 12:
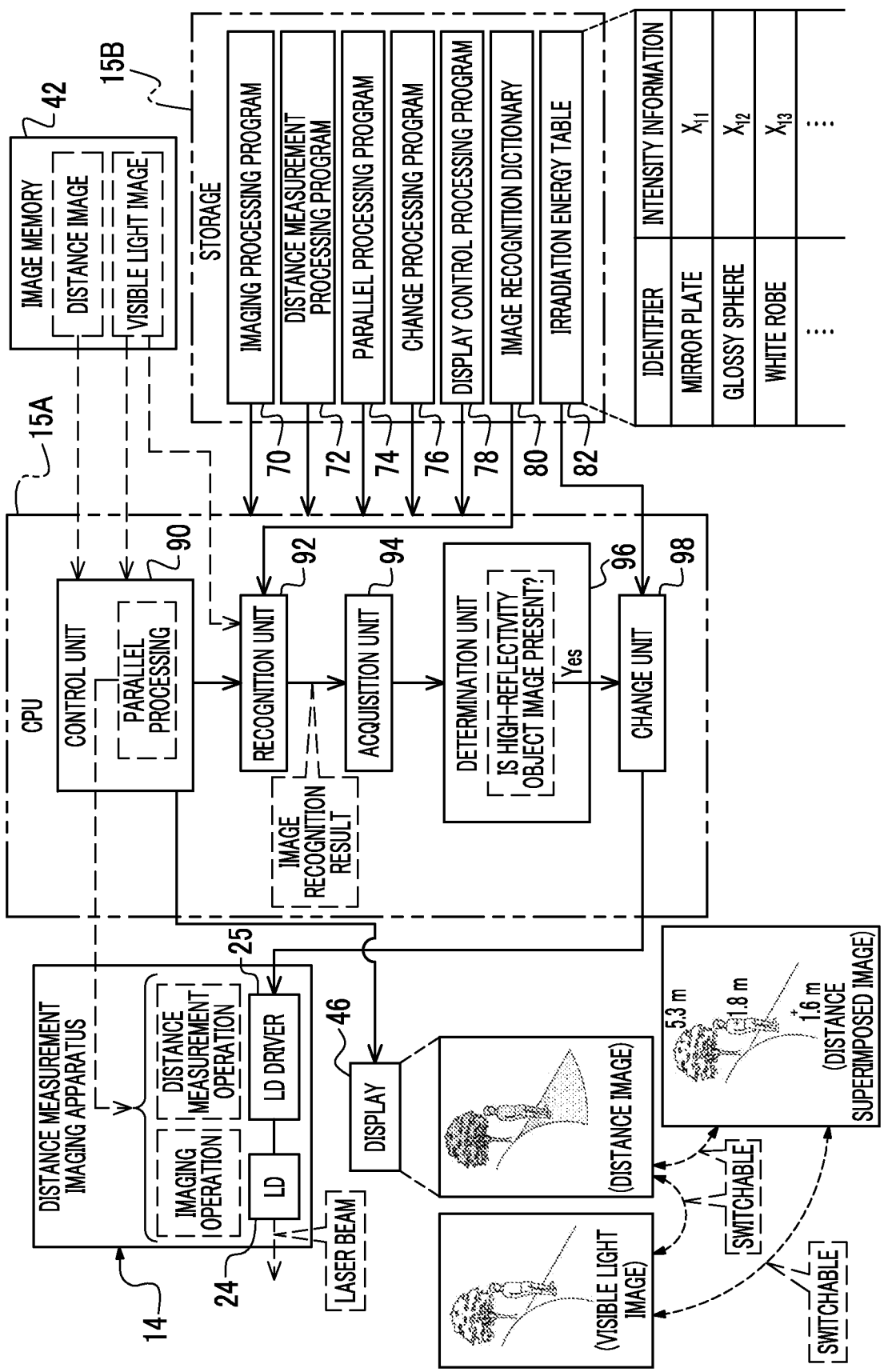
FIG. 12 is a functional block diagram showing an example of a function of the CPU in a case in which the distance measurement imaging processing is performed by the CPU provided in the smart device according to the embodiment.

As shown in FIG. 12 as an example, the distance measurement imaging processing is realized by the CPU 15A being operated as a control unit 90, a recognition unit 92, an acquisition unit 94, a determination unit 96, and a change unit 98.

The control unit 90 executes the parallel processing. That is, the control unit 90 performs a control of causing the distance measurement imaging apparatus 14 to perform the imaging operation and the distance measurement operation in parallel. Note that although the aspect example has been described in which the imaging operation and the distance measurement operation are performed in parallel, this is merely an example, and the technology of the present disclosure is established even in a case in which the imaging operation and the distance measurement operation may not be performed in parallel. For example, the technology of the present disclosure is established even in a case in which a part of the period during which the imaging operation is performed and a part of the period during which the distance measurement operation is performed overlap with each other.

In addition, the control unit 90 acquires the visible light image and the distance image from the image memory 42, and displays the image based on the acquired visible light image and distance image on the display 46. Specifically, the visible light image, the distance image, and the distance superimposed image are displayed on the display 46 to be switchable under the control of the control unit 90.

The recognition unit 92 acquires the visible light image from the image memory 42, and performs the image recognition on the acquired visible light image. The recognition unit 92 acquires the image recognition dictionary 80 from the storage 15B, and recognizes the image included in the visible light image with reference to the acquired image recognition dictionary 80. The image recognition dictionary 80 is information in which a plurality of types of high-reflectivity object images and an identifier capable of specifying each of the plurality of types of high-reflectivity object images (hereinafter, also simply referred to as "identifier") are associated with each other. The high-reflectivity object image refers to an image showing an object having a reflectivity equal to or more than a reference reflectivity (hereinafter, also referred to as a "high-reflectivity object"). Examples of the reference reflectivity include a reflectivity, which is derived in advance by a sensory test and/or a computer simulation, as the reflectivity at which the IR reflected light of the laser beam emitted to the object is transmitted through the visible light filter, reaches the visible light pixel, and appears in the visible light image as noise. Examples of the object having the reflectivity equal to or more than the reference reflectivity include a predetermined object as a glossy object, and a predetermined object as a white object. The predetermined object as the glossy object refers to, for example, a mirror plate, or a glossy sphere. In addition, the predetermined object as the white object refers to, for example, a white robe, a white balloon, or white hair.

Note that the mirror plate is an example of a "mirror-like object" according to the technology of the present disclosure.

Here, the plurality of types of high-reflectivity object images have been described as an example of the information included in the image recognition dictionary 80, but the technology of the present disclosure is not limited to this, and the information may be a feature amount (for example, spatial frequency and/or brightness) of each of the plurality of types of high-reflectivity object images. In addition, the image recognition dictionary 80 is information based on a learning result obtained by machine learning a correspondence relationship between the image and the subject recognition result. Note that, here, the aspect example has been described in which the information based on the learning result obtained by machine learning is used as the image recognition dictionary 80, but this aspect example is merely an example, and information derived in advance by a sensory test and/or a computer simulation may be used as the image recognition dictionary 80.

The acquisition unit 94 acquires reflectivity information for specifying the reflectivity in the imaging region. Here, as the reflectivity information, the image recognition result is acquired by the acquisition unit 94. The image recognition result refers to a result obtained by performing the image recognition on the visible light image by the recognition unit 92. Specifically, in a case in which the high-reflectivity object image is recognized by the recognition unit 92, the image recognition result includes the identifier that can specify the recognized high-reflectivity object image, and in a case in which the high-reflectivity object image is not recognized by the recognition unit 92, the image recognition result includes information indicating that the high-reflectivity object image is not recognized. Note that, here, the "image recognition result" is an example of "reflectivity information" and "information based on the imaging region image" according to the technology of the present disclosure.

The determination unit 96 determines whether or not the high-reflectivity object image is included in the visible light image with reference to the image recognition result acquired by the acquisition unit 94. In a case in which the determination unit 96 determines that the high-reflectivity object image is included in the visible light image, the change unit 98 changes irradiation energy of the laser beam (hereinafter, also simply referred to as "irradiation energy") according to the image recognition result acquired by the acquisition unit 94 in a state in which the imaging operation and the distance measurement operation are performed by the distance measurement imaging apparatus 14.

Specifically, the change unit 98 changes the irradiation energy by acquiring the irradiation energy table 82 from the storage 15B and changing the intensity of the laser beam emitted from the LD 24 via the LD driver 25 according to the acquired irradiation energy table 82. That is, under a state in which the imaging operation and the distance measurement operation are performed in parallel by the parallel processing executed by the control unit 90, the LD driver 25 emits the laser beam of the intensity changed by the change unit 98 from the LD 24.

In the irradiation energy table 82, the identifier and intensity information are associated with each other. The intensity information refers to information indicating the intensity of the laser beam emitted to the LD 24. The intensity of the laser beam indicated by the intensity information is the intensity weaker than reference intensity. Here, the reference intensity is an example of "first to fourth reference irradiation energy" according to the technology of the present disclosure.

The reference intensity refers to the intensity set as a default value as the intensity of the laser beam emitted to the LD 24, for example. The intensity set as the default value refers to, for example, the intensity, which is derived in advance by a sensory test and/or a computer simulation, as the intensity of the laser beam received by the IR reflected light of the laser beam emitted to the reference subject (for example, a face of a person predetermined as a face of a general person) with the light amount at which the distance measurement can be performed by the IR pixel.

The intensity information is defined such that the intensity of the laser beam is weaker as the reflectivity of the high-reflectivity object indicated by the high-reflectivity object image specified by the identifier is higher. In the example shown in FIG. 12, in the irradiation energy table 82, the mirror plate, the glossy sphere, and the white robe are shown as the high-reflectivity object images specified by the identifier. The intensity information indicating intensity $X_{11}$ is associated with the mirror plate. The intensity information indicating intensity $X_{12}$ is associated with the glossy sphere. The intensity information indicating intensity $X_{13}$ is associated with the white robe. Between the intensity $X_{11}$, the intensity $X_{12}$, and the intensity $X_{13}$, a magnitude relationship of "intensity $X_{11}$<intensity $X_{12}$<intensity $X_{13}$" is established.

Figure 13:
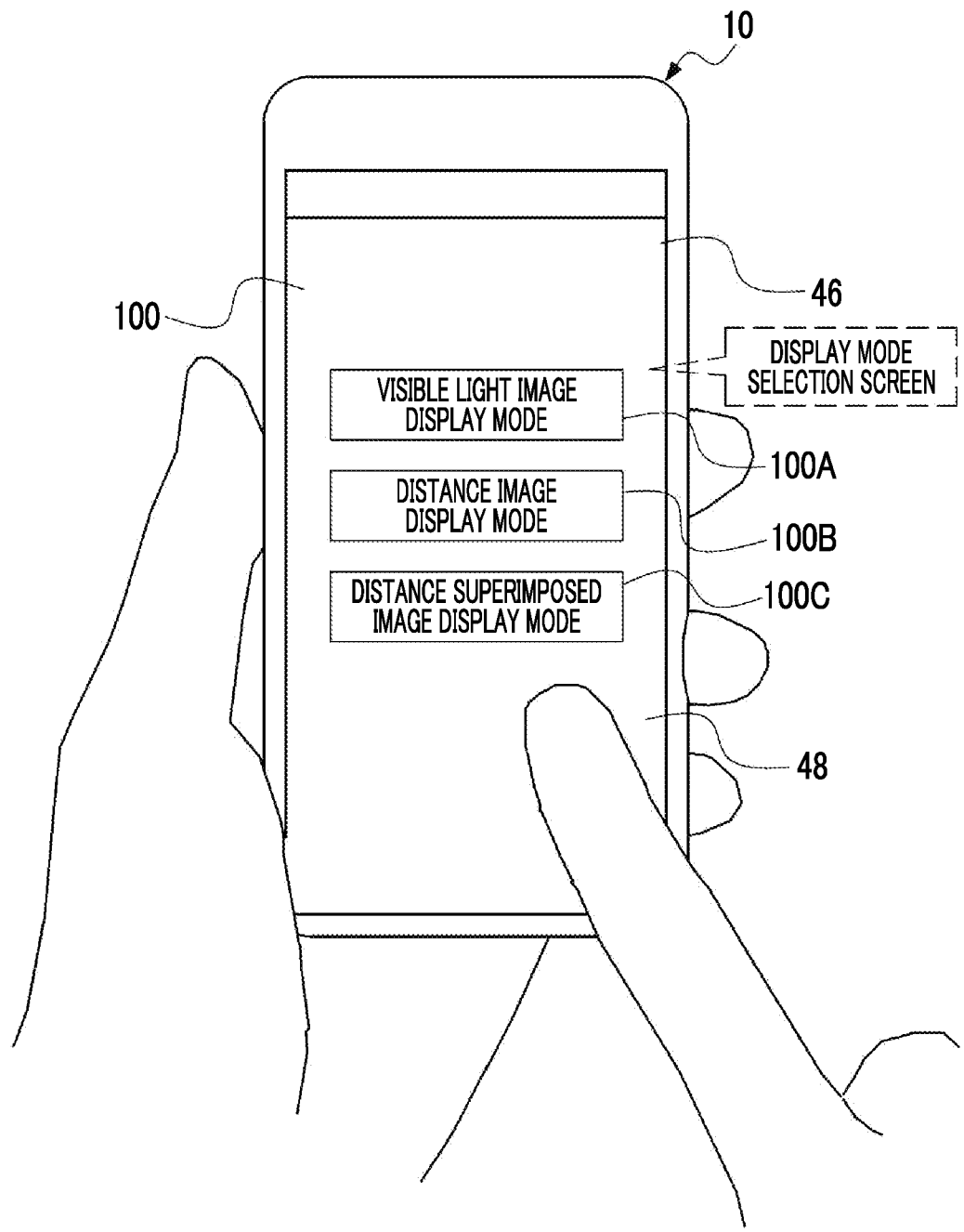
FIG. 13 is a schematic screen view showing an example of a display mode selection screen displayed on the display provided in the smart device according to the embodiment.

Under the control of the control unit 90, in a case in which the visible light image, the distance image, and the distance superimposed image displayed on the display 46 are switched, as shown in FIG. 13 as an example, the control unit 90 displays a display mode selection screen 100 on the display 46 in response to the instruction received by the touch panel 48. The display mode selection screen 100 is a screen used by the user or the like in a case in which the user or the like is made to select any of a visible light image display mode, a distance image display mode, or a distance superimposed image display mode. The visible light image display mode is an operation mode in which the control unit 90 displays the visible light image on the display 46. The distance image display mode is an operation mode in which the control unit 90 displays the distance image on the display 46. The distance superimposed image display mode is an operation mode in which the control unit 90 displays the distance superimposed image on the display 46.

Soft keys 100A, 100B, and 100C are displayed on the display mode selection screen 100. The soft key 100A is turned on by the user or the like via the touch panel 48 in a case in which the user or the like selects the visible light image display mode. The soft key 100B is turned on by the user or the like via the touch panel 48 in a case in which the user or the like selects the distance image display mode. The soft key 100C is turned on by the user or the like via the touch panel 48 in a case in which the user or the like selects the distance superimposed image display mode. Note that, in the following, for convenience of description, in a case in which the distinction is not necessary, the visible light image display mode, the distance image display mode, and the distance superimposed image display mode are referred to as a "display mode".

Figure 14:
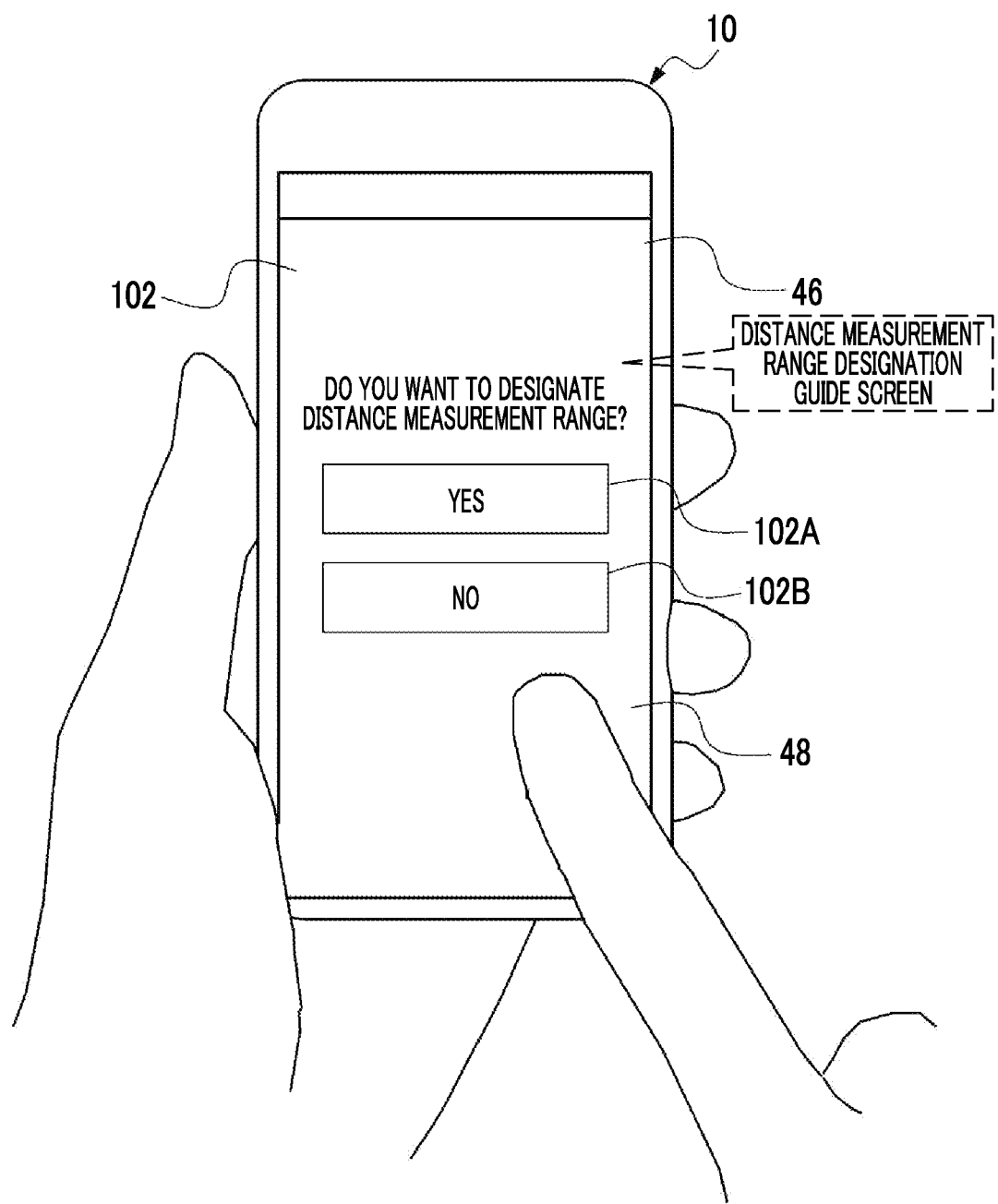
FIG. 14 is a schematic screen view showing an example of a distance measurement range designation guide screen displayed on the display provided in the smart device according to the embodiment.

In a case in which the display mode is selected by the operation on the display mode selection screen 100, the control unit 90 displays a distance measurement range designation guide screen 102 on the display 46 as shown in FIG. 14 as an example. The distance measurement range designation guide screen 102 is a screen for guiding the user or the like to designate a distance measurement range. On the distance measurement range designation guide screen 102, a message asking the user whether or not to designate the distance measurement range (hereinafter, also referred to as a "guide message") is displayed. In the example shown in FIG. 14, a message "Do you want to designate distance measurement range?" is shown as an example of the guide message. In addition, soft keys 102A and 102B are displayed on the distance measurement range designation guide screen 102. The soft key 102A is turned on by the user or the like via the touch panel 48 in a case in which the user or the like designates the distance measurement range. The soft key 102B is turned on by the user or the like via the touch panel 48 in a case in which the user or the like does not designate the distance measurement range, that is, in a case in which the entire imaging region is set as the distance measurement range.

Figure 15:
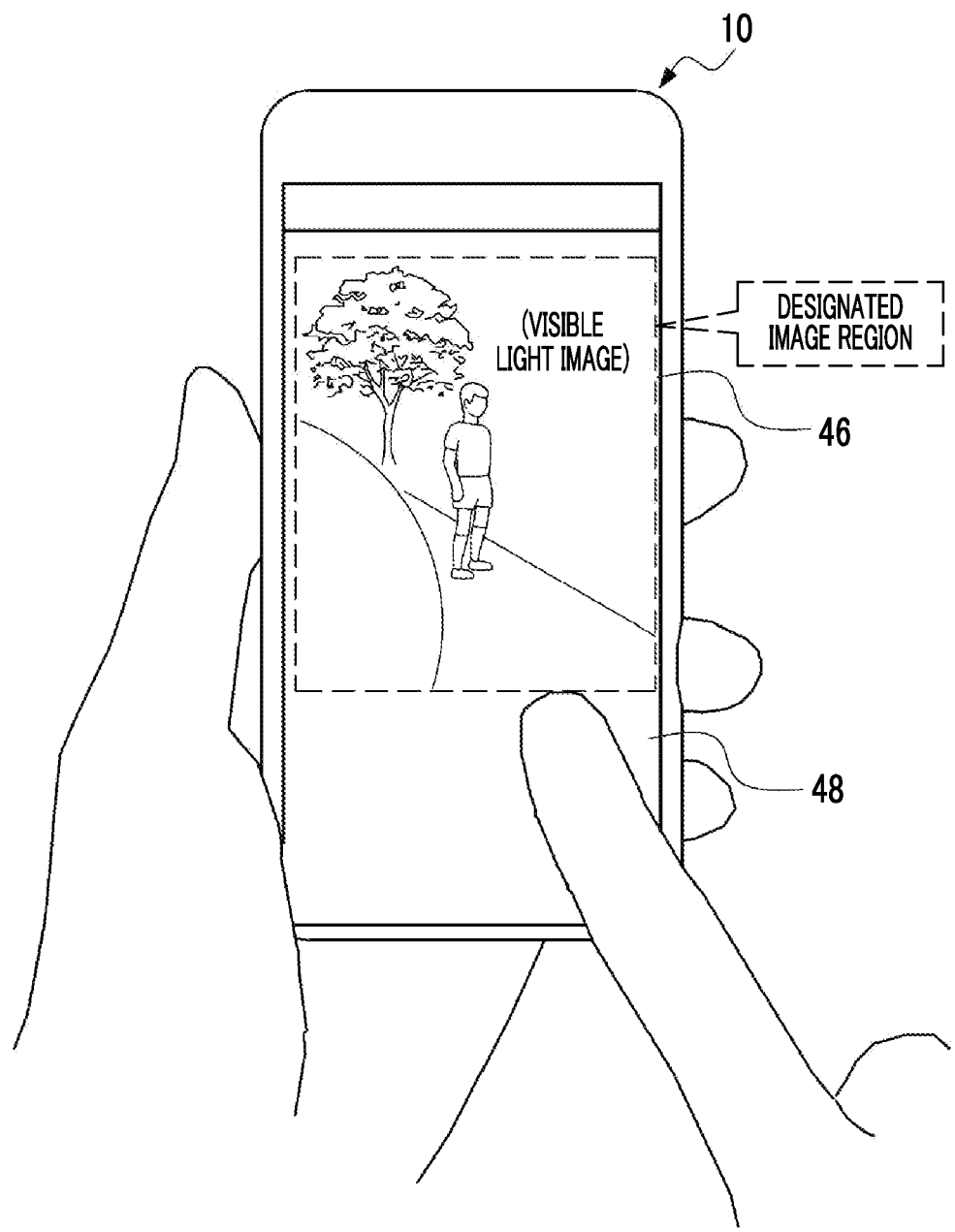
FIG. 15 is a schematic screen view showing an example of the visible light image displayed as a live view image on the display provided in the smart device according to the embodiment and a designated image region.

In a case in which the soft key 102A is turned on by the user or the like via the touch panel 48 in a state in which the distance measurement range designation guide screen 102 is displayed on the display 46, as shown in FIG. 15 as an example, the control unit 90 displays the visible light image as the live view image on the display 46. In a state in which the live view image is displayed on the display 46, the image region (in the example shown in FIG. 15, a rectangular region surrounded by a broken line on the visible light image) is designated by the user or the like via the touch panel 48. A real space region corresponding to the image region designated by the user or the like (hereinafter, also referred to as a "designated image region") is designated as the distance measurement target by the distance measurement imaging apparatus 14.

Figure 16:
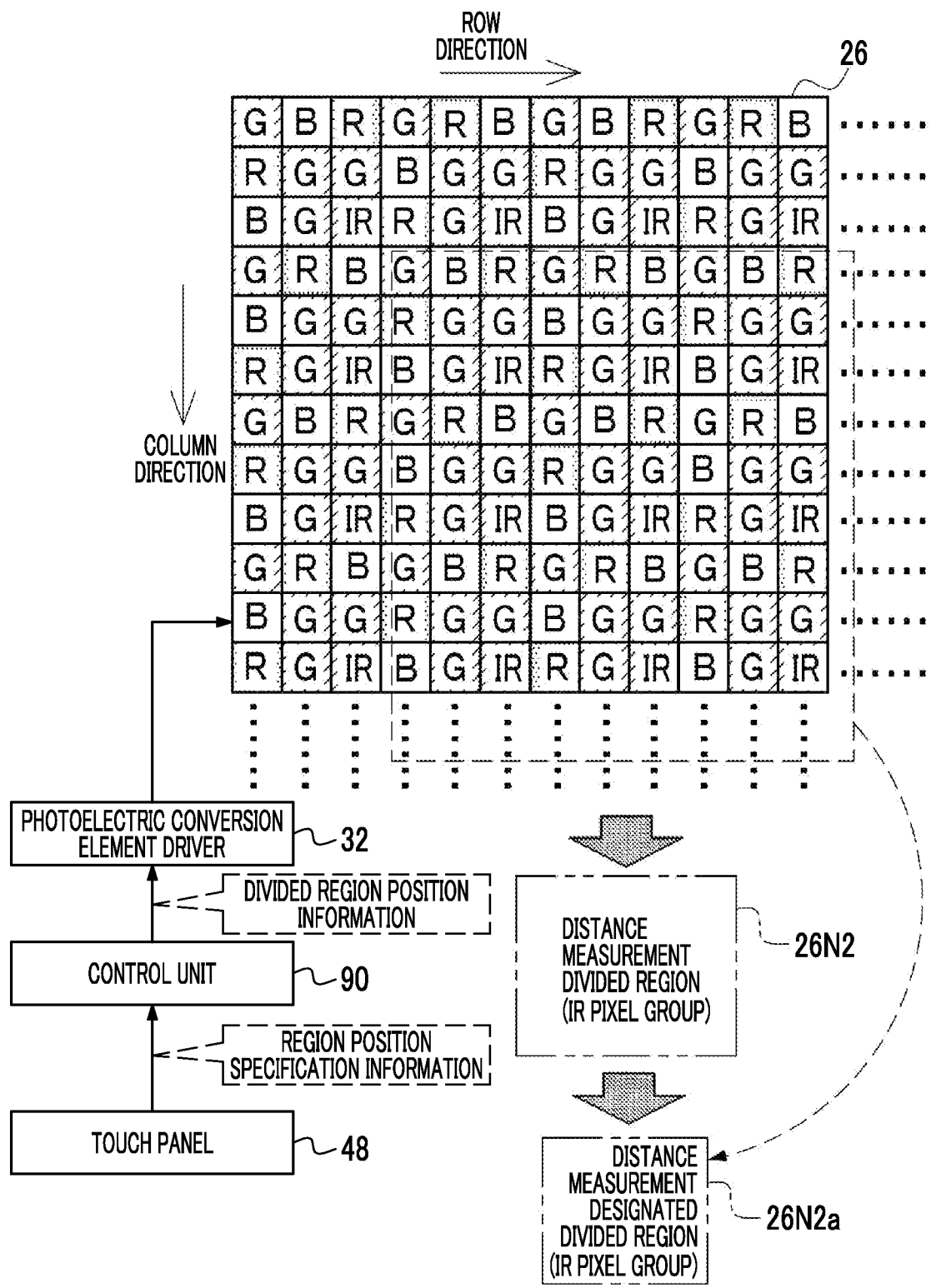
FIG. 16 is a conceptual diagram for describing an example of how to narrow down the photoelectric conversion element provided in the smart device from a distance measurement divided region to a distance measurement designated divided region.

In this case, as shown in FIG. 16 as an example, region position specification information (for example, coordinates) for specifying a position of the designated image region on the visible light image is output from the touch panel 48 to the control unit 90. The control unit 90 outputs divided region position information (for example, pixel address) for specifying a position of a distance measurement designated divided region 26N2a in the distance measurement divided region 26N2 to the photoelectric conversion element driver 32. Here, the distance measurement designated divided region 26N2a refers to a divided region of the distance measurement divided region 26N2 at a position corresponding to the position of the designated image region specified by the region position specification information input from the touch panel 48.

The photoelectric conversion element driver 32 causes the distance measurement imaging apparatus 14 to perform the distance measurement by using the IR reflected light received by only the distance measurement designated divided region 26N2a by driving only the distance measurement designated divided region 26N2a in the distance measurement divided region 26N2 in the distance measurement operation. That is, the distance measurement is performed by using the IR reflected light received by only at least one IR pixel included in the designated region among the plurality of IR pixels included in the TOF camera 19 (see FIG. 9).

Then, the operation of the portion of the smart device 10 according to the technology of the present disclosure will be described with reference to FIGS. 17 to 21B.

Figure 17:
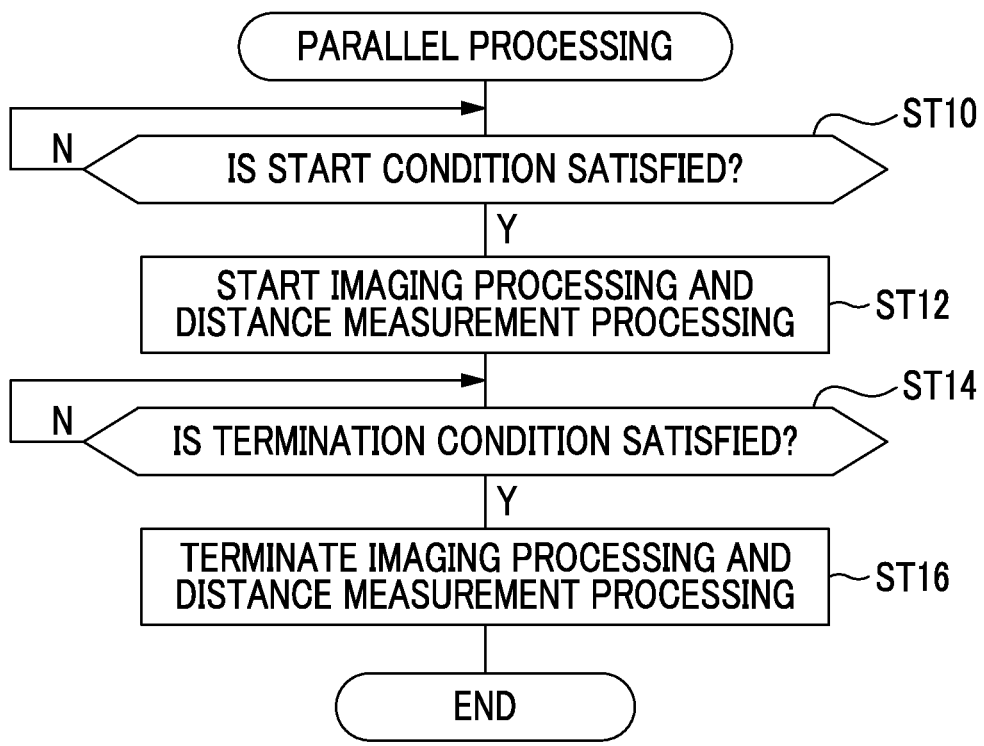
FIG. 17 is a flowchart showing an example of a flow of parallel processing according to the embodiment.

First, the parallel processing executed by the CPU 15A will be described with reference to FIG. 17.

In the parallel processing shown in FIG. 17, first, in step ST10, the control unit 90 determines whether or not a condition for starting the parallel processing (hereinafter, also referred to as a "parallel processing start condition") is satisfied. Examples of the parallel processing start condition include a condition that an instruction for starting the parallel processing is received by touch panel 48. In a case in which the parallel processing start condition is not satisfied in step ST10, a negative determination is made, and the determination in step ST10 is made again. In a case in which the parallel processing start condition is satisfied in step ST10, a positive determination is made, and the parallel processing proceeds to step ST12.

In step ST12, the control unit 90 causes the distance measurement imaging apparatus 14 to start the imaging operation and the distance measurement operation by starting the imaging processing and the distance measurement processing, and then the parallel processing proceeds to step ST14.

In step ST14, the control unit 90 determines whether or not a condition for terminating the parallel processing (hereinafter, also referred to as a "parallel processing termination condition") is satisfied. Examples of the parallel processing termination condition include a condition that an instruction for terminating the parallel processing is received by touch panel 48. In a case in which the parallel processing termination condition is not satisfied in step ST14, a negative determination is made, and the determination in step ST14 is made again. In a case in which the parallel processing termination condition is satisfied in step ST14, a positive determination is made, and the parallel processing proceeds to step ST16.

In step ST16, the control unit 90 causes the distance measurement imaging apparatus 14 to terminate the imaging operation and the distance measurement operation by terminating the imaging processing and the distance measurement processing, and then the parallel processing is terminated.

Figure 18:
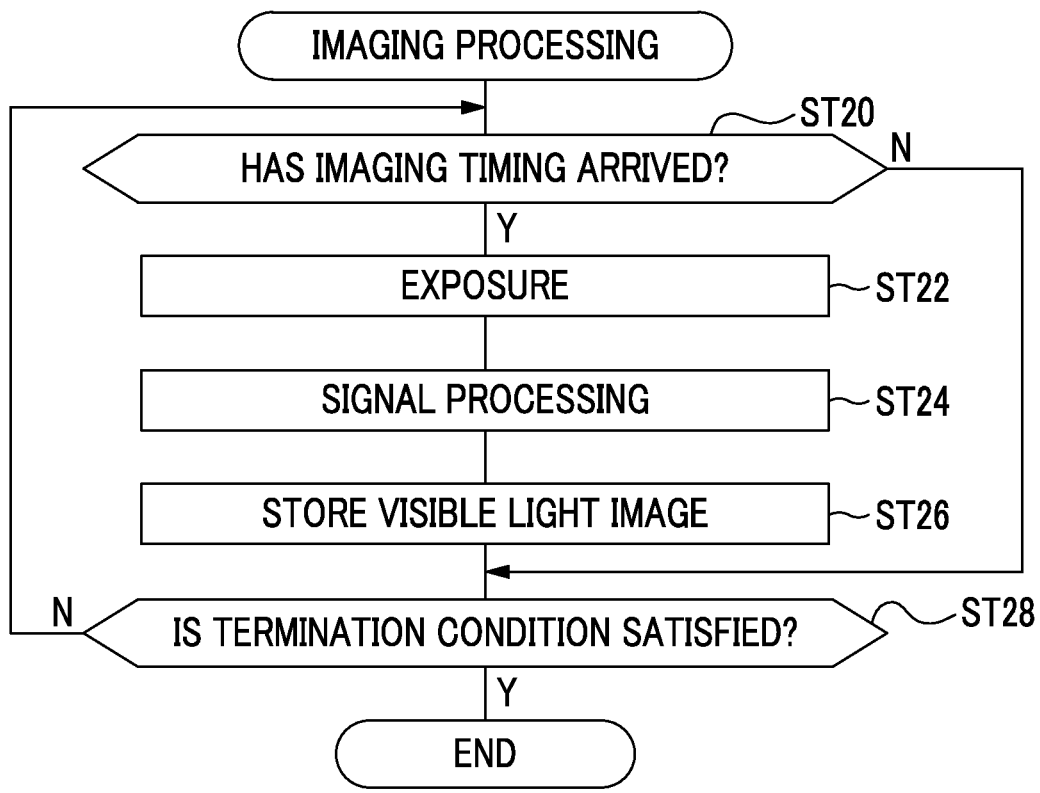
FIG. 18 is a flowchart showing an example of a flow of imaging processing according to the embodiment.

Then, the imaging processing executed by the CPU 15A will be described with reference to FIG. 18.

In the imaging processing shown in FIG. 18, first, in step ST20, the control unit 90 determines whether or not the timing of causing the distance measurement imaging apparatus 14 to perform imaging (hereinafter, also referred to as "imaging timing") has arrived. Examples of the imaging timing include timing determined by a period defining a frame rate. For example, in a case in which the frame rate is 120 fps, the period defining the frame rate is ¹⁄₁₂₀ seconds. In a case in which the imaging timing has not arrived in step ST20, a negative determination is made, and the imaging processing proceeds to step ST28. In a case in which the imaging timing has arrived in step ST20, a positive determination is made, and the imaging processing proceeds to step ST22.

In step ST22, the control unit 90 resets the photoelectric conversion element 26 by causing the photoelectric conversion element driver 32 to output the imaging timing signal, causes the photoelectric conversion element 26 to perform exposure, and then the imaging processing proceeds to step ST24.

In step ST24, the control unit 90 causes the visible light pixel data processing circuit 34A to perform various pieces of signal processing. That is, the visible light pixel data processing circuit 34A generates the visible light image by performing various pieces of signal processing on the pixel data of the visible light pixel included in the photoelectric conversion element 26.

In step ST26, the control unit 90 causes the visible light pixel data processing circuit 34A to store the visible light image in the image memory 42, and then the imaging processing proceeds to step ST28.

In step ST28, the control unit 90 determines whether or not a condition for terminating the imaging processing (hereinafter, also referred to as an "imaging processing termination condition") is satisfied. Examples of the imaging processing termination condition include a condition that the processing of step ST16 shown in FIG. 17 is executed. In a case in which the imaging processing termination condition is not satisfied in step ST28, a negative determination is made, and the imaging processing proceeds to step ST20. In a case in which the imaging processing termination condition is satisfied in step ST28, a positive determination is made, and the imaging processing is terminated.

Figure 19:
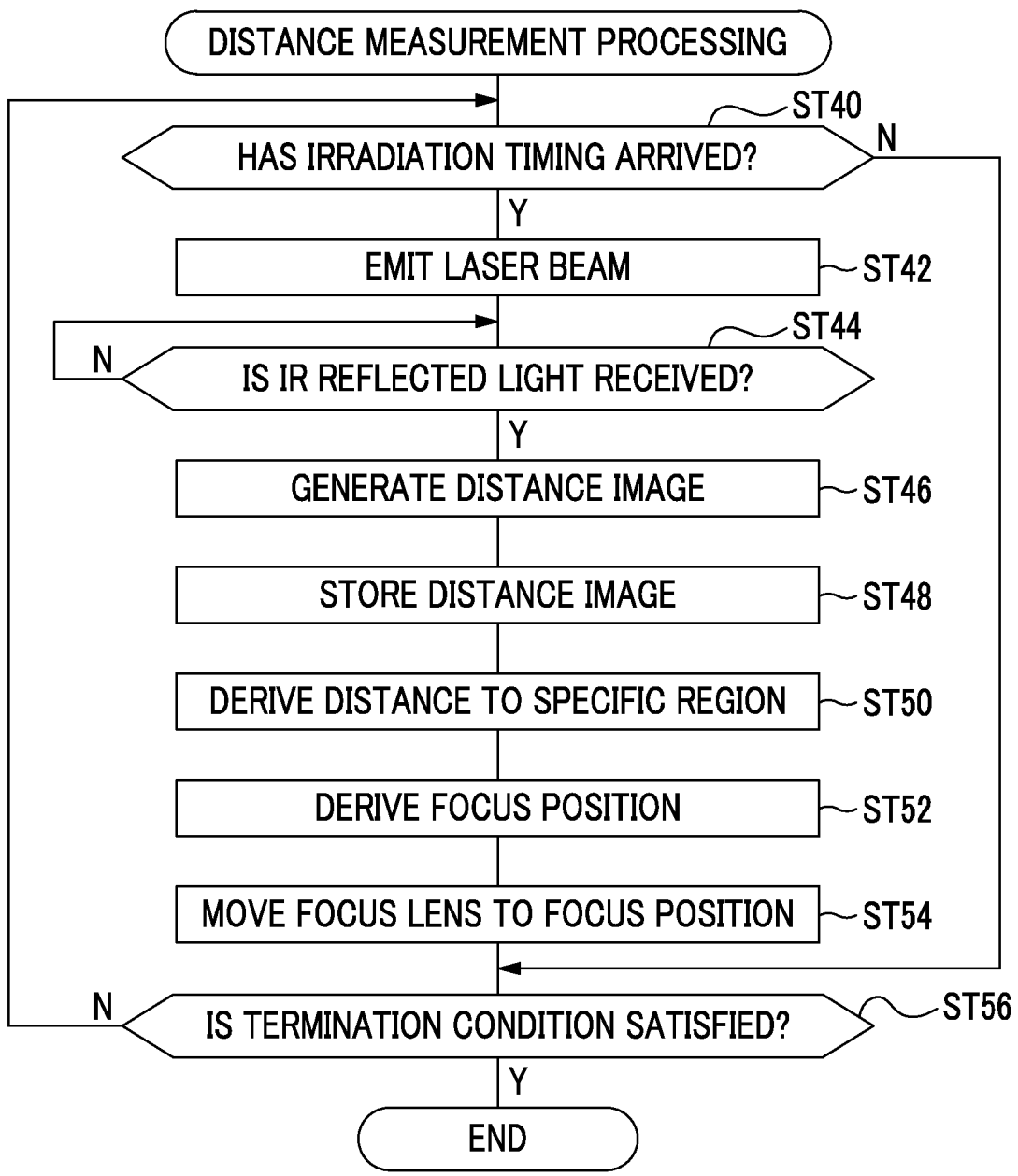
FIG. 19 is a flowchart showing an example of a flow of distance measurement processing according to the embodiment.

Then, the distance measurement processing executed by the CPU 15A will be described with reference to FIG. 19.

In the distance measurement processing shown in FIG. 19, first, in step ST40, the control unit 90 determines whether or not the timing of causing the distance measurement imaging apparatus 14 to perform distance measurement (hereinafter, also referred to as "distance measurement timing") has arrived. The distance measurement timing is, for example, timing that arrives at a period shorter than the imaging timing. In a case in which the distance measurement timing has not arrived in step ST40, a negative determination is made, and the distance measurement processing proceeds to step ST56. In a case in which the distance measurement timing has arrived in step ST40, a positive determination is made, and the distance measurement processing proceeds to step ST42.

In step ST42, the control unit 90 causes the light irradiator 16 to emit the laser beam. That is, the control unit 90 emits the laser beam to the LD 24 by controlling the LD driver 25, and then the distance measurement processing proceeds to step ST44.

In step ST44, the control unit 90 determines whether or not the IR reflected light is received by the distance measurement designated divided region 26N2a. In a case in which the IR reflected light is not received by the distance measurement designated divided region 26N2a in step ST44, a negative determination is made, and the determination in step ST44 is made again. In a case in which the IR reflected light is received by the distance measurement designated divided region 26N2a in step ST44, a positive determination is made, and the distance measurement processing proceeds to step ST46.

In step ST46, the control unit 90 causes the distance image generation circuit 34B to generate the distance image based on the distance measurement result, and then the distance measurement processing proceeds to step ST48.

In step ST48, the control unit 90 causes the distance image generation circuit 34B to store the distance image generated in step ST46 in the image memory 42, and then the distance measurement processing proceeds to step ST50.

By the way, the distance measurement operation performed by the distance measurement imaging apparatus 14 is the distance measurement operation for focusing, and the distance measurement imaging apparatus 14 performs focusing on the imaging region based on the distance measurement result obtained by performing distance measurement by the distance measurement operation for focusing. Therefore, in the distance measurement processing, the processing of steps ST50 to ST54 are executed by the control unit 90.

In step ST50, the control unit 90 acquires the distance image from the image memory 42, derives the distance from the smart device 10 to a specific region in the imaging region based on the acquired distance image, and then the distance measurement processing proceeds to step ST52. Here, the specific region refers to a region designated by the user or the like via the touch panel 48, for example, as a region on the object side to be focused. Note that the specific region is not limited to this, and may be, for example, the face of the person specified by activating a so-called face detection function, or may be one location of the plurality of representative locations (see FIG. 8).

In step ST52, the control unit 90 derives the focus position based on the distance derived in step ST50, and then the distance measurement processing proceeds to step ST54. The focus position is derived by the control unit 90 from, for example, a focus position derivation table (not shown) in which the distance and the focus position are associated with each other, or a focus position derivation arithmetic expression (not shown) in which the distance is an independent variable and the focus position is a dependent variable.

In step ST54, the control unit 90 operates the focus control mechanism 31 to move the focus lens 30B to the focus position derived in step ST52, and then the distance measurement processing proceeds to step ST56.

In step ST56, the control unit 90 determines whether or not a condition for terminating the distance measurement processing (hereinafter, also referred to as a "distance measurement processing termination condition") is satisfied. Examples of the distance measurement processing termination condition include a condition that the processing of step ST16 shown in FIG. 17 is executed. In a case in which the distance measurement processing termination condition is not satisfied in step ST56, a negative determination is made, and the distance measurement processing proceeds to step ST40. In a case in which the distance measurement processing termination condition is satisfied in step ST56, a positive determination is made, and the distance measurement processing is terminated.

Then, the change processing executed by the CPU 15A in a state in which the parallel processing is executed by the control unit 90 will be described with reference to FIG. 20.

Figure 20:
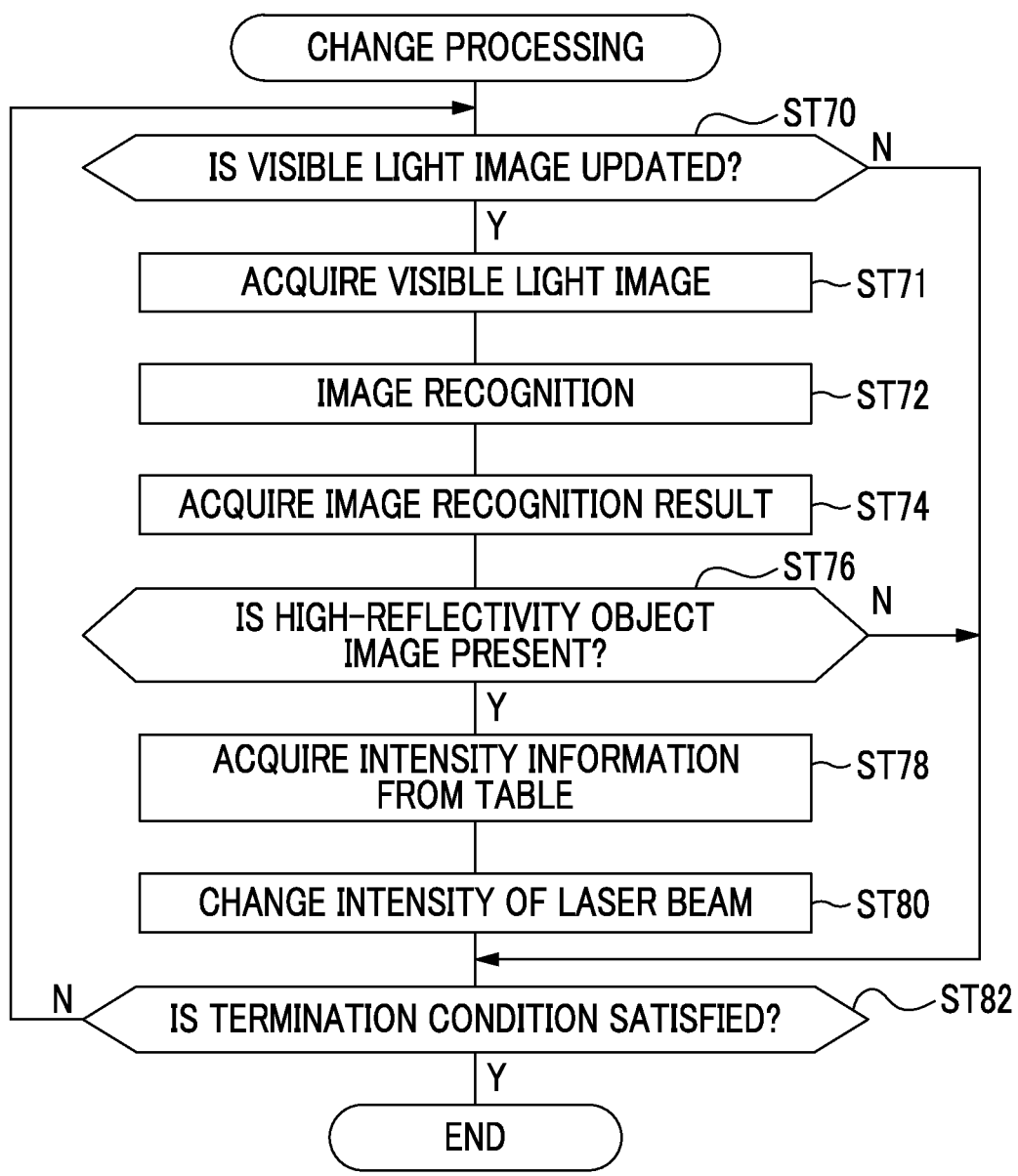
FIG. 20 is a flowchart showing an example of a flow of change processing according to the embodiment.

In the change processing shown in FIG. 20, first, in step ST70, the recognition unit 92 determines whether or not the visible light image in the image memory 42 is updated. In a case in which the visible light image in the image memory 42 is not updated in step ST70, a negative determination is made, and the change processing proceeds to step ST82. In a case in which the visible light image in the image memory 42 is updated in step ST70, a positive determination is made, and the change processing proceeds to step ST71.

In step ST71, the recognition unit 92 acquires the visible light image from the image memory 42, and then the change processing proceeds to step ST72.

In step ST72, the recognition unit 92 executes the image recognition on the visible light image acquired in step ST70 with reference to the image recognition dictionary 80, and then the change processing proceeds to step ST74.

In step ST74, the acquisition unit 94 acquires the image recognition result obtained by executing the image recognition by the recognition unit 92 in step ST72, and then the change processing proceeds to step ST76.

In step ST76, the determination unit 96 determines whether or not the high-reflectivity object image is included in the visible light image acquired in step ST70 based on the image recognition result acquired in step ST74. In step ST76, in a case in which the visible light image acquired in step ST70 does not include the high-reflectivity object image, a negative determination is made, and the change processing proceeds to step ST82. In step ST76, in a case in which the visible light image acquired in step ST70 includes the high-reflectivity object image, a positive determination is made, and the change processing proceeds to step ST78.

In step ST78, the change unit 98 acquires the intensity information corresponding to the identifier included in the image recognition result acquired in step ST74 from the irradiation energy table 82, and then the change processing proceeds to step ST80.

In step ST80, the change unit 98 changes the intensity of the laser beam emitted from the LD 24 via the LD driver 25 to the intensity indicated by the intensity information acquired in step ST78, and then the change processing proceeds to step ST82.

In step ST82, the control unit 90 determines whether or not a condition for terminating the change processing (hereinafter, also referred to as a "change processing termination condition") is satisfied. Examples of the change processing termination condition include a condition that the processing of step ST16 shown in FIG. 17 is executed. In a case in which the change processing termination condition is not satisfied in step ST82, a negative determination is made, and the change processing proceeds to step ST70. In a case in which the change processing termination condition is satisfied in step ST82, a positive determination is made, and the change processing is terminated.

Then, the display control processing executed by the CPU 15A will be described with reference to FIGS. 21A and 21B.

Figure 21A:
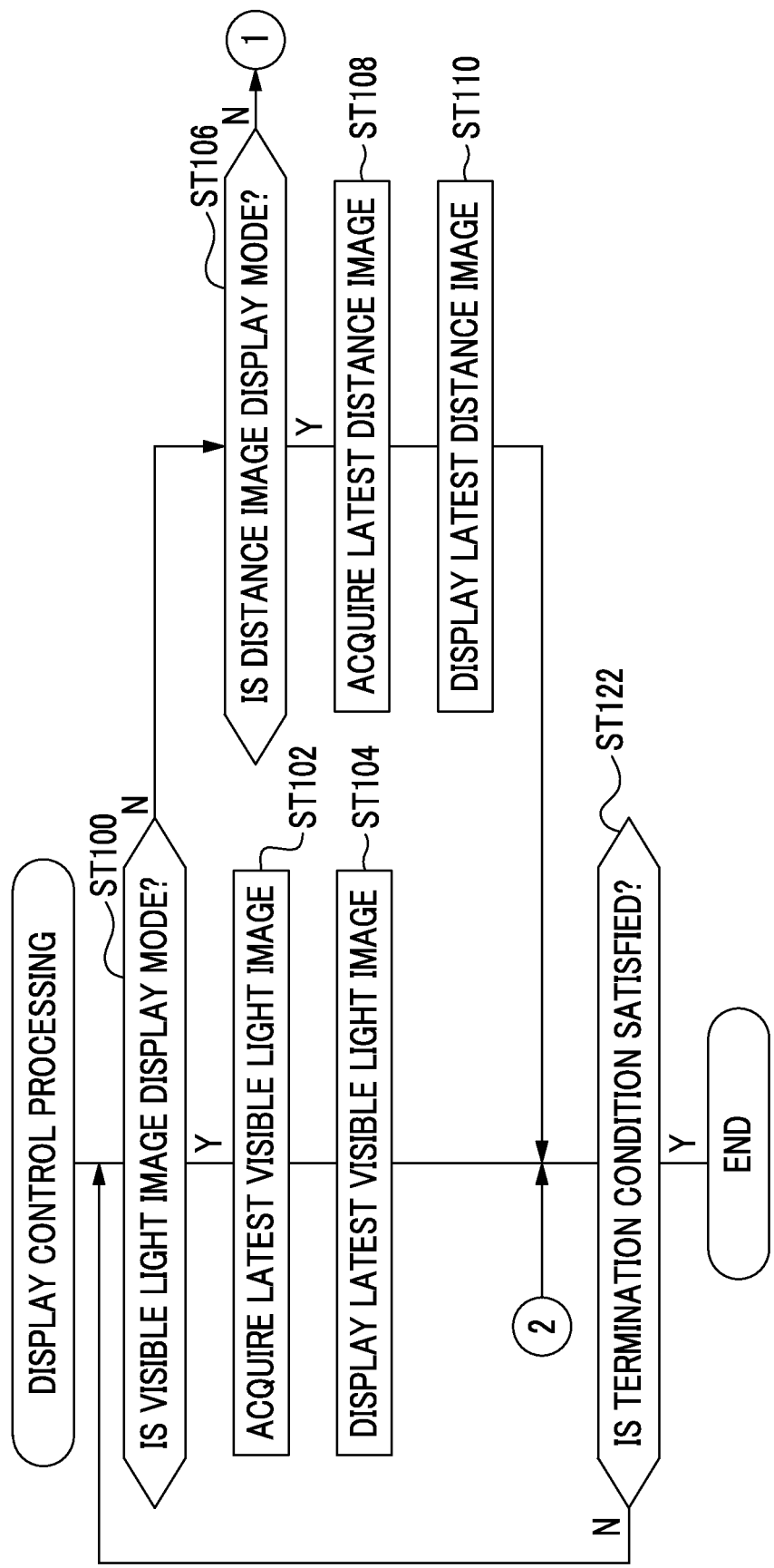
FIG. 21A is a flowchart showing an example of a flow of display control processing according to the embodiment.

In the display control processing shown in FIG. 21A, first, in step ST100, the control unit 90 determines whether or not the visible light image display mode is set. In a case in which the visible light image display mode is set in step ST100, a positive determination is made, and the display control processing proceeds to step ST102. In a case in which the visible light image display mode is not set in step ST100, a negative determination is made, and the display control processing proceeds to step ST106.

In step ST102, the control unit 90 acquires the latest visible light image from the image memory 42, and then the display control processing proceeds to step ST104.

In step ST104, the control unit 90 displays the latest visible light image acquired in step ST102 on the display 46, and then the display control processing proceeds to step ST122.

Note that the live view image obtained by performing an imaging operation for the live view image in which the distance measurement imaging apparatus 14 images the imaging region for the live view image as the imaging operation is displayed on the display 46 by repeatedly executing the processing of steps ST100 to ST104.

In step ST106, the control unit 90 determines whether or not the distance image display mode is set. In a case in which the distance image display mode is set in step ST106, a positive determination is made, and the display control processing proceeds to step ST108. In a case in which the distance image display mode is not set in step ST106, a negative determination is made, and the display control processing proceeds to step ST112 shown in FIG. 21B.

In step ST108, the control unit 90 acquires the latest distance image from the image memory 42, and then the display control processing proceeds to step ST110.

In step ST110, the control unit 90 displays the latest distance image acquired in step ST108 on the display 46, and then the display control processing proceeds to step ST122.

Figure 21B:
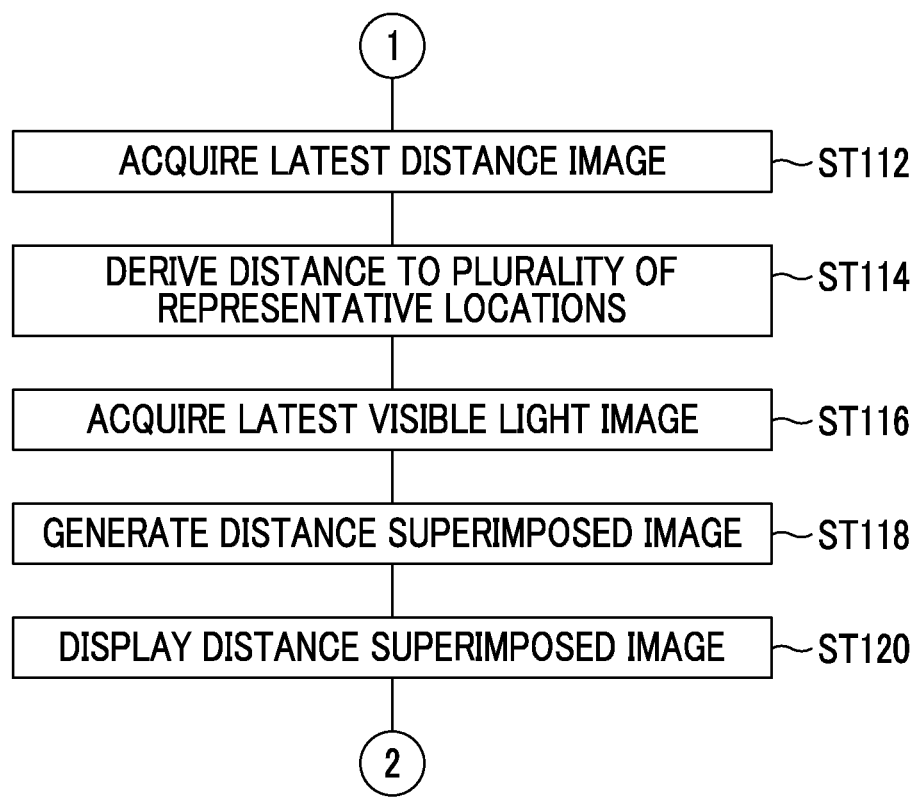
FIG. 21B is a continuation of the flowchart shown in FIG. 21A.

In step ST112 shown in FIG. 21B, the control unit 90 acquires the latest distance image from the image memory 42, and then the display control processing proceeds to step ST114.

In step ST114, the control unit 90 derives the distances from the smart device 10 to the plurality of representative locations (see FIG. 8) based on the latest distance image acquired in step ST112, and then the display control processing proceeds to step ST116.

In step ST116, the control unit 90 acquires the latest visible light image from the image memory 42, and then the display control processing proceeds to step ST118.

In step ST118, the control unit 90 generates the distance superimposed image by superimposing the distance derived in step ST114 on the latest visible light image acquired in step ST116, and then the display control processing proceeds to step ST120. Note that a position at which the distance derived in step ST114 is superimposed on the latest visible light image acquired in step ST116 is a position corresponding to the plurality of representative locations.

In step ST120, the control unit 90 displays the distance superimposed image generated in step ST118 on the display 46, and then the display control processing proceeds to step ST122 shown in FIG. 21A.

In step ST122, the control unit 90 determines whether or not a condition for terminating the display control processing (hereinafter, also referred to as a "display control processing termination condition") is satisfied. Examples of the display control processing termination condition include a condition that an instruction for terminating the display control processing is received by the touch panel 48. In a case in which the display control processing termination condition is not satisfied in step ST122, a negative determination is made, and the display control processing proceeds to step ST100. In a case in which the display control processing termination condition is satisfied in step ST122, a positive determination is made, and the display control processing is terminated.

As described above, in the smart device 10, the control unit 90 performs a control of causing the distance measurement imaging apparatus 14 to perform the imaging operation and the distance measurement operation. In addition, the reflectivity information ("image recognition result" in the example shown in FIG. 12) for specifying the reflectivity in the imaging region is acquired by the acquisition unit 94. Moreover, in a state in which the imaging operation and the distance measurement operation are performed, the intensity of the laser beam is changed by the change unit 98 according to the reflectivity information acquired by the acquisition unit 94. Therefore, with this configuration, it is possible to reduce the influence of the laser beam on the visible light image as compared to a case in which the intensity of the laser beam is determined independently of the reflectivity in the imaging region.

In addition, in the smart device 10, the intensity of the laser beam is changed by the change unit 98 according to the information based on the visible light image ("image recognition result" in the example shown in FIG. 12). Therefore, with this configuration, it is possible to reduce the influence of the IR reflected light on the visible light image with high accuracy as compared to a case in which the intensity of the laser beam is changed only based on the distance to the imaging region or only a shutter speed.

In addition, in the smart device 10, the intensity of the laser beam is changed by the change unit 98 according to the image recognition result. Therefore, with this configuration, it is possible to reduce the influence of the IR reflected light on the visible light image with high accuracy as compared to a case in which the intensity of the laser beam is changed only based on the distance to the imaging region or only a shutter speed.

In addition, in the smart device 10, the image recognition result obtained by performing the image recognition on the visible light image by the recognition unit 92 with reference to the image recognition dictionary 80 is acquired by the acquisition unit 94. The image recognition dictionary 80 is the information based on the learning result obtained by machine learning the correspondence relationship between the image and the subject recognition result. Therefore, with this configuration, it is possible to reduce the influence of the IR reflected light on the visible light image with high accuracy as compared to a case in which it is determined whether or not the IR reflected light has the influence on the visible light image only from a result of visually recognizing the imaging region by the user or the like.

In addition, in the smart device 10, in a case in which the image recognition result acquired by the acquisition unit 94 is the image recognition result indicating that the high-reflectivity object image is included, the intensity of the laser beam is made weaker than the reference intensity by the change unit 98. Therefore, with this configuration, it is possible to reduce the influence of the IR reflected light from the high-reflectivity object image on the visible light image as compared to a case in which the intensity of the laser beam is always equal to or more than the reference intensity regardless of whether or not the high-reflectivity object is included in the imaging region.

In addition, in the smart device 10, in a case in which the image recognition result acquired by the acquisition unit 94 is the image recognition result indicating that the glossy object is included, the intensity of the laser beam is made weaker than the reference intensity by the change unit 98. Therefore, with this configuration, it is possible to reduce the influence of the IR reflected light from the high-reflectivity object image on the visible light image as compared to a case in which the intensity of the laser beam is always equal to or more than the reference intensity regardless of whether or not the glossy object is included in the imaging region.

In addition, in the smart device 10, in a case in which the image recognition result acquired by the acquisition unit 94 is the image recognition result indicating that the mirror-like object (for example, the mirror plate) is included, the intensity of the laser beam is made weaker than the reference intensity by the change unit 98. Therefore, with this configuration, it is possible to reduce the influence of the IR reflected light from the high-reflectivity object image on the visible light image as compared to a case in which the intensity of the laser beam is always equal to or more than the reference intensity regardless of whether or not the mirror-like object is included in the imaging region.

In addition, in the smart device 10, the distance measurement imaging apparatus 14 includes the TOF camera 19. Therefore, with this configuration, it is possible to output the distance measurement result as the distance image.

In addition, in the smart device 10, the distance image is displayed on the display 46. Therefore, with this configuration, it is possible for the user or the like to visually recognize the distance image.

In addition, in the smart device 10, the distance measurement is performed by using the IR reflected light received only by the distance measurement designated divided region 26N2a (see FIG. 16). Therefore, with this configuration, it is possible to reduce the load of the processing required for the distance measurement as compared to a case in which the distance measurement is performed by using the IR reflected light received by all the IR pixels included in the distance measurement divided region 26N2.

In addition, in the smart device 10, the distance measurement is performed by using the IR reflected light received only by the IR pixel at the position corresponding to the position of the designated image region (in the example shown in FIG. 15, "designated image region") in the screen in a state in which the live view image is displayed. Therefore, with this configuration, it is possible to perform the distance measurement by using the IR reflected light received only by the IR pixel intended by the user among all the IR pixels included in the distance measurement divided region 26N2.

In addition, in the smart device 10, the distance measurement imaging apparatus 14 performs the imaging operation for the live view image of imaging the imaging region for the live view image as the imaging operation. Therefore, with this configuration, it is possible to reduce the influence of the laser beam on the live view image as compared to a case in which the intensity of the laser beam is determined independently of the reflectivity in the imaging region.

In addition, in the smart device 10, the distance measurement imaging apparatus 14 performs the distance measurement operation for focusing as the distance measurement operation. That is, the distance measurement result is used for the focus control. Therefore, with this configuration, it is possible to focus on the distance measurement target with high accuracy as compared to a case in which the distance measurement result is not used for the focus control.

In addition, in the smart device 10, the distance measurement is performed by using the laser beam as the directional light beam, which is light having directivity. Therefore, with this configuration, it is possible to measure the distance to the distance measurement target present at a long distance with high accuracy as compared to a case in which the distance measurement is performed without using the directional light beam.

Note that in the embodiment described above, the aspect example has been described in which the change unit 98 derives the intensity information corresponding to the identifier included in the image recognition result from the irradiation energy table 82, and changes the intensity of the laser beam according to the derived intensity information, but the technology of the present disclosure is not limited to this. For example, as shown in FIG. 22, the change unit 98 may derive the intensity information corresponding to the identifier included in the image recognition result and the imaging scene from the irradiation energy table 182, and change the intensity of the laser beam according to the derived intensity information.

Figure 22:
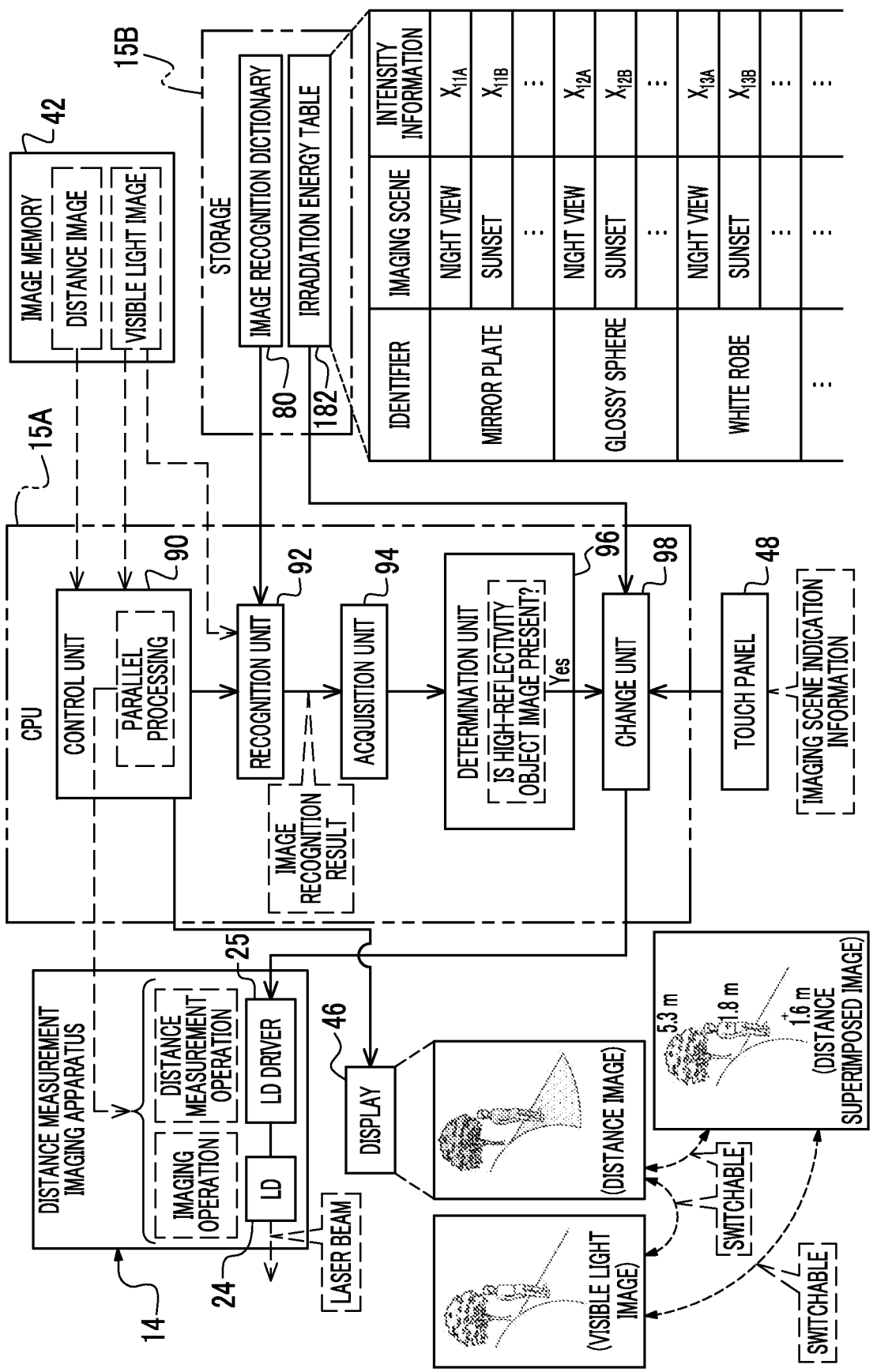
FIG. 22 is a functional block diagram showing a first modification example of the function of the CPU in a case in which the distance measurement imaging processing is performed by the CPU provided in the smart device according to the embodiment.

In the example shown in FIG. 22, the irradiation energy table 182 is the information in which the imaging scene and the intensity information are associated with each other for each identifier. In the example shown in FIG. 22, examples of the imaging scene include a night view, a sunset, and the like. Among the plurality of intensity information included in the irradiation energy table 182, the intensity indicated by the intensity information corresponding to a specific imaging scene having the imaging scene reflectivity equal to or more than the reference reflectivity described in the embodiment described above is the intensity weaker than the reference intensity described in the embodiment described above. The imaging scene reflectivity refers to a predetermined reflectivity as the reflectivity of the laser beam emitted to the imaging scene. The imaging scene reflectivity is a reflectivity, which is derived in advance by a sensory test and/or a computer simulation.

The touch panel 48 receives imaging scene indication information for indicating the imaging scene. The change unit 98 derives the intensity information corresponding to the imaging scene indicated by the imaging scene indication information received by the touch panel 48 and the identifier included in the image recognition result from the irradiation energy table 182. Moreover, the change unit 98 changes the intensity of the laser beam according to the intensity information derived from the irradiation energy table 182.

Figure 23:
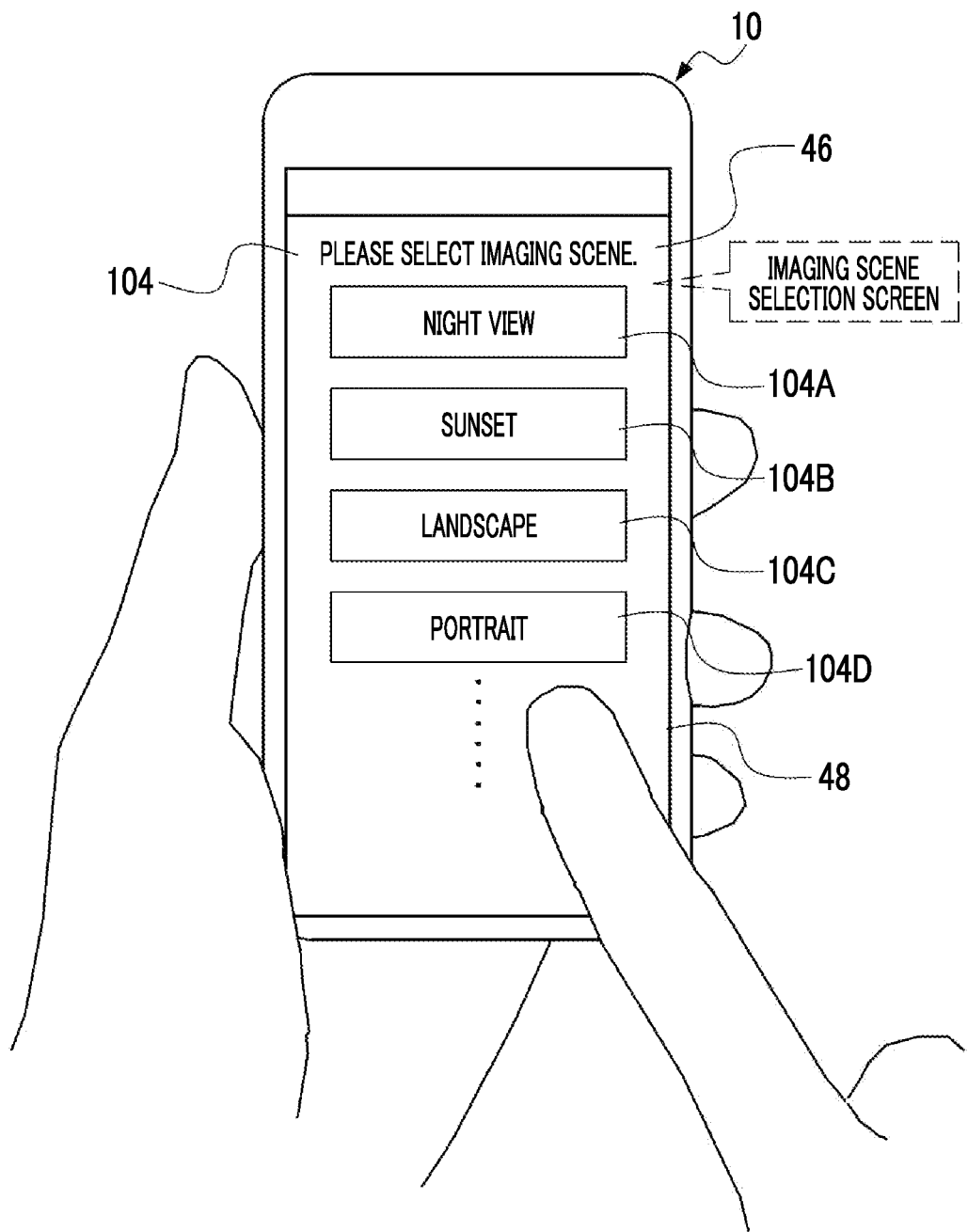
FIG. 23 is a schematic screen view showing an example of an imaging scene selection screen displayed on the display provided in the smart device according to the embodiment.

In a case in which the imaging scene indication information is received by the touch panel 48, as shown in FIG. 23 as an example, an imaging scene selection screen 104 is displayed on the display 46 under the control of the control unit 90. The imaging scene selection screen 104 is a screen used by the user or the like in a case in which the user or the like is allowed to select any of the plurality of imaging scenes. On the imaging scene selection screen 104, a message prompting the user or the like to select the imaging scene (in the example shown in FIG. 23, a message "Please select imaging scene.") is displayed. In addition, a plurality of soft keys, such as soft keys 104A, 104B, 104C, and 104D (hereinafter, also referred to as the "soft keys in the imaging scene selection screen 104") are displayed on the imaging scene selection screen 104. The soft key 104A is turned on by the user or the like via the touch panel 48 in a case in which the user or the like selects a night view scene as the imaging scene. The soft key 104B is turned on by the user or the like via the touch panel 48 in a case in which the user or the like selects a sunset scene as the imaging scene. The soft key 104C is turned on by the user or the like via the touch panel 48 in a case in which the user or the like selects a landscape scene as the imaging scene. The soft key 104D is turned on by the user or the like via the touch panel 48 in a case in which the user or the like selects a portrait scene as the imaging scene. As described above, by turning on the soft key in the imaging scene selection screen 104 by the user or the like, the imaging scene indication information is received by the touch panel 48.

Figure 24:
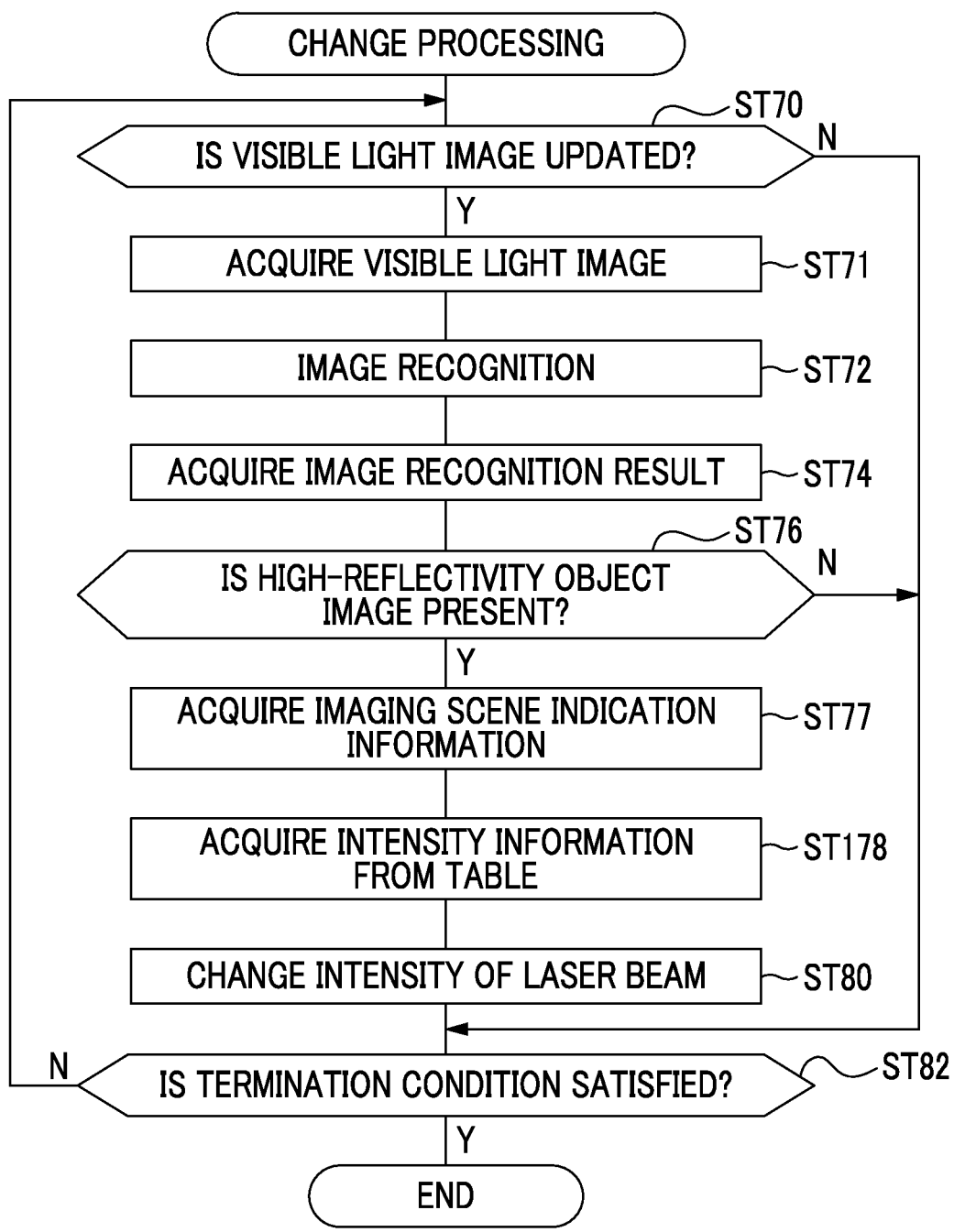
FIG. 24 is a flowchart showing a first modification example of the flow of the change processing according to the embodiment.

In the smart device 10 configured as described above, the change processing shown in FIG. 24 as an example is executed by the CPU 15A. The change processing shown in FIG. 24 is different from the change processing shown in FIG. 20 in that processing of step ST178 is provided instead of processing of step ST78, and processing of step ST77 is provided between processing of step ST76 and processing of step ST178.

In step ST77, the change unit 98 acquires the imaging scene indication information received by the touch panel 48, and then the change processing proceeds to step ST178.

In step ST178, the change unit 98 acquires the intensity information corresponding to the identifier included in the image recognition result acquired in step ST74 and the imaging scene indication information acquired in step ST77 from the irradiation energy table 182, and then the change processing proceeds to step ST80.

As described above, in the examples shown in FIGS. 22 to 24, the intensity of the laser beam is changed by the change unit 98 according to the imaging scene indication information received by the touch panel 48 and the identifier included in the image recognition result. Therefore, with this configuration, it is possible to reduce the influence of the IR reflected light on the visible light image as compared to a case in which the intensity of the laser beam is determined independently of the imaging scene.

In addition, in the examples shown in FIGS. 22 to 24, in a case in which the imaging scene indicated by the imaging scene indication information received by the touch panel 48 is the specific imaging scene having the imaging scene reflectivity equal to or more than the reference reflectivity, the intensity of the laser beam is made weaker than the reference intensity by the change unit 98. Therefore, with this configuration, it is possible to reduce the influence of the IR reflected light on the visible light image in the specific imaging scene as compared to a case in which the intensity of the laser beam is always equal to or more than the reference intensity even though the designated imaging scene is the specific imaging scene having the imaging scene reflectivity equal to or more than the reference reflectivity.

In the examples shown in FIGS. 22 to 24, the aspect example has been described in which the intensity information according to the imaging scene indication information received by the touch panel 48 is acquired by the change unit 98, but the technology of the present disclosure is not limited to this. For example, the imaging scene may be specified by the image recognition of the visible light image by the recognition unit 92.

Figure 25:
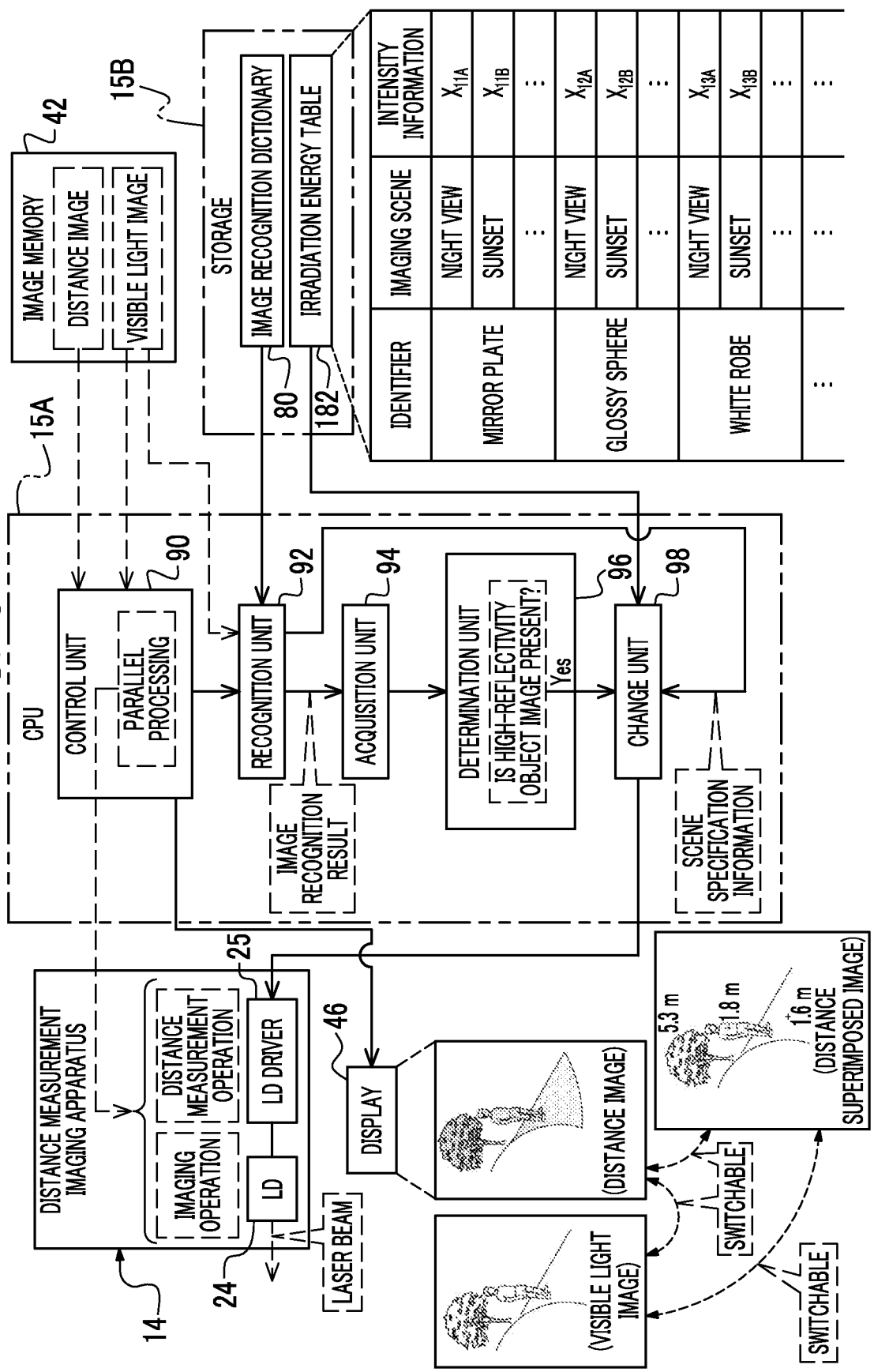
FIG. 25 is a functional block diagram showing a second modification example of the function of the CPU in a case in which the distance measurement imaging processing is performed by the CPU provided in the smart device according to the embodiment.

In this case, as shown in FIG. 25 as an example, the recognition unit 92 specifies the imaging scene of the imaging region indicated by the visible light image by acquiring the visible light image from the image memory 42 and performing the image recognition on the acquired visible light image. Specifically, the recognition unit 92 specifies the imaging scene with reference to the image recognition dictionary 80. The image recognition dictionary 80 includes information in which an imaging scene image showing the imaging scene and scene specification information for specifying the imaging scene indicated by the imaging scene image. The recognition unit 92 performs the image recognition on the visible light image acquired from the image memory 42 with reference to the image recognition dictionary 80. That is, the recognition unit 92 specifies the imaging scene image corresponding to the visible light image from the image recognition dictionary 80, and acquires the scene specification information corresponding to the specified imaging scene image from the image recognition dictionary 80.

The change unit 98 derives the intensity information corresponding to the imaging scene specified by the scene specification information acquired by the recognition unit 92 and the identifier included in the image recognition result from the irradiation energy table 182. Moreover, the change unit 98 changes the intensity of the laser beam to the intensity indicated by the intensity information derived from the irradiation energy table 182. Note that, in the example shown in FIG. 25, the recognition unit 92 is an example of a "specifying unit" according to the technology of the present disclosure.

Figure 26:
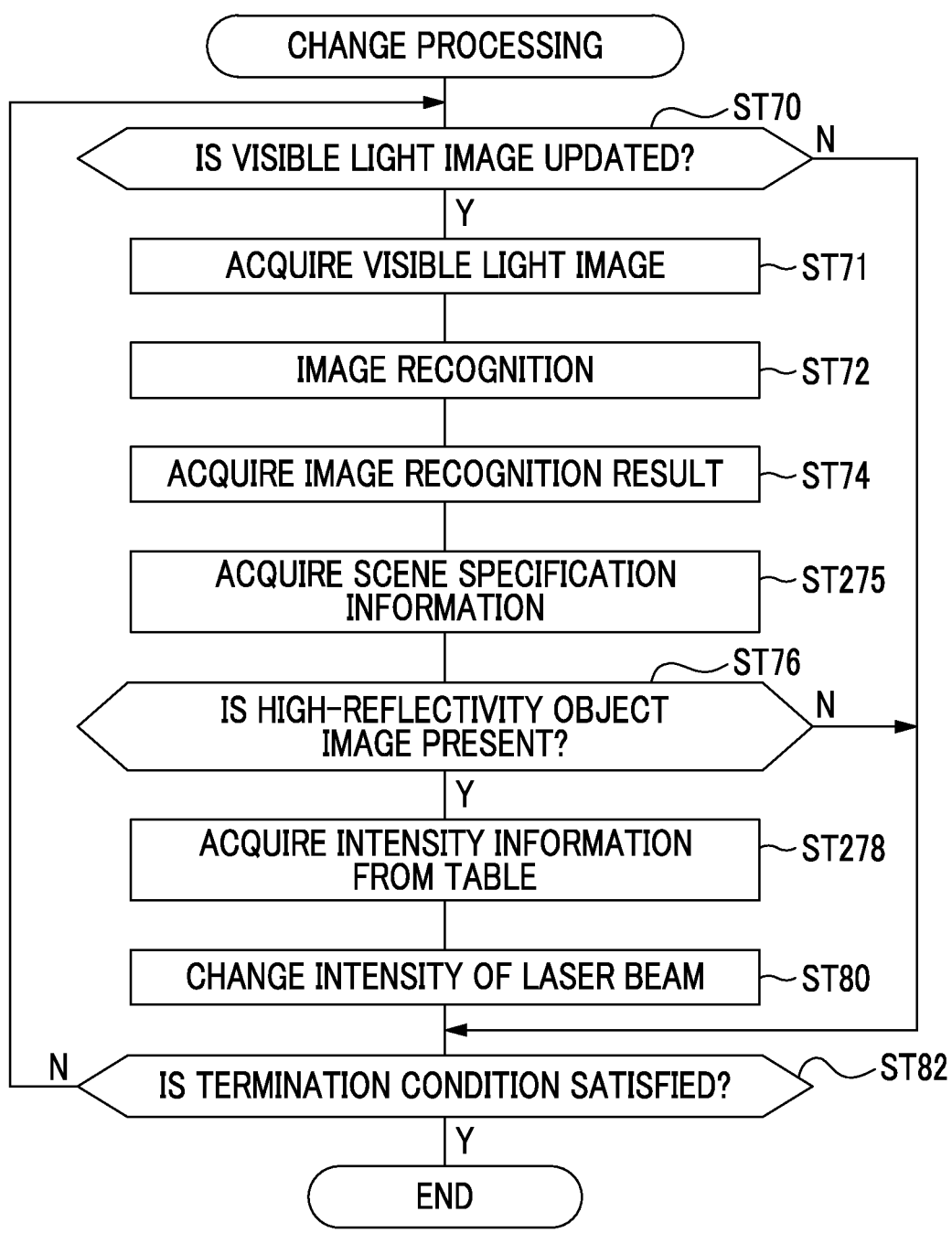
FIG. 26 is a flowchart showing a second modification example of the flow of the change processing according to the embodiment.

In the smart device 10 configured as described above, the change processing shown in FIG. 26 as an example is executed by the CPU 15A. The change processing shown in FIG. 26 is different from the change processing shown in FIG. 24 in that processing of step ST77 is not provided, processing of step ST275 is provided between processing of step ST74 and processing of step ST76, and processing of step ST278 is provided instead of processing of step ST178.

In step ST275, the recognition unit 92 specifies the imaging scene image corresponding to the visible light image from the image recognition dictionary 80, and acquires the scene specification information corresponding to the specified imaging scene image from the image recognition dictionary 80.

In step ST278, the change unit 98 acquires the intensity information corresponding to the identifier included in the image recognition result acquired in step ST74 and the imaging scene specified by the scene specification information acquired in step ST275 from the irradiation energy table 182, and then the change processing proceeds to step ST80.

As described above, in the examples shown in FIGS. 25 and 26, the intensity of the laser beam is changed by the change unit 98 according to the imaging scene specified by the recognition unit 92 and the identifier included in the image recognition result. Therefore, with this configuration, it is possible to reduce the influence of the IR reflected light on the visible light image as compared to a case in which the intensity of the laser beam is determined independently of the imaging scene.

In addition, as in the examples shown in FIGS. 22 to 24, in the examples shown in FIGS. 25 and 26, in a case in which the imaging scene specified by the scene specification information acquired by the recognition unit 92 is the specific imaging scene having the imaging scene reflectivity equal to or more than the reference reflectivity, the intensity of the laser beam is made weaker than the reference intensity by the change unit 98. Therefore, with this configuration, it is possible to reduce the influence of the IR reflected light on the visible light image in the specific imaging scene as compared to a case in which the intensity of the laser beam is always equal to or more than the reference intensity even though the imaging scene specified by the recognition unit 92 is the specific imaging scene having the imaging scene reflectivity equal to or more than the reference reflectivity.

In addition, in the embodiment described above, the aspect example has been described in which the laser beam is emitted to the distance measurement target by the light irradiator 16, but the technology of the present disclosure is not limited to this. For example, the distance measurement may be performed by emitting the auxiliary light for imaging (for example, the visible light used as a so-called red eye prevention measure) to the distance measurement target, and receiving the reflected light of the auxiliary light (hereinafter, also referred to as "auxiliary reflected light") reflected by the distance measurement target by the light receiver 18.

Figure 27:
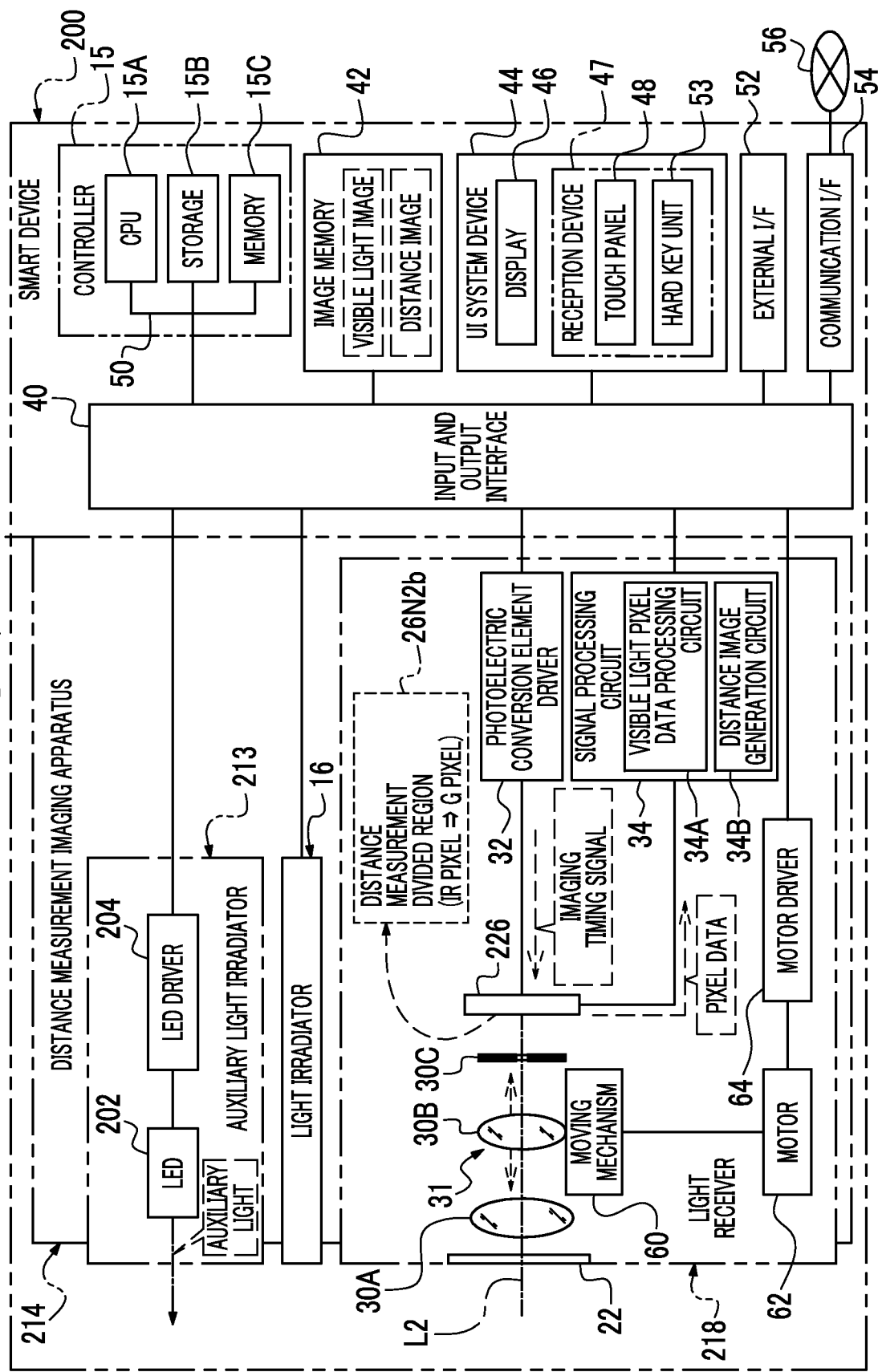
FIG. 27 is a block diagram showing a first modification example of the hardware configuration of the electric system of the smart device according to the embodiment.

In this case, as shown in FIG. 27 as an example, a smart device 200 is used. The smart device 200 is different from the smart device 10 described in the embodiment described above in that a distance measurement imaging apparatus 214 is provided instead of the distance measurement imaging apparatus 14 and a light receiver 218 is provided instead of the light receiver 18. The distance measurement imaging apparatus 214 is different from the distance measurement imaging apparatus 14 in that an auxiliary light irradiator 213 is provided.

The auxiliary light irradiator 213 comprises an LED 202 and an LED driver 204. The LED driver 204 is connected to the LED 202 and the input and output interface 40. The LED driver 204 controls the LED 202 in response to the instruction from the CPU 15A (for example, the control unit 90). The LED driver 204 causes the LED 202 to generate the auxiliary light under the control of the CPU 15A to emit the auxiliary light to the imaging region. Note that the LED 202 is an example of a "light source" according to the technology of the present disclosure.

The light receiver 218 is different from the light receiver 18 in that a photoelectric conversion element 226 is provided instead of the photoelectric conversion element 26. The photoelectric conversion element 226 is different in that a distance measurement designated divided region 26N2b is provided instead of the distance measurement designated divided region 26N2a (see FIG. 16). The distance measurement designated divided region 26N2b is different from the distance measurement designated divided region 26N2a in that the G pixels are applied instead of the IR pixels. The distance measurement designated divided region 26N2b receives the auxiliary reflected light under the control of the control unit 90. Note that the distance measurement designated divided region 26N2b is an example of a "light-receiving element" according to the technology of the present disclosure.

Figure 28:
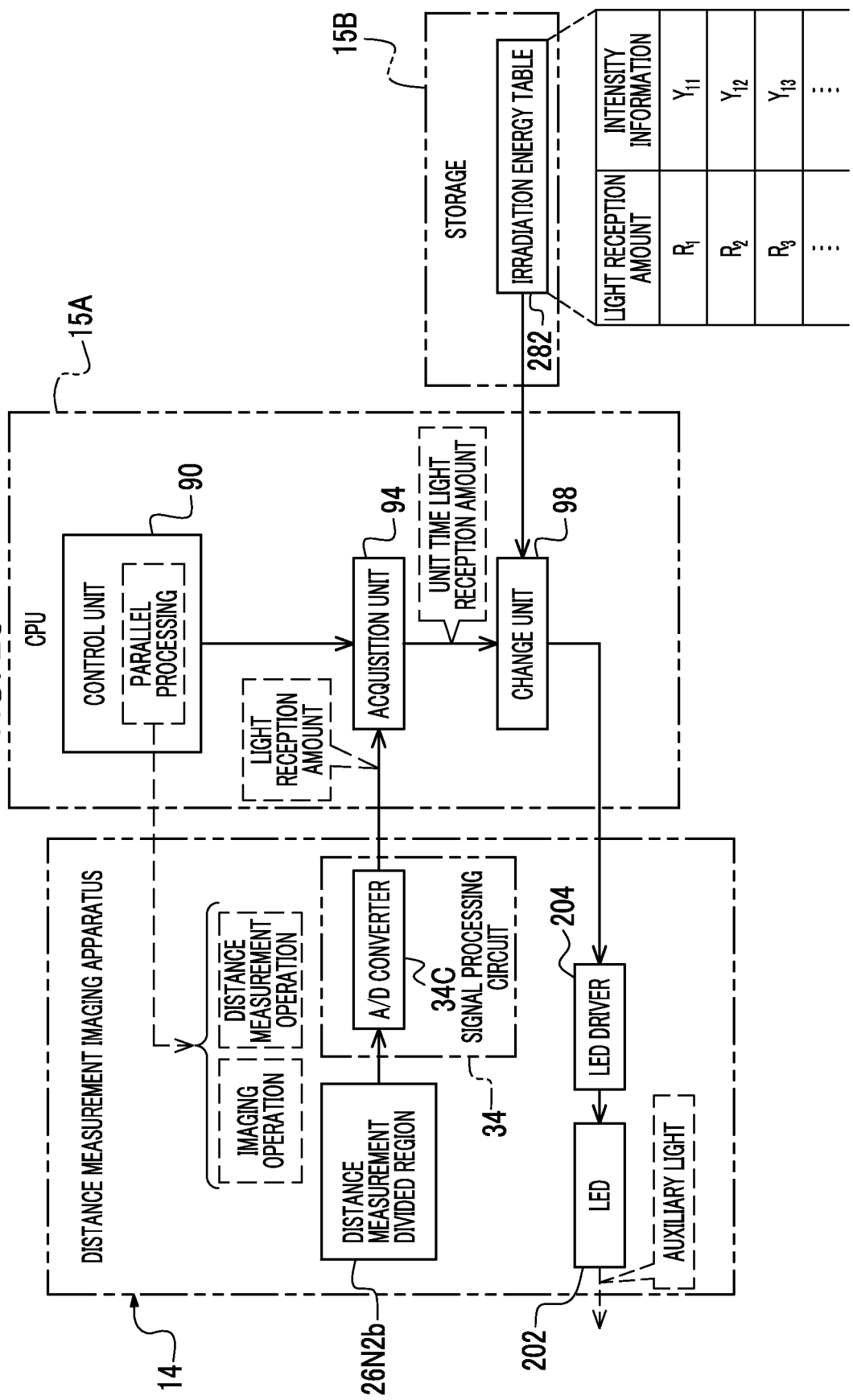
FIG. 28 is a functional block diagram showing a third modification example of the function of the CPU in a case in which the distance measurement imaging processing is performed by the CPU provided in the smart device according to the embodiment.

As shown in FIG. 28 as an example, the CPU 15A realizes the distance measurement imaging processing by being operated as the control unit 90, the acquisition unit 94, and the change unit 98 according to the distance measurement imaging processing program. The signal processing circuit 34 comprises an A/D converter 34C. The A/D converter 34C is connected to the distance measurement designated divided region 26N2b, and digitizes the light reception amount of the auxiliary reflected light received by the distance measurement designated divided region 26N2b.

The acquisition unit 94 acquires the light reception amount digitized by the A/D converter 34C, and acquires, by calculation, the light reception amount per unit time (hereinafter, also referred to as a "unit time light reception amount") of the auxiliary reflected light received by the distance measurement designated divided region 26N2b.

An irradiation energy table 282 is stored in the storage 15B. The irradiation energy table 282 is different from the irradiation energy table 82 in that the unit time light reception amount is applied instead of the identifier.

The change unit 98 acquires the intensity information corresponding to the unit time light reception amount acquired by the acquisition unit 94 from the irradiation energy table 282. Moreover, the change unit 98 changes the intensity of the auxiliary light emitted from the LED 202 via the LED driver 204 to the intensity indicated by the intensity information acquired from the irradiation energy table 282.

In the smart device 200 configured as described above, the change processing shown in FIG. 29 as an example is executed by the CPU 15A.

In the change processing shown in FIG. 29, first, in step ST200, the control unit 90 determines whether or not a condition for causing the LED 202 to emit the auxiliary light (hereinafter, also referred to as "auxiliary light irradiation condition") is satisfied. Examples of the auxiliary light irradiation condition include a condition that the timing of emitting the auxiliary light has arrived as a red eye prevention measure. In a case in which the auxiliary light irradiation condition is not satisfied in step ST200, a negative determination is made, and the change processing proceeds to step ST210. In a case in which the auxiliary light irradiation condition is satisfied in step ST200, a positive determination is made, and the change processing proceeds to step ST202.

In step ST202, the control unit 90 causes the LED 202 to emit the auxiliary light, and then the change processing proceeds to step ST204.

In step ST204, the acquisition unit 94 acquires, by calculation, the light reception amount per unit time (hereinafter, also referred to as the "unit time light reception amount") of the auxiliary reflected light received by the distance measurement designated divided region 26N2b, and then the change processing proceeds to step ST206.

Note that the unit time light reception amount has been described as an example here, but the technology of the present disclosure is not limited to this, and for example, instead of the unit time light reception amount, finely adjusted information obtained by finely adjusting the unit time light reception amount (for example, finely adjusted information obtained by multiplying the unit time light reception amount by a coefficient for fine adjustment) may be applied. Here, the "finely adjusted information" is an example of "information based on the light reception amount per unit time" according to the technology of the present disclosure.

In step ST206, the change unit 98 acquires the intensity information from the irradiation energy table 282, and then the change processing proceeds to step ST208. In this step ST206, the intensity information corresponding to the unit time light reception amount calculated in step ST204 is acquired from the irradiation energy table 282 by the change unit 98.

In step ST208, the change unit 98 changes the intensity of the auxiliary light emitted from the LED 202 via the LED driver 204 to the intensity indicated by the intensity information acquired in step ST206, and then the change processing proceeds to step ST210.

In step ST210, the control unit 90 determines whether or not the change processing termination condition is satisfied. In a case in which the change processing termination condition is not satisfied in step ST210, a negative determination is made, and the change processing proceeds to step ST200. In a case in which the change processing termination condition is satisfied in step ST210, a positive determination is made, and the change processing is terminated.

As described above, in the examples shown in FIGS. 27 to 29, the auxiliary light is emitted from the LED 202 to the distance measurement target, and the auxiliary reflected light is received by the distance measurement designated divided region 26N2b. The information based on the light reception result received by the auxiliary reflected light is acquired by the acquisition unit 94. Moreover, the intensity of the auxiliary light is changed by the change unit 98 according to the information based on the light reception result acquired by the acquisition unit 94. Therefore, with this configuration, it is possible to reduce the influence of the auxiliary reflected light on the visible light image as compared to a case in which the intensity of the auxiliary light is determined independently of the information based on the received light reception result of the auxiliary reflected light.

Figure 29:
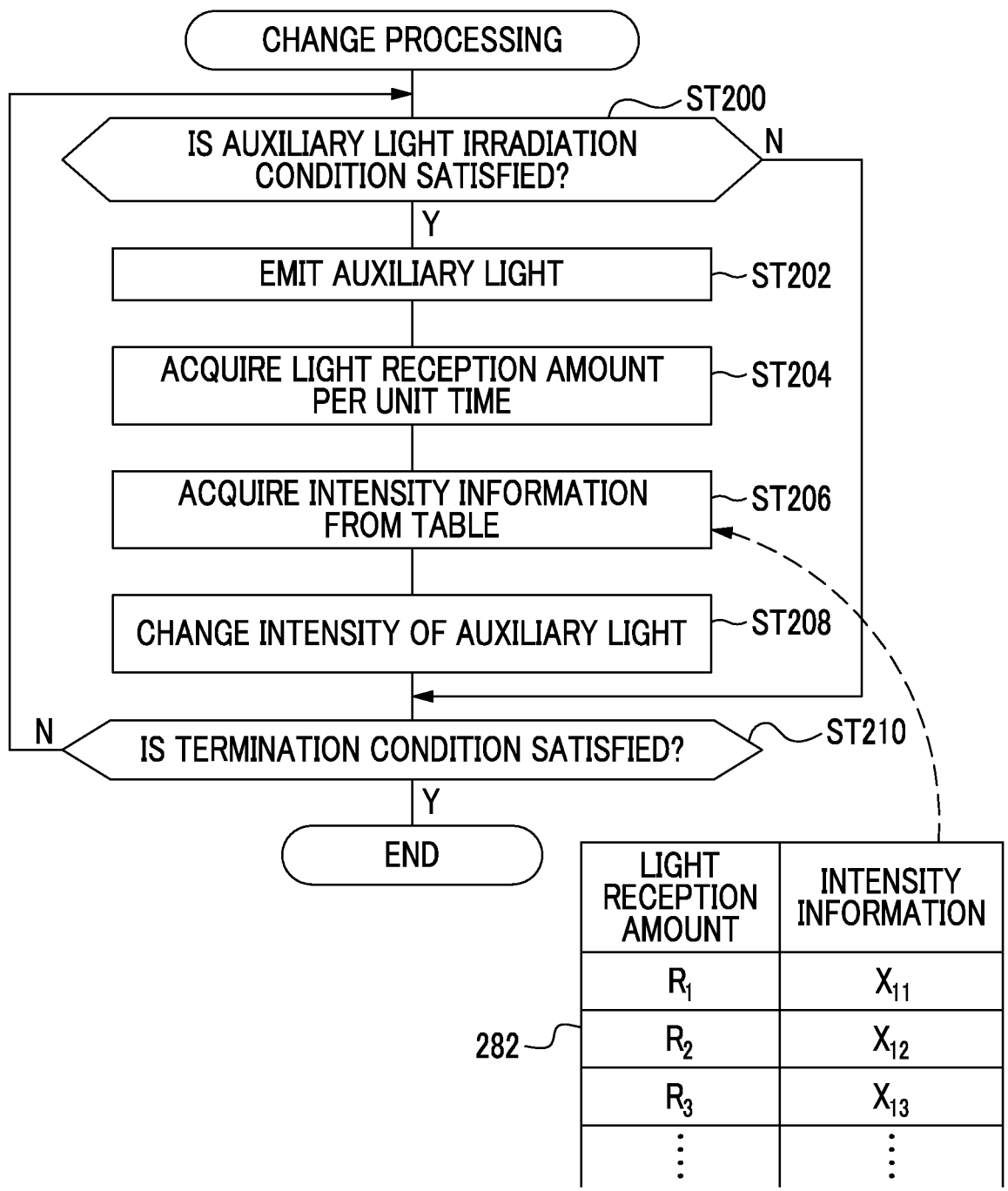
FIG. 29 is a flowchart showing a third modification example of the flow of the change processing according to the embodiment.

In addition, in the examples shown in FIGS. 27 to 29, the unit time light reception amount is acquired by the acquisition unit 94. Moreover, the intensity of the auxiliary light is changed by the change unit 98 according to the unit time light reception amount acquired by the acquisition unit 94. Therefore, with this configuration, it is possible to reduce the influence of the auxiliary reflected light on the visible light image as compared to a case in which the intensity of the auxiliary light is determined independently of the unit time light reception amount.

Figure 30:
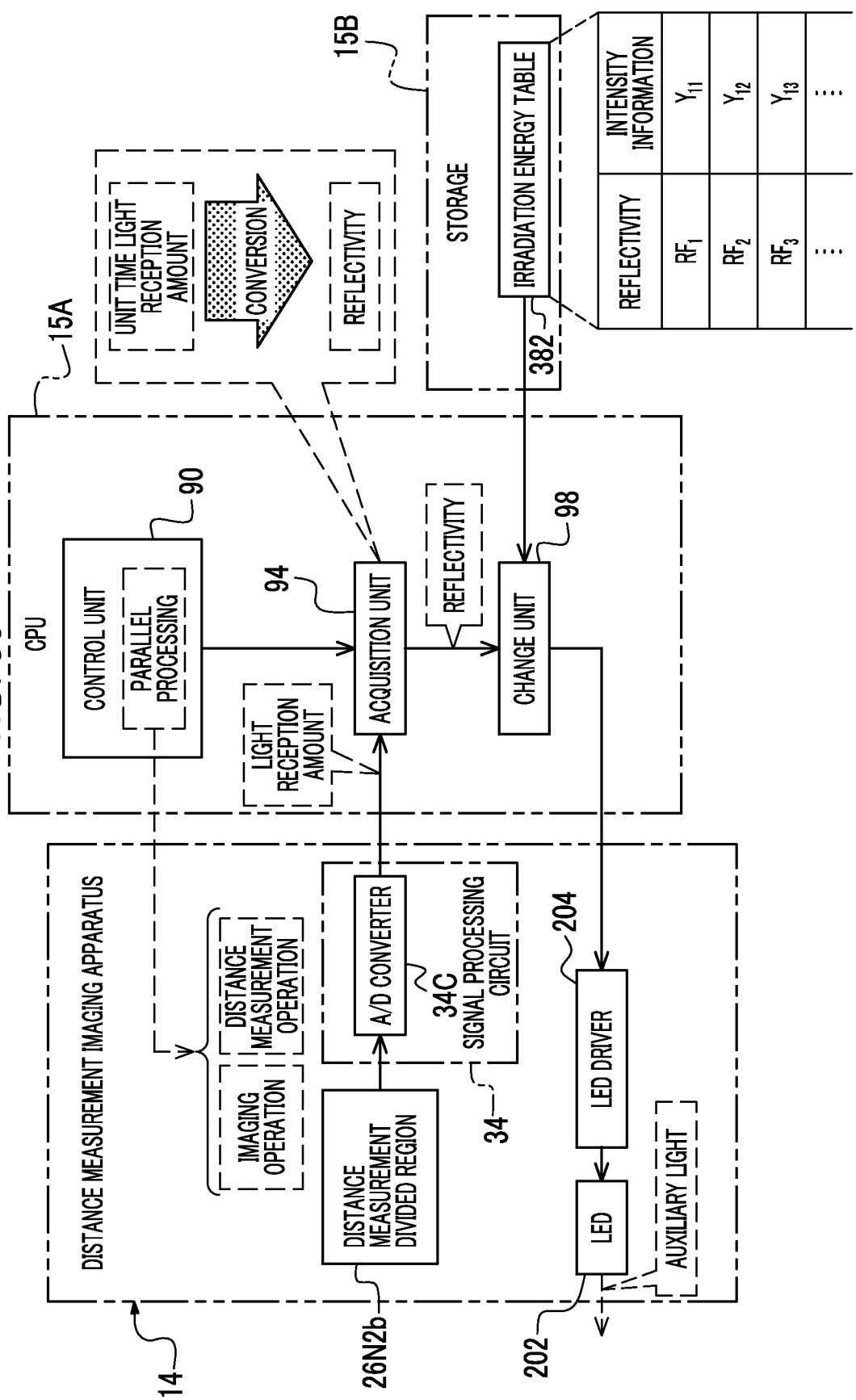
FIG. 30 is a functional block diagram showing a fourth modification example of the function of the CPU in a case in which the distance measurement imaging processing is performed by the CPU provided in the smart device according to the embodiment.

In addition, in the examples shown in FIGS. 27 to 29, the aspect example has been described in which the intensity of the auxiliary light is changed by the change unit 98 according to the intensity information derived from the irradiation energy table 282, but the technology of the present disclosure is not limited to this. For example, as shown in FIG. 30, the acquisition unit 94 may acquire the intensity information by converting the reflectivity in the imaging region (hereinafter, also simply referred to as the "reflectivity") from the unit time light reception amount. Examples of the conversion expression used in a case of converting the reflectivity from the unit time light reception amount include the conversion expression in which the unit time light reception amount is used as an independent variable and the reflectivity in the imaging region is used as a dependent variable. In the example shown in FIG. 30, an irradiation energy table 382 is stored in the storage 15B. The irradiation energy table 382 is different from the irradiation energy table 282 shown in FIG. 28 in that the reflectivity is applied instead of the unit time light reception amount. The change unit 98 acquires the intensity information corresponding to the reflectivity acquired by the acquisition unit 94 from the irradiation energy table 382. Moreover, the change unit 98 changes the intensity indicated by the intensity information acquired from the irradiation energy table 382.

In the smart device 200 configured as described above, the change processing shown in FIG. 31 as an example is executed by the CPU 15A. The change processing shown in FIG. 31 is different from the change processing shown in FIG. 29 in that processing of step ST300 and processing of step ST302 are provided instead of processing of step ST206.

Figure 31:
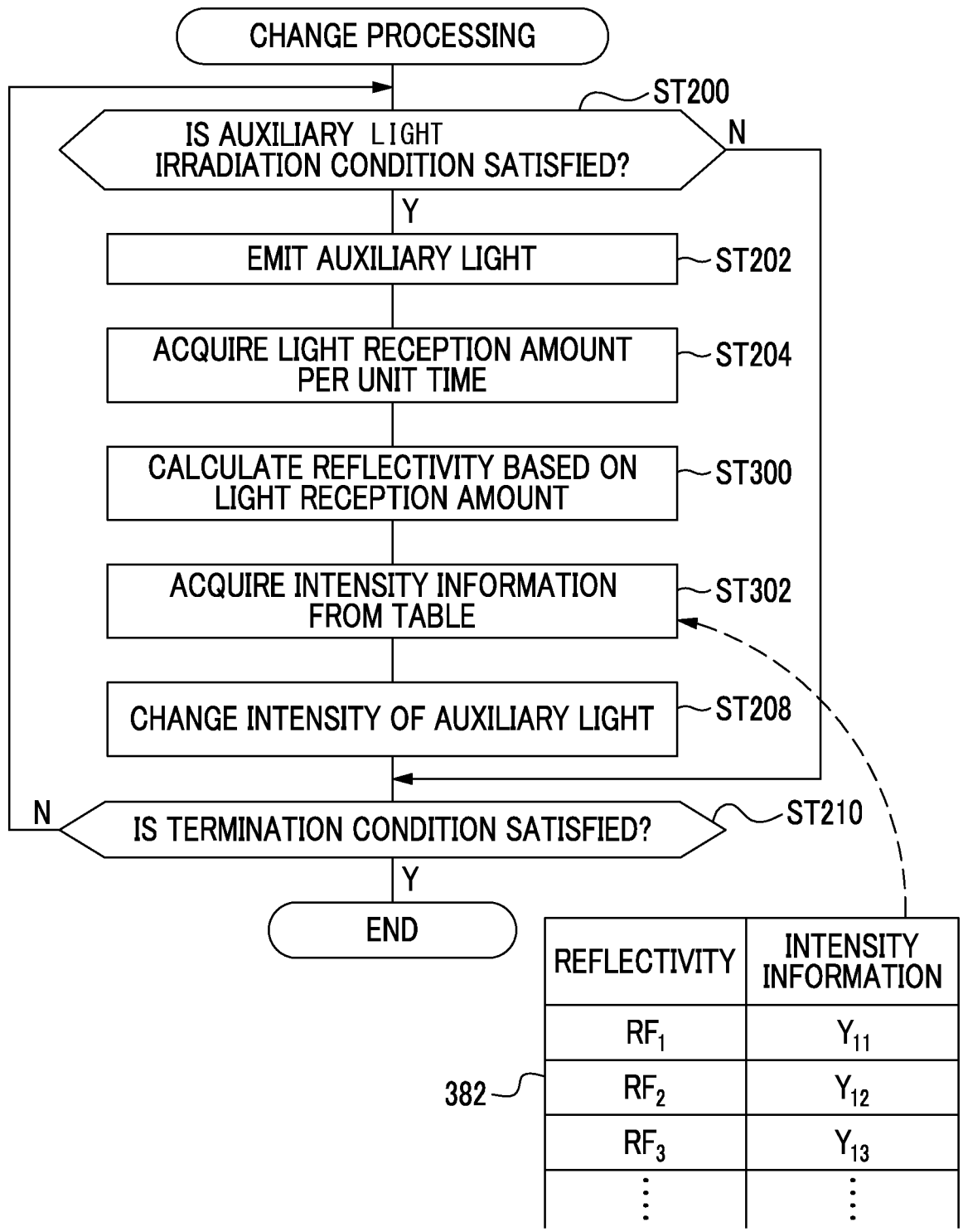
FIG. 31 is a flowchart showing a fourth modification example of the flow of the change processing according to the embodiment.

In the change processing shown in FIG. 31, in step ST300, the acquisition unit 94 calculates the reflectivity based on the unit time light reception amount acquired in step ST204. Specifically, the acquisition unit 94 converts the unit time light reception amount into the reflectivity using the conversion expression.

In subsequent step ST302, the change unit 98 acquires the intensity information corresponding to the reflectivity acquired in the step ST300 from the irradiation energy table 382.

As described above, in the examples shown in FIGS. 30 and 31, the reflectivity in the imaging region is acquired by the acquisition unit 94, and the intensity of the auxiliary light is changed to the intensity by the change unit 98 according to the reflectivity in the imaging region. Therefore, with this configuration, it is possible to reduce the influence of the auxiliary reflected light on the visible light image as compared to a case in which the intensity of the auxiliary light is determined independently of the reflectivity in the imaging region.

In addition, in the examples shown in FIGS. 30 and 31, the aspect example has been described in which the intensity of the auxiliary light is changed by the change unit 98 according to the intensity information acquired by the change unit 98 from the irradiation energy table 382, but the technology of the present disclosure is not limited to this. For example, the change unit 98 may make the intensity of the auxiliary light weaker than the reference intensity in a case in which the reflectivity acquired by the acquisition unit 94 is equal to or more than a threshold value without using the irradiation energy table 382. Here, the threshold value is a value corresponding to the light reception amount, which is derived in advance by a sensory test and/or a computer simulation, as the light reception amount of the auxiliary reflected light in a case in which the auxiliary light having the intensity at which the auxiliary reflected light appears in the visible light image as noise is emitted to the imaging region.

In the smart device 200 configured as described above, the change processing shown in FIG. 32 as an example is executed by the CPU 15A. The change processing shown in FIG. 32 is different from the change processing shown in FIG. 31 in that processing of step ST400 and processing of step ST402 are provided instead of processing of step ST302 and processing of step ST208.

Figure 32:
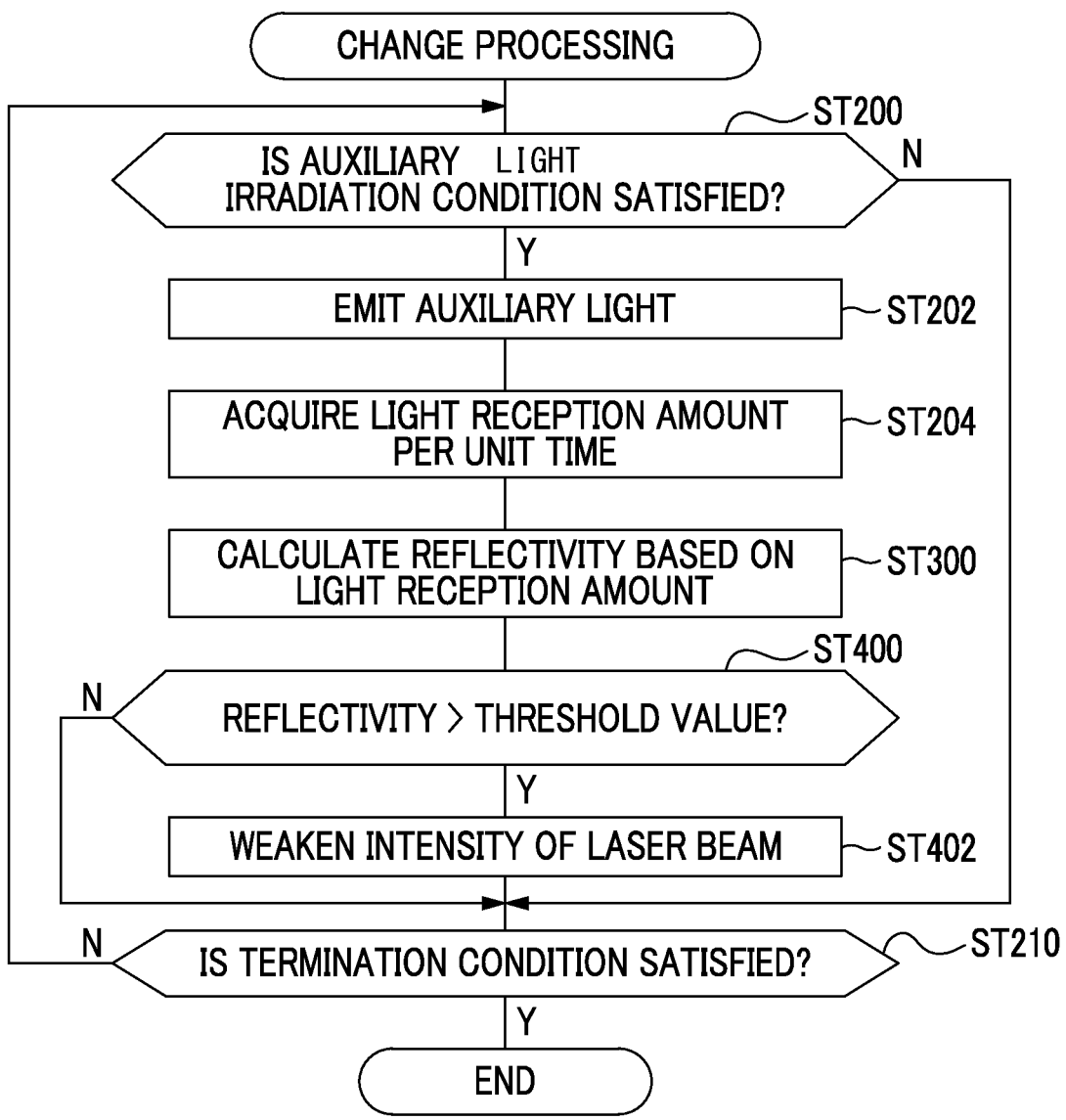
FIG. 32 is a flowchart showing a fifth modification example of the flow of the change processing according to the embodiment.

In the change processing shown in FIG. 32, in step ST400, the change unit 98 determines whether or not the reflectivity calculated in step ST300 is equal to or more than the threshold value. In step ST400, in a case in which the reflectivity calculated in step ST300 is less than the threshold value, a negative determination is made, and the change processing proceeds to step ST210. In step ST400, in a case in which the reflectivity calculated in step ST300 is equal to or more than the threshold value, a positive determination is made, and the change processing proceeds to step ST402.

In step ST402, the change unit 98 make the intensity of the auxiliary light weaker than the reference intensity, and then the change processing proceeds to step ST210.

As described above, in a case in which the reflectivity converted from the unit time light reception amount is equal to or more than the threshold value, the intensity of the auxiliary light is made weaker than the reference intensity by the change unit 98. Therefore, with this configuration, it is possible to reduce the influence of the auxiliary reflected light on the visible light image as compared to a case in which the intensity of the auxiliary light is always equal to or more than the reference intensity regardless of whether or not the reflectivity converted from the unit time light reception amount is equal to or more than the threshold value.

In addition, in the examples shown in FIGS. 27 to 32, the auxiliary light emitted by the LED 202 has been described as an example, but the technology of the present disclosure is not limited to this, and in the examples shown in FIGS. 27 to 32, the technology of the present disclosure is established even in a case in which the auxiliary light is replaced with the laser beam. Note that, in the following, for convenience of description, the auxiliary light and the laser beam are referred to as the "distance measurement light" in a case in which the distinction is not necessary, and the auxiliary reflected light and the IR reflected light are referred to as the "reflected light" in a case in which the distinction is not necessary.

In addition, in the embodiment described above, the aspect example has been described in which the intensity of the distance measurement light is changed by the change unit 98 regardless of whether or not it is the timing at which the main exposure is performed, but the technology of the present disclosure is not limited to this. For example, the intensity of the distance measurement light may be changed by the change unit 98 according to the timing of the main exposure performed during the imaging operation. The timing of the main exposure refers to, for example, the timing at which the exposure is performed in the imaging for the still image.

Figure 33:
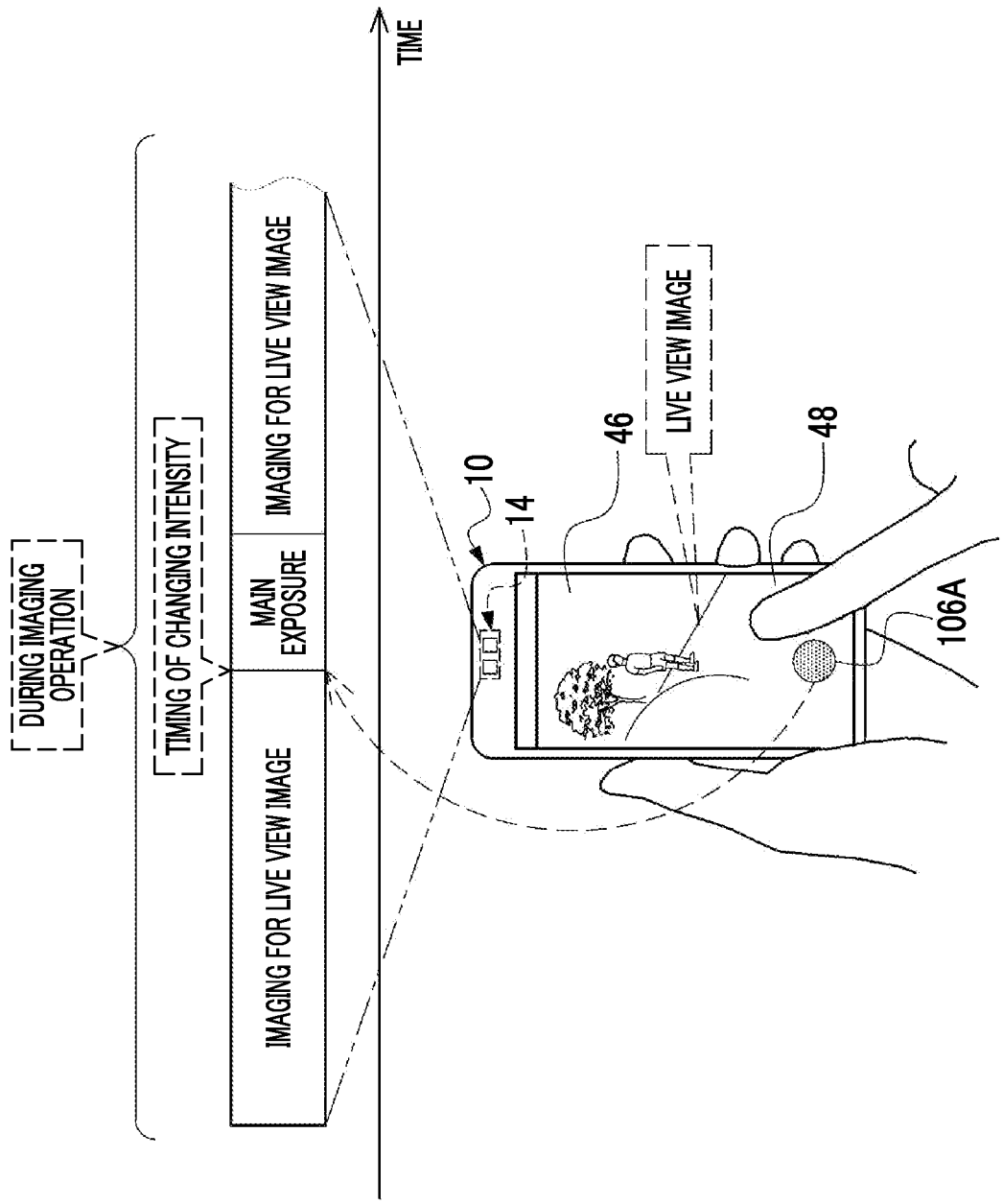
FIG. 33 is a conceptual diagram showing an example of a timing of changing the intensity of distance measurement light emitted by the distance measurement imaging apparatus provided in the smart device according to the embodiment.

In this case, as shown in FIG. 33 as an example, the display 46 displays the live view image and a soft key 106A under the control of the control unit 90. The soft key 106A is turned on by the user or the like in a case in which the user or the like gives an instruction for starting the imaging for the still image. In a case in which the soft key 106A is turned on by the user or the like in a state in which the imaging for the live view image is performed by the distance measurement imaging apparatus 14, the intensity of the distance measurement light is changed by the change unit 98 according to the timing of the main exposure. As a result, it is possible to emit the distance measurement light to the imaging region at an appropriate intensity during the main exposure as compared to a case in which the intensity of the distance measurement light is changed at a timing independently of the main exposure.

Figure 34:
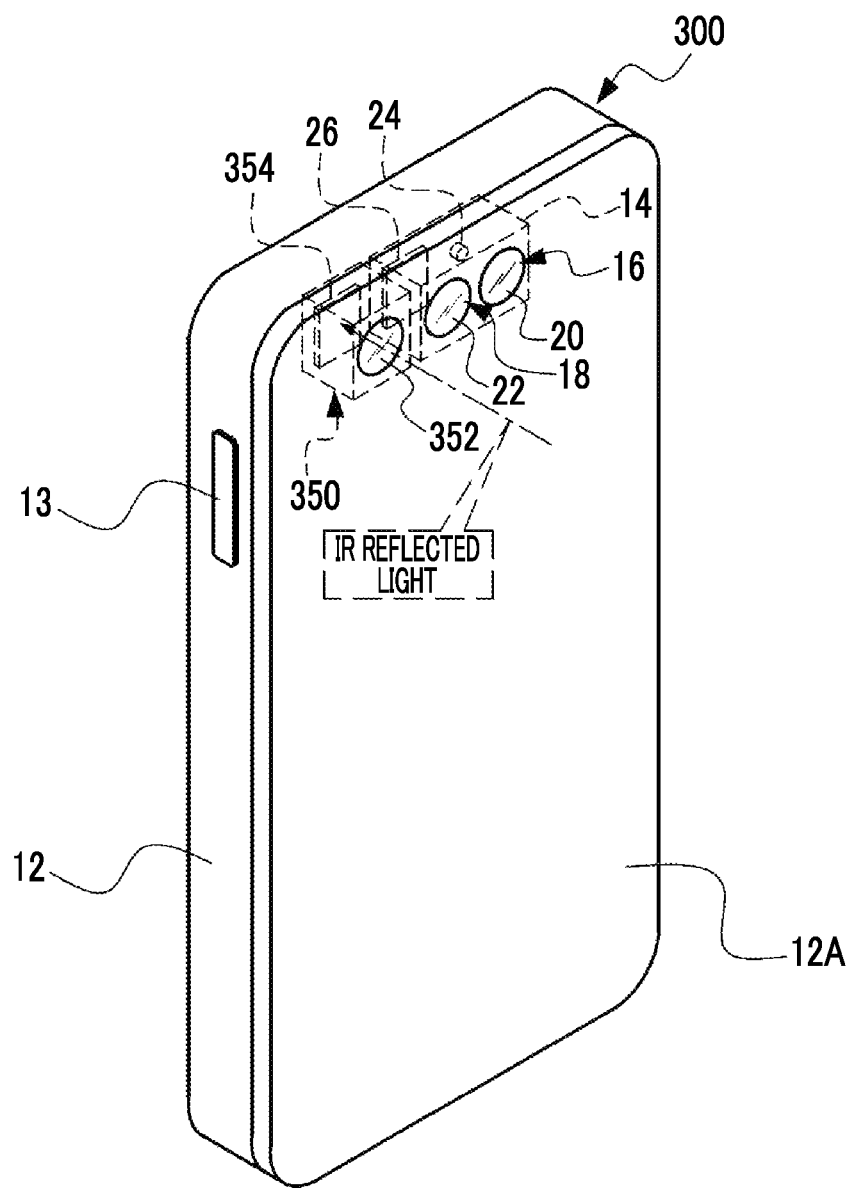
FIG. 34 is a schematic perspective view showing a first modification example of the appearance configuration of the smart device according to the embodiment.

In addition, in the embodiment described above, the smart device 10 equipped with the light receiver 18 has been described as an example, but the technology of the present disclosure is not limited to this, and for example, as shown in FIG. 34, the technology of the present disclosure is established even in a case in which a smart device 300 is equipped with the light receivers 18 and 350. As shown in FIG. 34 as an example, a light transmitting window 352, which is adjacent to the light transmitting window 22, is provided in the upper left portion of the rear surface 12A of the housing 12 in a case in which the smart device 10 is put into a vertically placed state (the upper left portion of the rear view of the smart device 10 in the vertically placed state). The light transmitting window 352 is an optical element having transmittance (for example, a lens) like the light transmitting windows 20 and 22, and the light transmitting windows 20, 22, and 352 are arranged at a predetermined interval along the horizontal direction. The light transmitting window 352 is also exposed from the rear surface 12A like the light transmitting windows 20 and 22.

The light receiver 350 comprises a photoelectric conversion element 354. The photoelectric conversion element 354 is a photoelectric conversion element specialized for receiving the IR reflected light, and has a plurality of IR pixels arranged in a matrix. Examples of the plurality of IR pixels include photodiode auto (for example, InGaAs APD) for the IR pixels for "4896×3265" pixels. The photoelectric conversion element 354 receives the IR reflected light taken into the light receiver 350 through the light transmitting window 352, and outputs the electric signal according to the light amount of the received IR reflected light to the signal processing circuit 34 (see FIG. 9).

Figure 35:
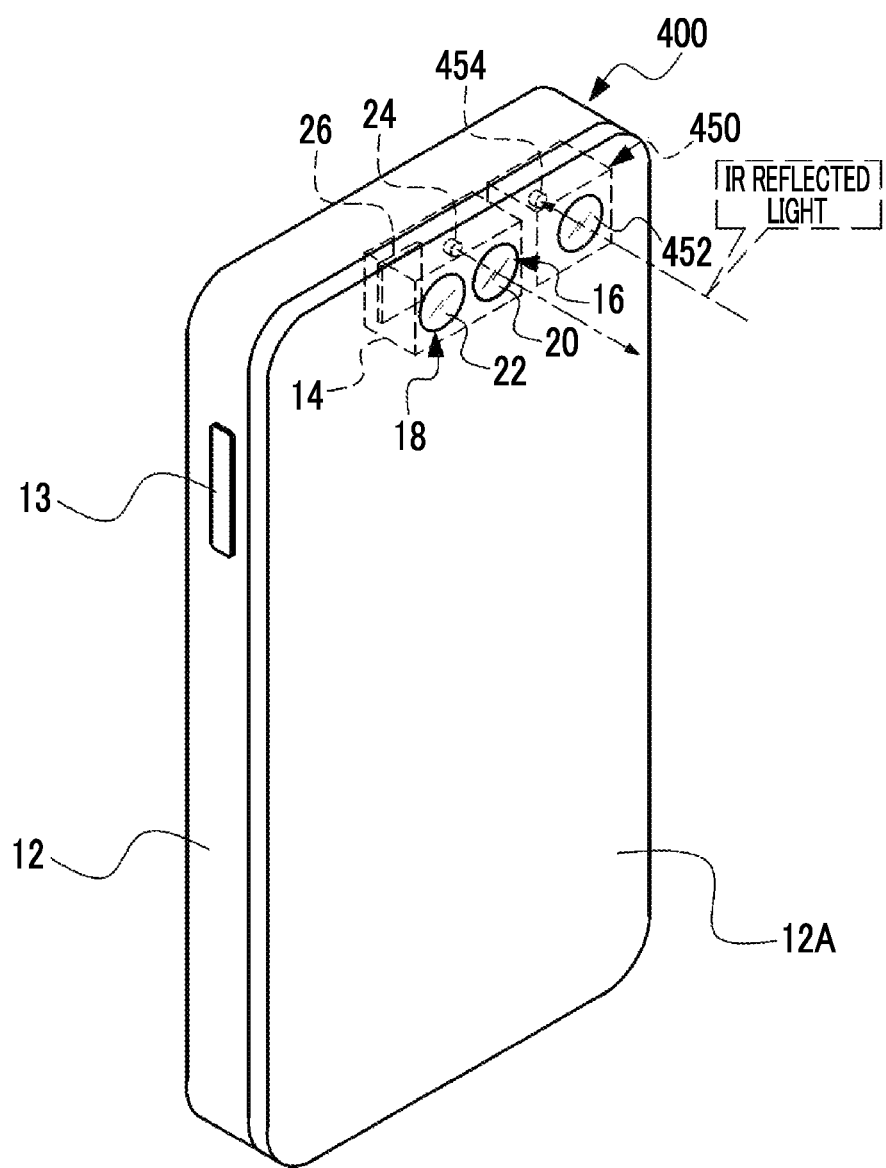
FIG. 35 is a schematic perspective view showing a second modification example of the appearance configuration of the smart device according to the embodiment.

In addition, in the example shown in FIG. 34, the smart device 300 equipped with the light receivers 18 and 350 is described, but the technology of the present disclosure is not limited to this, and for example, as shown in FIG. 35, the technology of the present disclosure is established even in a case in which a smart device 400 is equipped with the light receivers 18 and 450. As shown in FIG. 35 as an example, a light transmitting window 452, which is adjacent to the light transmitting window 20, is provided in the upper left portion of the rear surface 12A of the housing 12 in a case in which the smart device 10 is put into a vertically placed state (the upper left portion of the rear view of the smart device 10 in the vertically placed state). The light transmitting window 452 is an optical element having transmittance (for example, a lens) like the light transmitting windows 20 and 22, and the light transmitting windows 452, 20, and 22 are arranged at a predetermined interval along the horizontal direction. The light transmitting window 452 is also exposed from the rear surface 12A like the light transmitting windows 20 and 22.

The light receiver 450 comprises a single photodiode 454. The photodiode 454 is, for example, a photodiode capable of receiving the IR reflected light. Examples of the photodiode 454 include InGaAs APD. The photodiode 454 receives the IR reflected light taken into the light receiver 450 through the light transmitting window 452, and outputs the electric signal according to the light amount of the received IR reflected light to the signal processing circuit 34 (see FIG. 9).

In addition, in the embodiment described above, the aspect example has been described in which the distance image is generated by the distance image generation circuit 34B, but the technology of the present disclosure is not limited to this, and the operation of measuring the distance from the smart device 10 to the distance measurement target may be performed by the distance measurement imaging apparatus 14 as the distance measurement operation without generating the distance image.

In addition, in the embodiment described above, the aspect example has been described in which the intensity of the distance measurement light is changed, but the technology of the present disclosure is not limited to this, and the irradiation energy of the distance measurement light may be changed by changing the emission time of the distance measurement light and/or the number of times of emission of the distance measurement light per unit time instead of the intensity of the distance measurement light or together with the intensity of the distance measurement light.

In addition, in the embodiment described above, the distance measurement is performed by narrowing down the distance measurement target (so called ROI) designated by the user or the like by changing the distance measurement divided region 26N2 to the distance measurement designated divided region 26N2a, but a method of narrowing down the distance measurement target is not limited to this. For example, a control of changing a beam diameter and/or direction of the laser beam by the control unit 90 in response to the instruction received by the reception device 47 may be performed such that the laser beam is emitted to the distance measurement target designated by the user or the like.

In addition, in the embodiment described above, the laser beam has been described as an example of the "directional light beam" according to the technology of the present disclosure, but the technology of the present disclosure is not limited to this, and instead of the laser beam, super-luminescent light may be used, and the distance measurement need only be performed by using the light having the directivity at which the distance measurement can be performed.

Figure 36:
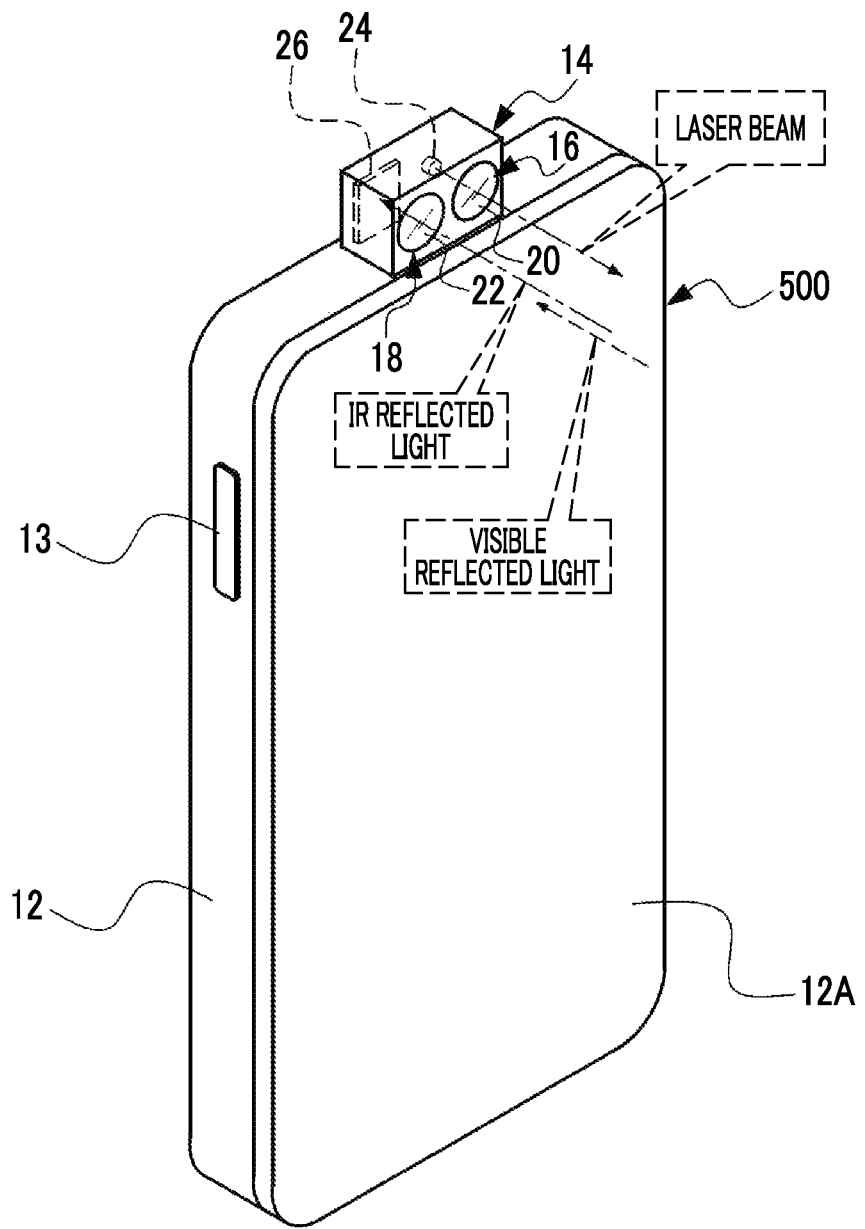
FIG. 36 is a schematic perspective view showing an example of an appearance configuration in which the distance measurement imaging apparatus and the smart device according to the embodiment are combined.

In addition, in the embodiment described above, the aspect example has been described in which the distance measurement imaging apparatus 14 is built in the smart device 10, but the technology of the present disclosure is not limited to this. For example, as shown in FIG. 36, the distance measurement imaging apparatus 14 may be externally attached to a general smart device 500, that is, the smart device 500 in which the distance measurement imaging apparatus 14 is not built.

In addition, in the embodiment described above, the aspect example has been described in which the UI system device 44 is incorporated in the smart device 10, but at least a part of a plurality of components provided in the UI system device 44 may be externally attached to the smart device 10. In addition, at least a part of the plurality of components provided in the UI system device 44 may be used by being connected to the external I/F 52 as a separate body.

In addition, in the example shown in FIG. 1, the smart device 10 has been described as an example, but the technology of the present disclosure is not limited to this. That is, the technology of the present disclosure can also be applied to various electronic apparatuses (for example, an interchangeable lens camera, a fixed lens camera, a personal computer, and/or a wearable terminal device) in which the distance measurement imaging apparatus 14 is built, and even with these electronic apparatuses, the same operations and effects as those of the smart device 10 can be obtained.

In addition, in the embodiment described above, the display 46 has been described as an example, but the technology of the present disclosure is not limited to this. For example, a separate display retrofitted to the smart device 10 may be used as a "display unit" according to the technology of the present disclosure.

In addition, in the embodiment described above, the aspect example has been described in which the recognition unit 92 is mounted in the smart device 10, but the technology of the present disclosure is not limited to this. For example, an external device including the recognition unit 92 (for example, another smart device, a personal computer and/or a server) may be connected to the smart device 10. In this case, the image recognition result provided to the smart device 10 from the external device need only be acquired by the acquisition unit 94 of the smart device 10. In addition, the cloud computing (not shown) may be provided with the function of the recognition unit 92, and the cloud computing may provide the image recognition result to the smart device 10. In this case, the image recognition result provided to the smart device 10 from the cloud computing need only be acquired by the acquisition unit 94 of the smart device 10.

Figure 37:
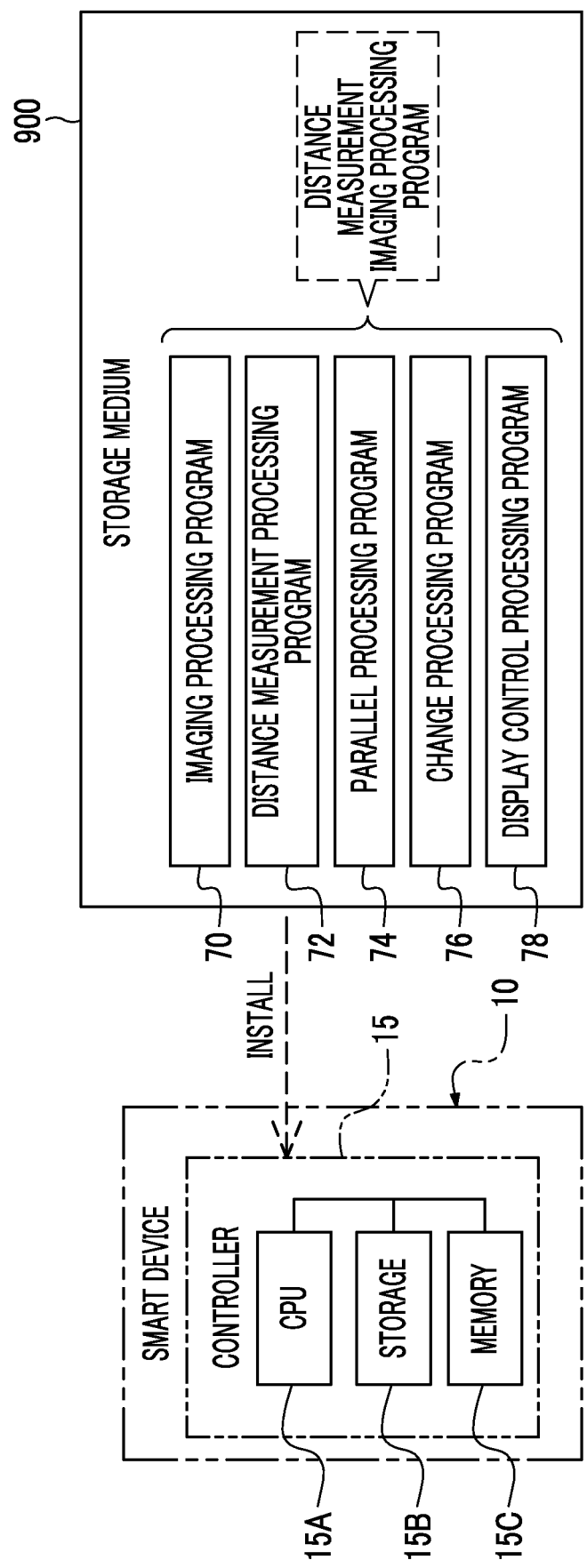
FIG. 37 is a conceptual diagram showing an example of an aspect in which a distance measurement imaging processing program according to the embodiment is installed in the smart device.

In addition, in the embodiment described above, the aspect example has been described in which the distance measurement imaging processing program is stored in the storage 15B, but the technology of the present disclosure is not limited to this. For example, the distance measurement imaging processing program may be stored in the storage medium 900, as shown in FIG. 37. Examples of the storage medium 900 include any portable storage medium, such as an SSD or a USB memory, which is a non-transitory storage medium.

The distance measurement imaging processing program stored in the storage medium 900 is installed in the controller 15. The CPU 15A executes the distance measurement imaging processing according to the distance measurement imaging processing program.

In addition, the distance measurement imaging processing program may be stored in a storage unit of another computer or server device connected to the controller 15 via a communication network (not shown), and the distance measurement imaging processing program may be downloaded in response to a request of the smart device 10 and installed in the controller 15.

Note that it is not necessary to store the entire distance measurement imaging processing program in the storage unit of the other computer or server device connected to the controller 15, or the storage 15B, and a part of the distance measurement imaging processing program may be stored.

In the example shown in FIG. 37, the aspect example has been described in which the controller 15 is built in the smart device 10, but the technology of the present disclosure is not limited to this, and for example, the controller 15 may be provided outside the smart device 10.

In the example shown in FIG. 37, the CPU 15A is one CPU, but may be a plurality of CPUs. In addition, a GPU may be applied instead of the CPU 15A.

In the example shown in FIG. 37, the controller 15 has been described as an example, but the technology of the present disclosure is not limited to this, and a device including an ASIC, an FPGA, and/or a PLD may be applied instead of the controller 15. In addition, instead of the controller 15, a hardware configuration and a software configuration may be used in combination.

The following various processors can be used as a hardware resource for executing the distance measurement imaging processing described in the embodiment described above. Examples of the processor include the CPU, which is a general-purpose processor that functions as software, that is, a hardware resource for executing the distance measurement imaging processing by executing the program. In addition, examples of the processor include a dedicated electric circuit which is a processor having a circuit configuration specially designed for executing specific processing, such as an FPGA, a PLD, or an ASIC. A memory is also built in or connected to each processor, and each processor executes the distance measurement imaging processing by using the memory.

The hardware resource for executing the distance measurement imaging processing may be configured by one of the various processors, or may be a combination of two or more processors of the same type or different types (for example, a combination of a plurality of FPGAs or a combination of a CPU and an FPGA). In addition, the hardware resource for executing the distance measurement imaging processing may be one processor.

Examples of the configuration with one processor include, first, a mode in which one processor is configured by a combination of one or more CPUs and software, and this processor functions as the hardware resource for executing the distance measurement imaging processing. Secondly, as represented by SoC, there is a mode in which a processor that realizes the functions of the whole system including a plurality of the hardware resources for executing the distance measurement imaging processing with one IC chip is used. As described above, the distance measurement imaging processing is realized by using one or more of the various processors described above as the hardware resource.

Further, as the hardware structures of these various processors, more specifically, an electric circuit in which circuit elements, such as semiconductor elements, are combined can be used. In addition, the distance measurement imaging processing is merely an example. Therefore, it is needless to say that unnecessary steps may be deleted, new steps may be added, or the processing order may be changed within a range that does not deviate from the gist.

The contents described and shown above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the contents described and shown above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and represented by "and/or", the same concept as "A and/or B" is applied.

All of the documents, the patent applications, and the technical standards described in the present specification are incorporated in the present specification by referring to the same extent as a case in which individual document, patent application, and technical standard are specifically and individually noted to be incorporated by reference.

With respect to the embodiment described above, the following supplementary note will be further disclosed.

SUPPLEMENTARY NOTE

A processing apparatus including a processor, and a memory connected to or built in the processor, in which the processor executes a process including performing a control of performing an imaging operation by an imaging unit that images an imaging region, and a distance measurement operation in which a distance measurement unit performs distance measurement by emitting light to the imaging region and receiving reflected light of the light from the imaging region, acquiring reflectivity information for specifying a reflectivity in the imaging region, and changing irradiation energy of the light according to the acquired reflectivity information in a state in which the imaging operation and the distance measurement operation are performed.

What is claimed is:

1. A processing apparatus comprising:
a first processor; and
a memory coupled to or built in the first processor,
wherein the first processor
performs control for performing an imaging operation by an imaging apparatus that images an imaging region, and a distance measurement operation in which a distance measurement device performs distance measurement by emitting light to the imaging region and receiving reflected light of the light from the imaging region,
acquires reflectivity information for specifying a reflectivity in the imaging region, and
changes irradiation energy of the light according to the acquired reflectivity information in a state in which the imaging operation and the distance measurement operation are being performed,
the distance measurement device includes a TOF camera,
the TOF camera has a plurality of photoelectric conversion pixels,
the distance measurement is performed by using the reflected light received only by at least one photoelectric conversion pixel included in a designated region among the plurality of photoelectric conversion pixels, and
the at least one photoelectric conversion pixel is a photoelectric conversion pixel at a position corresponding to a position of an image region designated in a screen in a state in which an imaging region image obtained by imaging the imaging region by the imaging apparatus is displayed.

2. The processing apparatus according to claim 1,
wherein the reflectivity information is information based on an imaging region image obtained by imaging the imaging region by the imaging apparatus.

3. The processing apparatus according to claim 2,
wherein the information based on the imaging region image is an image recognition result obtained by performing image recognition on the imaging region image by a second processor.

4. The processing apparatus according to claim 3,
wherein the first processor acquires the image recognition result based on a learning result obtained by machine learning with respect to a correspondence relationship between an image and a subject recognition result.

5. The processing apparatus according to claim 3,
wherein the second processor performs the image recognition based on dictionary data in which an image showing an object having a reflectivity equal to or more than a reference reflectivity and an identifier capable of specifying the image showing the object are associated with each other.

6. The processing apparatus according to claim 3,
wherein in a case in which the image recognition result acquired by the first processor is an image recognition result indicating that an image showing an object having a reflectivity equal to or more than a reference reflectivity is included in the imaging region image, the first processor makes the irradiation energy weaker than first reference irradiation energy.

7. The processing apparatus according to claim 6,
wherein the object is a predetermined object, which is as a glossy object.

8. The processing apparatus according to claim 6,
wherein the object is a predetermined object, which is a white object.

9. The processing apparatus according to claim 7,
wherein the predetermined object is a mirror-like object.

10. The processing apparatus according to claim 1,
wherein the first processor changes the irradiation energy of the light according to imaging scene indication information for indicating an imaging scene received by a reception device capable of receiving the imaging scene indication information, and the reflectivity information acquired by the first processor.

11. The processing apparatus according to claim 10,
wherein, in a case in which the imaging scene indicated by the imaging scene indication information received by the reception device is a specific imaging scene having an imaging scene reflectivity equal to or more than a reference reflectivity, the first processor makes the irradiation energy weaker than second reference irradiation energy.

12. The processing apparatus according to claim 1,
wherein the first processor changes the irradiation energy of the light according to an imaging scene specified by the first processor, which is capable of specifying the imaging scene based on an imaging region image obtained by imaging the imaging region by the imaging apparatus, and the reflectivity information acquired by the first processor.

13. The processing apparatus according to claim 12,
wherein in a case in which the imaging scene specified by the first processor is a specific imaging scene having an imaging scene reflectivity equal to or more than a reference reflectivity, the first processor makes the irradiation energy weaker than third reference irradiation energy.

14. The processing apparatus according to claim 1,
wherein the first processor performs control for generating auxiliary light that is an LED light in addition to a laser light as the light from a light source, and receiving auxiliary reflected light of the auxiliary light from the imaging region by a light-receiving element, and
the reflectivity information is information based on a light reception result of the auxiliary reflected light received by the light-receiving element.

15. The processing apparatus according to claim 14,
wherein the information based on the light reception result is information based on a light reception amount per unit time of the auxiliary reflected light received by the light-receiving element.

16. The processing apparatus according to claim 14,
wherein, in a case in which the reflectivity specified by the acquired reflectivity information is equal to or more than a threshold value, the processor makes the irradiation energy weaker than fourth reference irradiation energy.

17. The processing apparatus according to claim 1,
wherein the processor displays a distance image generated by the TOF camera on a display.

18. The processing apparatus according to claim 1,
wherein the first processor changes the irradiation energy according to a timing of main exposure performed during the imaging operation.

19. The processing apparatus according to claim 1,
wherein the imaging operation includes an imaging operation for a live view image in which the imaging apparatus images the imaging region for a live view image.

20. The processing apparatus according to claim 1,
wherein the distance measurement operation is a distance measurement operation for focusing by the imaging apparatus.

21. The processing apparatus according to claim 20,
wherein the imaging apparatus performs focusing on the imaging region based on a distance measurement result obtained by the distance measurement performed by the distance measurement operation for focusing.

22. The processing apparatus according to claim 1,
wherein the light is a directional light beam.

23. An electronic apparatus comprising:
the processing apparatus according to claim 1;
the imaging apparatus; and
the distance measurement device.

24. A processing method comprising:
performing control for performing an imaging operation by an imaging apparatus that images an imaging region, and a distance measurement operation in which a distance measurement device performs distance measurement by emitting light to the imaging region and receiving reflected light of the light from the imaging region;
acquiring reflectivity information for specifying a reflectivity in the imaging region; and
changing irradiation energy of the light according to the acquired reflectivity information in a state in which the imaging operation and the distance measurement operation are being performed,
wherein the distance measurement device includes a TOF camera,
the TOF camera has a plurality of photoelectric conversion pixels,
the distance measurement is performed by using the reflected light received only by at least one photoelectric conversion pixel included in a designated region among the plurality of photoelectric conversion pixels, and
the at least one photoelectric conversion pixel is a photoelectric conversion pixel at a position corresponding to a position of an image region designated in a screen in a state in which an imaging region image obtained by imaging the imaging region by the imaging apparatus is displayed.

25. A non-transitory computer-readable storage medium storing a program executable by a computer to perform a process comprising:
performing control for performing an imaging operation by an imaging apparatus that images an imaging region, and a distance measurement operation in which a distance measurement device performs distance measurement by emitting light to the imaging region and receiving reflected light of the light from the imaging region;

acquiring reflectivity information for specifying a reflectivity in the imaging region; and changing irradiation energy of the light according to the acquired reflectivity information in a state in which the imaging operation and the distance measurement operation are being performed, wherein the distance measurement device includes a TOF camera, the TOF camera has a plurality of photoelectric conversion pixels, the distance measurement is performed by using the reflected light received only by at least one photoelectric conversion pixel included in a designated region among the plurality of photoelectric conversion pixels, and the at least one photoelectric conversion pixel is a photoelectric conversion pixel at a position corresponding to a position of an image region designated in a screen in a state in which an imaging region image obtained by imaging the imaging region by the imaging apparatus is displayed.

* * * * *